(12) United States Patent
Maune et al.

(10) Patent No.: US 9,340,416 B2
(45) Date of Patent: May 17, 2016

(54) POLYNUCLEOTIDES AND RELATED NANOASSEMBLIES, STRUCTURES, ARRANGEMENTS, METHODS AND SYSTEMS

(75) Inventors: Hareem T. Maune, Pasadena, CA (US); Si-Ping Han, Yorba Linda, CA (US); Robert D. Barish, Pasadena, CA (US); Marc W. Bockrath, Diamond Bar, CA (US); William A. Goddard, III, Pasadena, CA (US); Paul W. K. Rothemund, Pasadena, CA (US); Erik Winfree, Altadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 463 days.

(21) Appl. No.: 12/540,052

(22) Filed: Aug. 12, 2009

(65) Prior Publication Data
US 2010/0069621 A1    Mar. 18, 2010

Related U.S. Application Data

(60) Provisional application No. 61/188,854, filed on Aug. 13, 2008, provisional application No. 61/189,792, filed on Aug. 22, 2008, provisional application No. 61/170,564, filed on Apr. 17, 2009.

(51) Int. Cl.
C07H 21/02 (2006.01)
C40B 40/04 (2006.01)
B82B 1/00 (2006.01)
B82Y 30/00 (2011.01)

(52) U.S. Cl.
CPC .. *B82B 1/00* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 6,777,180 B1 * | 8/2004 | Fisher et al. | 435/6.16 |
| 6,794,499 B2 | 9/2004 | Wengel et al. | |
| 7,498,423 B2 | 3/2009 | Zheng et al. | |
| 2003/0215903 A1 * | 11/2003 | Hyman et al. | 435/68.1 |
| 2004/0142324 A1 * | 7/2004 | Bosio | 435/6 |
| 2006/0228725 A1 * | 10/2006 | Salafsky | 435/6 |
| 2006/0246311 A1 * | 11/2006 | Hartwich et al. | 428/543 |
| 2010/0048421 A1 * | 2/2010 | Han et al. | 506/15 |

OTHER PUBLICATIONS

Park et al. J. Phys. Chem. B. 2004. 108: 12375-12380.*
Soto et al. J. Am Chem. Soc. 2002. 124(29): 8508-8509.*
Mayer et al. Agnew. Chem. Int. Ed. 2008. 47: 971-973.*
Chworos et al. Science. 2004. 306: 2068-2072.*
Saiki et al. PNAS. 1989. 86: 6230-6234.*
Yao. Analytical Biochemistry. 2004. 331: 216-223.*
Kimura-Suda. J Am Chem Soc. 2003. 125: 9014-9015.*
Storhoff. Langmuir. 2002. 18: 6666-6670.*
Bain. J. Am. Chem. Soc. 1989. 111: 7155-7164.*
Yang. Journal of Nanoparticle Research (2006) 8:1017-1026.*
Supplemental Information for Li et al. Angew. Chem. Int. Ed. (2007) 46: 7481-7484.*

(Continued)

*Primary Examiner* — Robert T Crow
*Assistant Examiner* — Joseph G Dauner
(74) *Attorney, Agent, or Firm* — Steinfl & Bruno LLP

(57) ABSTRACT

A linker polynucleotide for attaching a nanomaterial to a polynucleotidic platform and related nanoassemblies, arrangements, structures, methods and systems.

25 Claims, 22 Drawing Sheets

(56) References Cited

OTHER PUBLICATIONS

Adalye, F., et al., Dynamic DNA templates for discrete gold nanoparticle assemblies: Control of geometry, modularity, write/erase and structural switching, Journal of the American Chemical Society 2007, 129: 4130-4131.

Johnson, R., et al., Probing the structure of DNA—Carbon nanotube hybrids with molecular dynamics, Nano Letters 2008, 8: 69-75.

Park, S., et al., Finite-size, fully addressable DNA tile lattices formed by hierarchical assembly procedures, Angewandte Chemie 2006, 45: 735-739.

Zhang, y., et al., Construction of a DNA-truncated octahedron, Journal of the American Chemical Society 1994, 116: 1661-1669.

Javey, A., et al., Carbon nanotube transistor arrays for multistage complementary logic and ring oscillators. Nano Letters, 2002. 2(9): p. 929-932.

Kenji Hata, Don N. Futaba, Kohei Mizuno, Tatsunori Namai, Motoo Yumura, and Sumio Iijima. Water-assisted highly efficient synthesis of impurity-free single-walled carbon nanotubes. *Science*, 306(5700):1362-1364, 2004.

Ming Zheng, Anand Jagota, Ellen D. Semke, Bruce A. Diner, Robert S. Mclean, Steve R. Lustig, Raymond E. Richardson, and Nancy G. Tassi. DNA-assisted dispersion and separation of carbon nanotubes. *Nature Materials*, 2(5):338-342, 2003.

Michael S. Arnold, Alexander A. Green, James F. Hulvat, Samuel I. Stupp, and Mark C. Hersam. Sorting carbon nanotubes by electronic structure using density differentiation. *Nature Nanotechnology*, 1(1):60-65, 2006.

Ming Zheng, Anand Jagota, Michael S. Strano, Adelina P. Santos, Paul Barone, S. Grace Chou, Bruce A. Diner, Mildred S. Dresselhaus, Robert S. Mclean, G. Bibiana Onoa, Georgii G. Samsonidze, Ellen D. Semke, Monica Usrey, and Dennis J. Walls. Structure-based carbon nanotube sorting by sequence-dependent DNA assembly. *Science*, 302(5650):1545-1548, 2003.

X. Huang, R.S. McLean, and M. Zheng. High-resolution length sorting and purification of DNA-wrapped carbon nanotubes by size-exclusion chromatography. *Analytical Chemistry*, 77(19):6225-6228, 2005.

W.-Q. Deng, Y. Matsuda, and W.A. Goddard. Bifunctional anchors connecting carbon nanotubes to metal electrodes for improved nanoelectronics. *Journal of the American Chemical Society*, 129(32):9834-9835, 2007.

Qing Cao and John A. Rogers. Ultrathin films of single-walled carbon nanotubes for electronics and sensors: A review of fundamental and applied aspects. *Advanced Materials*, 21:29-53, 2009.

Richard D. Piner, Jin Zhu, Feng Xu, Seunghun Hong, and Chad A. Mirkin. "Dip-pen" nanolithography. *Science*, 283(5402):661-663, 1999.

C. Vieu, F. Carcenac, A. P'epin, Y. Chen, M. Mejias, A. Lebib, L. Manin-Ferlazzo, L. Couraud, and H. Launois. Electron beam lithography: resolution limits and applications. *Applied Surface Science*, 164:111-117, 2000.

S. Y. Chou, P. R. Krauss, and P. J. Renstrom. Imprint lithography with 25-nanometer resolution. Science, 272(5):85-87, 1996.

Wei Wu, William M. Tong, Jonathan Bartman, Yufeng Chen, Robert Walmsley, Zhaoning Yu, Qiangfei Xi, Inkyu Park, Carl Picciotto, Jun Gao, Shih-Yuan Wang, Deborah Morecroft, Joel Yang, Karl K. Berggren, and R. Stanley Williams. Sub-10 nm nanoimprint lithography by wafer bowing. *Journal of the American Chemical Society*, 8(11):3865-3869, 2008.

Yuhuang Wang, Daniel Maspoch, Shengli Zou, and George C. Schatz. Controlling the shape, orientation, and linkage of carbon nanotube features with nano affinity templates. *PNAS*, 103(7):2026-2031, 2006.

Michael R. Diehl, Sophia N. Yaliraki, Robert A. Beckman, Mauricio Barahona, and James R. Heath. Self-assembled, deterministic carbon nanotube wiring networks. *Angew. Chem. Int. Ed.*, 41(2):353-356, 2002.

Keith A. Williams, Peter T. M. Veenhuizen, Beatriz G. de la Torre, Ramon Eritja, and Cees Dekker Nanotechnology: Carbon nanotubes with DNA recognition. *Nature*, 420:761, 2002.

S'ebastien Lyonnais, Chia-Ling Chung, Laurence Goux-Capes, Christophe Escud'e, Olivier Pi'etrement, Sonia Baconnais, Eric Le Cam, Jean-Philippe Bourgoin, and Arianna Filoramo. A three-branched DNA template for carbon nanotube self-assembly into nanodevice configuration. *Chemical Communications*, pp. 683-685, 2009.

K. Keren, R. S. Berman, E. Buchstab, U. Sivan, and E. Braun. DNA-templated carbon-nanotube field effect transistor. *Science*, 302(1380), 2003.

Miron Hazani, Frank Hennrich, Manfred Kappes, Ron Naaman, Dana Peled, Victor Sidorov, and Dmitry Shvarts. DNA-mediated self-assembly of carbon nanotube-based electronic devices. *Chemical Physics Letters*, 391:389-392, 2004.

J.P Bourgoin, J. Borghetti, P. Chenevier, V. Derycke, A. Filoramo, L. Goux, M.F. Goffman, J.M. Bethoux, H. Happy, G. Dambrine, S. Lenfant, and D. Vuillaume. Directed assembly for carbon nanotube device fabrication. *proceedings of the International Electron Devices Meeting (IEDM)*, pp. 1-4, 2006.

Nadrian C. Seeman. Nucleic-acid junctions and lattices. *Journal of Theoretical Biology*, 99(2):237-247, 1982.

Nadrian C. Seeman. An overview of structural DNA nanotechnology. *Molecular Biotechnology*, 37(3):246-257, 2007.

Bruce H. Robinson and Nadrian C. Seeman. The design of a biochip: A self-assembling molecular-scale memory device. *Protein Engineering*, 1(4):295-300, 1987.

Chen and Nadrian C. Seeman. The synthesis from DNA of a molecule with the connectivity of a cube. *Nature*, 350:631-633, 1991.

W.M. Shih, J.D. Quispe, and G.F. Joyce. A 1.7-kilobase single-stranded DNA that folds into a nanoscale octahedron. *Nature*, 427(6453):618-621, 2004.

Dmytro Nykypanchuk, Mathew M. Maye, Daniel van der Lelie, and Oleg Gang. DNA-guided crystallization of colloidal nanoparticles. *Nature*, 451(7178):549-552, 2008.

Sung Yong Park, Abigail K. R. Lytton-Jean, Byeongdu Lee, Steven Weigand, George C. Schatz, and Chad A. Mirkin. DNA-programmable nanoparticle crystallization. *Nature*, 451(7178):553-556, 2008.

Yariv Y. Pinto, John D. Le, Nadrian C. Seeman, Karin Musier-Forsyth, T. Andrew Taton, and Richard A. Kiehl. Sequence-encoded self-assembly of multiple-nanocomponent arrays by 2D DNA scaffolding. *Nano Letters*, 5(12):2399-2402, 2005.

F.A. Aldaye and H.F. Sleiman. Dynamic DNA templates for discrete gold nanoparticle assemblies: Control of geometry, modularity, write/erase and structural switching. *Journal of the American Chemical Society*, 129(14):4130-4131, 2007.

Sung Ha Park, Peng Yin, Yan Liu, John H. Reif, Thomas H. LaBean, and Hao Yan. Programmable DNA self-assemblies for nanoscale organization of ligands and proteins. *Nano Letters*, 5(4):729-733, 2005.

Paul W. K. Rothemund. Folding DNA to create nanoscale shapes and patterns. *Nature*, 440:297-302, 2006.

A. DeHon. Array-based architecture for FET-based, nanoscale electronics. *IEEE Transactions on Nanotechnology*, 2(1):23-32, 2003.

C. Dwyer, V. Johri, M. Cheung, J. Patwardhan, A. Lebeck, and D. Sorin. Design tools for a DNA-guided self-assembling carbon nanotube technology. *Nanotechnology*, 15(9):1240-1245, 2004.

Jaidev P. Patwardhan, Vijeta Johri, Chris Dwyer, and Alvin R. Lebeck. A defect tolerant self-organizing nanoscale SIMD architecture. *SIGARCH Computer Architecture News*, 34(5):241-251, 2006.

Ph. Avouris, J. Chen, M. Freitag, V. Perebeinos, and J. C. Tsang. Carbon nanotube optoelectronics. *Physica status solidi. B. Basic research*, 243(13):3197-3203,2006.

Yonggang Ke, Stuart Lindsay, Yung Chang, Yan Liu, and Hao Yan. Self-assembled water-soluble nucleic acid probe tiles for label-free RNA hybridization assays. *Science*, 319:180-183, 2008.

Yuerui Lu, Sarunya Bangsaruntip, Xinran Wang, Li Zhang, Yoshio Nishi, and Hongjie Dai. DNA functionalization of carbon nanotubes for ultrathin atomic layer deposition of high κ dielectrics for nanotube transistors with 60 mv/decade switching. *J. Am. Chem. Soc.*, 128(11):3518-3519, 2006.

(56) References Cited

OTHER PUBLICATIONS

Esther S. Jeng, Paul W. Barone, John D. Nelson, and Michael S. Strano. Hybridization kinetics and thermodynamics of DNA adsorbed to individually dispersed single-walled carbon nanotubes. *Small*, 3(9):1602-1609, 2007.
Yi Chen, Haipeng Liu, Tao Ye, Junghwa Kim, and Chengde Mao. DNA-directed assembly of single-wall carbon nanotubes. *J. Am. Chem. Soc.*, 129(28):8696-8697, 2007.
Y. Li, X. Han, and Z. Deng. Grafting single-walled carbon nanotubes with highly hybridizable DNA sequences: Potential building blocks for DNA-programmed material assembly. *Angewandte Chemie International Edition*, 46:7481-7484, 2007.
Eung-Soo Hwang, Chengfan Cao, Sanghyun Hong, Hye-Jin Jung, Chang-Yong Cha, Jae-Boong Choi, Young-Jin Kim, and Seunghyun Baik. The DNA hybridization assay using single-walled carbon nanotubes as ultrasensitive, long-term optical labels. *Nanotechnology*, 17:3442-3445, 2006.
Bernard Yurke, Andrew J. Turberfield, Allen P. Mills, Jr., Friedrich C. Simmel, and Jennifer L. Nuemann. A DNA-fuelled molecular machine made of DNA. *Nature*, 406:605-608, 2000.
Nadrian C. Seeman. De novo design of sequences for nucleic acid structural engineering. *Journal of Biomolecular Structure & Dynamics*, 8(3):573-581, 1990.
Stephanie R. Vogel, Manfred M. Kappes, Frank Hennrich, and Clemens Richert. An unexpected new optimum in the structure space of DNA solubilizing singlewalled carbon nanotubes. *Chem. Eur. J.*, 13:1815-1820, 2007.
Bernie Yurke and A.P. Mills Jr. Using DNA to power nanostructures. *Genet. Program Evolvable Mach.*, 4:111-122, 2003.
Igor G. Panyutin and Peggy Hsieh. Kinetics of spontaneous DNA branch migration. *Proc. Nat. Acad. Sci. USA*, 91:2021-2025, 1994.
U. Christensen, N. Jacobsen, V. K. Rajwanshi, J. Wengel, and T. Koch. Stopped-flow kinetics of locked nucleic acid (LNA)-oligonucleotide duplex formation: studies of LNA-DNA and DNA-DNA interactions. *Biochemical Journal*, 354:481-484, 2001.
Rebecca Schulman and Erik Winfree. Synthesis of crystals with a programmable kinetic barrier to nucleation. *Proc. Nat. Acad. Sci. USA*, 104:15236-15241, 2007.
Robert D. Barish, Rebecca Schulman, Paul W.K. Rothemund, and Erik Winfree. An information-bearing seed for nucleating algorithmic self-assembly. To appear in *Proceedings of the National Academy of Sciences*, 2009.
Patrick O'Neill, Paul W. K. Rothemund, Ashish Kumar, and D. Kuchnir Fygenson. Sturdier DNA nanotubes via ligation. *Nano Letters*, pp. 1379-1383, 2006.
B. Gao, A. Komnik, R. Egger, D.C. Glattli, and A. Bechtold. Evidence for Luttinger-liquid behavior in crossed metallic single-wall nanotubes. *Physical Review Letters*, 92(21):216804-1-216804-4, 2004.
M.S. Fuhrer, J. Nygard, L. Shih, M. Forero, Y.-G. Yoon, M.S.C. Mazzoni, Y.H.J. Choi, J. Ihm, S.G. Louie, A. Zettl, and Paul L. McEuen. Crossed nanotubes junctions. *Science*, 288:494-497, 2000.
A. Bachtold, M. S. Fuhrer, S. Plyasunov, M. Forero, Erik H. Anderson, A. Zettl, and Paul L. McEuen Scanned probe microscopy of electronic transport in carbon nanotubes. *Physical Review Letters*, 84(26):6082-6085, 2000.
Henk W. Ch. Postma, Mark de Jonge, Zhen Yao, and Cees Dekker. Electrical transport through carbon nanotube junctions created by mechanical manipulation. *Phys. Rev. B*, 62(16):R10653-R10656, Oct. 2000.
M. Ahlskog, R. Tarkiainen, L. Roschier, and P. Hakonen. Single-electron transistor made of two crossing multiwalled carbon nanotubes and its noise properties. *Journal of Applied Physics*, 77(24):40-37-4039, 2000.

J. W. Park and Jinhee Kim K.-H. Yoo. Electrical transport through crossed carbon nanotube junctions. *Journal of Applied Physics*, 93(7):4191-4193, 2003.
D.S. Lee, J. Svensson, S.W. Lee, Y.W. Park YW, and E.E.B. Campbell. Fabrication of crossed junctions of semiconducting and metallic carbon nanotubes: A CNT-gated CNT-FET. *Journal of Nanoscience and Nanotechnology*, 6(5):1325-1330, 2006.
Anton Kuzyk, Bernard Yurke, J. Jussi Toppari, Veikko Linko, and Paivi Torma. Dielectrophoretic trapping of DNA origami. *Small*, 4(4):447-450, 2008.
Thomas Rueckes, Kyoungha Kim, Ernesto Joselevich, Greg Y. Tseng, Chin-Li Cheung, and Charles M. Lieber. Carbon nanotube-based nonvolatile random access memory for molecular computing. *Science*, 289(5476):94-97, 2000.
Adrian Bachtold, Peter Hadley, Takeshi Nakanishi, and Cees Dekker. Logic circuits with carbon nanotube transistors. *Science*, 294(9):1317-1320, Nov. 2001.
Zhaohui Zhong, Deli Wang, Yi Cui, Marc W. Bockrath, and Charles M. Lieber. Nanowire crossbar arrays as address decoders for integrated nanosystems. *Science*, 302:1377-1379, 2003.
X. Tu, S Manohar, A. Jagota, M. Zheng, "DNA sequence motifs for structure-specific recognition and separation of carbon nanotubes", *Nature*, 460, 250-253 (2009).
T-J. Fu and N. Seeman, "DNA double-crossover molecules." *Biochemistry*, 32, 3211 (1993)].
E. Winfree, N. C. Seeman, et al.,"Design and self-assembly of two-dimensional DNA crystals."*Nature*, 394, 539544 (1998)].
Faisal A. Aldaye, Alison L. Palmer, Hanadi F. Sleiman1 "Assembling Materials with DNA as the Guide" Science vol. 321 Sep. 26, 2008, pp. 1795-1799.
Nadrian C. Seeman "An Overview of Structural DNA Nanotechnology" Mol Biotechnol (2007) 37:346-257.
K. Mizuno, J. Ishii, H. Kishida, Y. Hayamizu, S. Yasuda, D.N. Futaba, M. Yumura, and K. Hata. A black body absorber from vertically aligned single-walled carbon nanotubes. *PNAS*, 106: 6044-7, 2009.
G.S. Tulevski, J. Hannon, A. Afzali, Z. Chen, P. Avouris, and C.R. Kagan. Chemically Assisted Directed Assembly of Carbon Nanotubes for the Fabrication of Large-Scale Device Arrays. *J. Am. Chem. Soc.* 129, 11964-11968, 2007.
Restriction Requirement mailed on Jul. 28, 2011 for U.S. Appl. No. 12/540,027, filed Aug. 12, 2009 in the name of Si-Ping Han et al.
Non-Final Office Action mailed on Oct. 3, 2011 for U.S. Appl. No. 12/540,027, filed Aug. 12, 2009 in the name of Si-Ping Han et al.
Final Office Action mailed on Apr. 6, 2012 for U.S. Appl. No. 12/540,027, filed Aug. 12, 2009 in the name of Si-Ping Han et al.
Advisory Action mailed on Aug. 8, 2012 for U.S. Appl. No. 12/540,027, filed Aug. 12, 2009 in the name of Si-Ping Han et al.
Seeman, N., DNA in a material world, *Nature* 2003, 421: 427-431.
Biomath Calculator retrieved from http://www.promega.com/techserv/tools/biomath/calc11.htm on Aug. 28, 2013.
Warren, C.L. et al. "Defining the sequence-recognition profile of DNA-binding molecules" PNAS, vol. 103 (4), pp. 867-872 (Jan. 24, 2006).
Archived image of DNA Design Toolbox, www.dna.caltech.edu/DNAdesign/ from Aug. 6, 2013.
Wikipedia. "Chemisorption" Jul. 17, 2009. Web, en.wikipedia.org/wiki/Chemisorption.
Nielsen, PE. "Targeting Double Stranded DNA with Peptide Nucleic Acid (PNA)." Current Medicinal Chemistry, 2001, 8, 545-550.
Hakkinen, H. "The gold—sulfur interface at the nanoscale", Nature Chemistry 2012, 4: 443-455.
Physisorption, Wikipedia definition retrieved on May 18, 2014 from https://web.archive.org/web/20071205140454/http://en.wikipedia.org/wi . . . , (Wayback machine).
Non-Final Office Action mailed on Nov. 21, 2013 for U.S. Appl. No. 12/540,027, filed Aug. 12, 2009.

\* cited by examiner

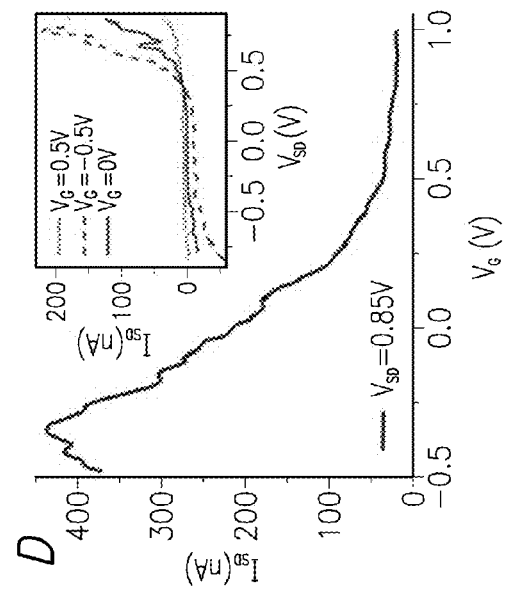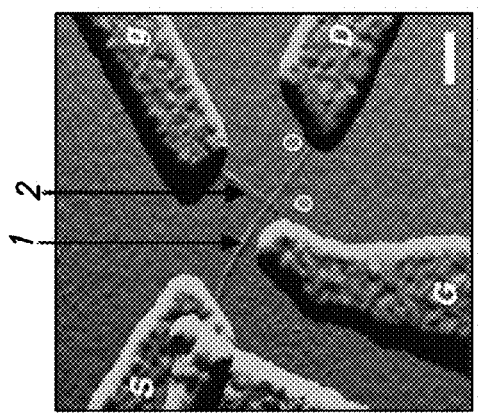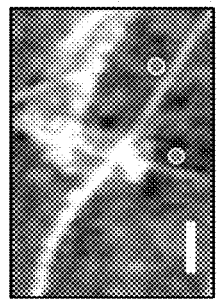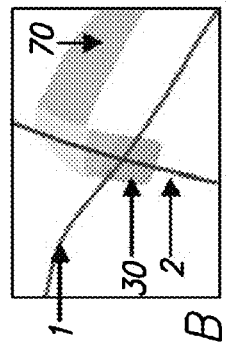
FIG. 20

POLYNUCLEOTIDES AND RELATED NANOASSEMBLIES, STRUCTURES, ARRANGEMENTS, METHODS AND SYSTEMS

CROSS REFERENCE TO RELATED APPLICATIONS

This application claims priority to U.S. provisional application Ser. No. 61/188,854 filed on Aug. 13, 2008 entitled "Self Assembly of Carbon Nanotube Devices Directed by Two Dimensional DNA Nanostructures", U.S. provisional application Ser. No. 61/189,792 filed on Aug. 22, 2008, entitled "Parallel Nucleic Acid Labeled Single Wall Carbon Nanotubes with Tunable Separation" and U.S. provisional application Ser. No. 61/170,564 filed on Apr. 17, 2009, entitled "Parallel Nucleic Acid Labeled Single Wall Carbon Nanotubes with Tunable Separation", each of which is incorporated herein by reference in its entirety. This application might also be related to US application entitled "Nanocomposite Structures and Related methods and Systems" filed on Aug. 12, 2009, U.S. patent application Ser. No. 12/540,027, herein also incorporated by reference in its entirety.

STATEMENT OF GOVERNMENT GRANT

The U.S. Government has certain rights in this invention pursuant to Grant No. N00014-05-1-0562 awarded by the ONR—Space and Naval Warfare Systems Center (SSC) and Grant No. CTS0608889 awarded by the National Science Foundation."

TECHNICAL FIELD

The present disclosure relates to nanomaterials, and in particular, to polynucleotides, and related nanoassemblies, structures, arrangements, methods and systems for nanomaterial organization.

BACKGROUND

A central challenge for nanotechnology is the fabrication of complex geometries for nanomaterials, in particular when applied to the fabrication of nanodevices. Among several nanomaterial of interest, carbon nanotubes have exceptional electronic, thermal, and mechanical properties that have made their use in nanodevices such as nanoscale sensors and information processing nanodevices particularly desirable.

In spite of advances in use of carbon nanotubes for assembling nanostructure, control over arrangement of carbon nanotubes and other nanomaterial, and in particular individual carbon nanotubes, including single walled carbon nanotubes (SWNT), is still an open challenge.

In particular, control over self assembly of nanomaterials in complex nanoscale geometries, including geometries formed by multiple materials, and/or individual carbon nanotubes in complex architectures for applications in nanoelectronics is highly desirable.

SUMMARY

Provided herein are polynucleotides, and related nanoassemblies, structures, arrangements methods and systems that in several embodiments allow a controlled self-assembly of complex structure comprising nanomaterials and in particular carbon nanotubes. In particular, in several embodiments, the structures, methods and systems described herein can provide for a rapid prototyping and production of complex nanodevices comprising SWNTs suitable for electronic applications.

According to a first aspect, a linker polynucleotide is described, for attaching a nanomaterial to a polynucleotidic platform. The linker polynucleotide comprises: a toehold moiety configured to specifically attach a corresponding moiety presented on the polynucleotidic platform; a duplex protected labeling polynucleotide domain; and a nanomaterial attaching moiety configured to attach the nanomaterial.

According to a second aspect, a nanoassembly is described. The nanoassembly comprises a linker polynucleotide herein described and a nanomaterial wherein the linker polynucleotide is attached to the nanomaterial through the through the nanomaterial attaching moiety of the linker polynucleotide.

According to a third aspect, method to provide a nanoassembly is described. The method comprises contacting a linker polynucleotide herein described with a suitable nanomaterial for a time and under condition to allow attachment of the linker polynucleotide to the suitable nanomaterial through the through the nanomaterial attaching moiety of the linker polynucleotide.

According to a fourth aspect, a polynucleotidic platform is described, the platform configured to allow attachment of a nanoassembly herein described. The platform comprises of a polynucleotide template extending along a plane and a hook polynucleotide projecting out of the polynucleotide template. In the polynucleotidic platform, the hook polynucleotide arranged on the template plane to present a linker polynucleotide attaching moiety for specific binding with a corresponding toehold moiety of the linker polynucleotide of the nanoassembly.

According to a fifth aspect, a hook polynucleotide for attaching a nanoassembly to a polynucleotidic template, comprising: a polynucleotidic template binding moiety configured to allow attachment of the hook polynucleotide to the polynucleotidic template; and a linker polynucleotide attaching moiety configured to allow attachment of the hook polynucleotide to a linker polynucleotide of the nanoassembly.

According to a sixth aspect, a method to provide a polynucleotidic platform is described. The method comprises providing hook polynucleotides with a polynucleotidic template for a time and under condition to allow attachment of the hook polynucleotides to the polynucleotidic template to obtain a polynucleotidic platform presenting the one or more hook polynucleotides According to a seventh aspect, a structure is described. The nanostructure comprises a platform nanostructure herein described attached to a nanoassembly herein described. In particular, in the nanostructure, the hook polynucleotides of the platform are specifically bound to the linker polynucleotides of the nanoassembly through specific binding of the linker polynucleotide attaching moiety with the toehold moiety of the polynucleotide linker.

According to an eighth aspect, a method of organizing nanomaterials is described. The method comprises providing a contacting a nanoassembly herein described with a platform nanostructure herein described to provide a nanostructure herein described. In particular, in the method contacting the polynucleotide platform with the nanoassembly is performed for a time and under condition to allow specific binding of the toehold moiety of the linker polynucleotide of the nanoassembly with the linker polynucleotide attaching moiety of the one or more hook polynucleotides. In some embodiments the method can further comprise depositing the organized nanomaterials onto a suitable substrate followed by removal of the nucleic acid linker and/or nucleic acid platform.

According to a ninth aspect, a system for organizing a nanomaterial is described. The system comprises a nanoassembly herein described and a polynucleotidic platform herein described, to be contacted according to the method to organize nanomaterial herein described.

According to a tenth aspect, a system for organizing a nanomaterial is described. The system comprises at least one linker polynucleotide, and at least one hook polynucleotide. In the system, the linker polynucleotide is to be contacted with the nanomaterial to provide a nanoassembly herein described, the at least one hook polynucleotide is to be contacted with a polynucleotidic template herein described to provide a platform herein described and the nanoassembly is to be contacted with a polynucleotidic platform according to method to organize the nanomaterial herein described.

Polynucleotides and related nanoassemblies, structures, arrangements methods and systems can be used in several embodiments to produce in parallel, large numbers of nanomaterial-polynucleotide platform structures where the nanomaterials are placed precisely onto the platform.

Polynucleotides and related nanoassemblies, structures, arrangements methods and systems can be used in several embodiments to produce nanomaterial-polynucleotide platform structures where the nanomaterials are positioned to control positioning and orientation of each single nanomaterial placed on the platform.

Polynucleotides and related nanoassemblies, structures, arrangements methods and systems can be used in several embodiments for prototyping and parallel construction of complex nanodevices such as transistors, logic gates or nanoelectromechanical memory elements.

Polynucleotides and related nanoassemblies, structures, arrangements methods and systems can be used in several embodiments as self-assembled nanoscaffold templates controlling the geometric arrangements of the nanomaterial composing the resulting structure.

Polynucleotides and related nanoassemblies, structures, arrangements methods and systems can be used in several embodiments to precisely position and align nanomaterials labeled with specific polynucleotide sequences onto specific template patterns of different shapes and forms including but not limited to origami and ribbon shaped polynucleotidic structures.

Polynucleotides and related nanoassemblies, structures, arrangements methods and systems can be used in several embodiments to produce large number of nanomaterials containing structures in amounts between from about 1 billion to about 1100 trillion, and in particular from about 50 billion to about 500 billion devices, per liter of solution and allows deposition of the structures on different substrates.

Polynucleotides and related nanoassemblies, structures, arrangements methods and systems can be used in several embodiments for large scale integration process of nanomaterials containing structures organized onto a substrate prior to assembly with the nanomaterials.

In several embodiments Polynucleotides and related nanoassemblies, structures, arrangements methods and systems can be used in combination in a scalable system, suitable to organize increasing number of nanomaterials of various shapes and nature in a structure, accommodating an increasing or decreasing number of nanomaterials without significantly impacting the performance of the system and of the resulting structure Polynucleotides and related nanoassemblies, structures, arrangements methods and systems can be used in several embodiments in connection with manufacturing of field effect transistors (FET), cross junction devices, and more complex devices such as logic gates or nanoelectromechanical memory elements, and in connection with applications based on integration of standard electron beam lithography techniques to create metal contacts for electrical measurements.

Polynucleotides and related nanoassemblies, structures, arrangements methods and systems are therefore compatible with standard semiconductor fabrication techniques and can serve as a bridge between bottom-up and top-down nanofabrication technologies, such as for example opto-electronics applications.

The details of one or more embodiments of the disclosure are set forth in the accompanying drawings and the detailed description and examples below. Other features, objects, and advantages will be apparent from the detailed description, examples and drawings, and from the appended claims

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 20 shows an electrical characterization of a self-assembled cross-junction according to an embodiment of the present disclosure. In particular, Panel A shows an AFM height image of an SWNT cross-junction on dry $SiO_2$ before electrode deposition. Panel B: shows a schematic interpretation of Panel A indicating SWNTs (1, 2), polynucleotidic platform (30), polynucleotidic ribbon (70) and a place where the ribbon has folded back on itself (light grey). Panel C shows an AFM amplitude image of cross-junction from Panel A with e-beam patterned Pd/Au electrodes. Scale bars are 100 nm; dark and light gray dots indicate NL-SWNT type (1, 2), determined from ribbon orientation. Electrode labels: S, D, G and g. Panel D shows a plot of source-drain current ($I_{SD}$) versus SWNT gate voltage ($V_G$) for a source-drain bias of 0.85 V. The current pre-amplifier used for measuring $I_{SD}$ also served as a virtual ground. Inset shows the source-drain I-V for different gate biases.

DETAILED DESCRIPTION

Figure 1:
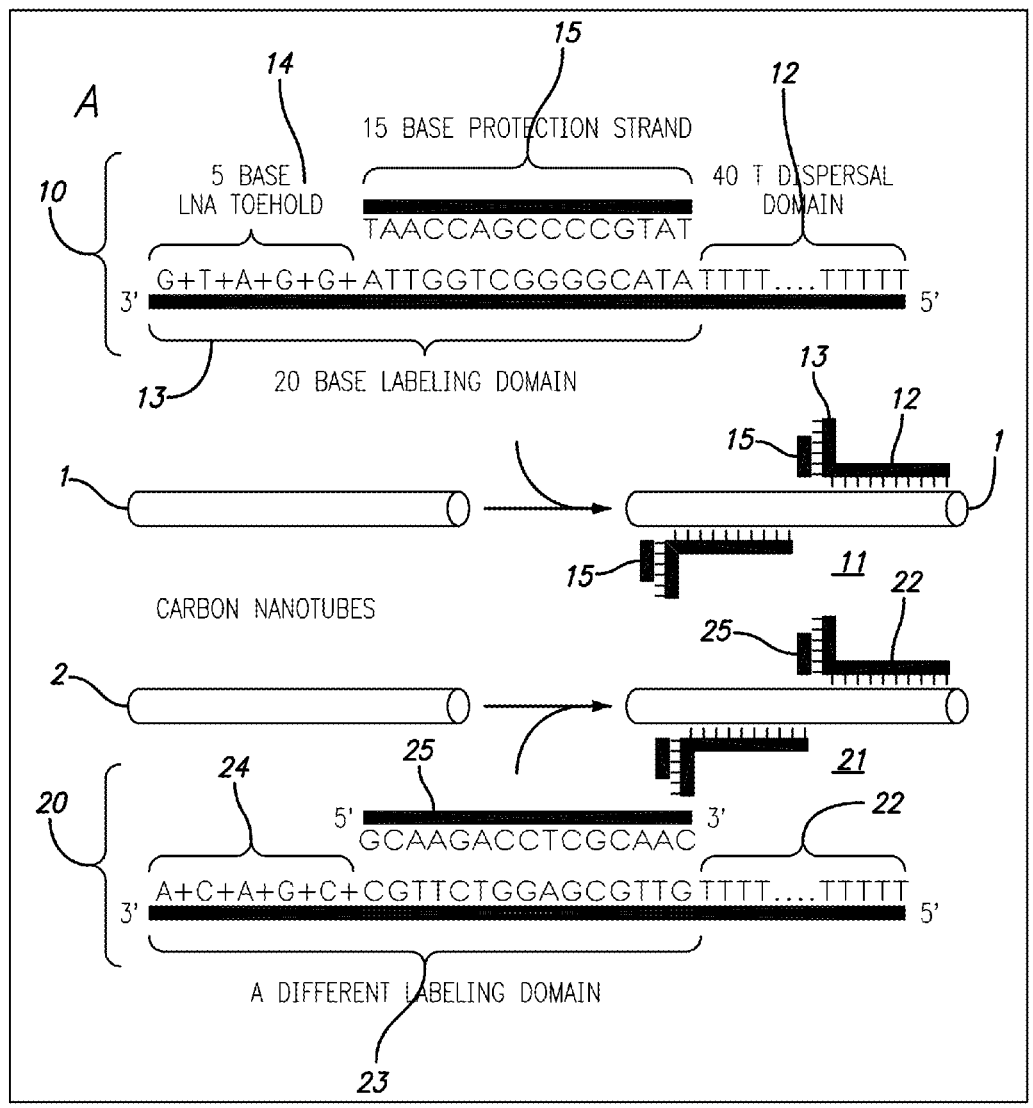
FIG. 1 shows a schematic illustration of a linker polynucleotide, a nanoassembly and of a related method of manufacturing according to some embodiments herein described.

Provided herein are polynucleotides, and related nanoassemblies, structures, arrangements methods and systems that in several embodiments provide an effective approach for parallel and controlled arrangement and organization of nanomaterials into complex geometries.

The term "nanomaterial" as used herein indicates any materials used in nanotechnology and related material science applications and fields. Exemplary nanomaterials include, but are not limited to a fullerene, an inorganic nanoparticle, or related structures or derivatives. In particular, nanomaterials comprise carbon spheres, carbon nanotubes and carbon nanowires. Particular carbon nanotubes of interest comprise cylindrical single wall carbon nanotubes (SWNT) and related structures such as nanoribbons.

Several structures that include the nanomaterials arranged into various configuration and geometries have application in fields such as nanoelectronics, optoelectronics, biotechnology, and additional fields identifiable by a skilled person. Exemplary useful configurations of nanomaterial such as SWNTs include but are not limited to ultrathin films for high performance electronic devices, geometries based on lithographically defined affinity templates created using techniques such as dip-pen [2] and e-beam [3] on which nanomaterials such as SWNTs can then self-assemble, one-dimensional (1D) SWNT structures [6, 7] and devices [8, 9] in which a single SWNT positioned between a pair of electrodes is switched by the substrate back-gate, structures where DNA linkers define the connectivity between three carbon nanotubes [10].

In several embodiments herein described, linkers polynucleotides and related assemblies are used in combination with polynucleotidic platforms to arrange nanomaterials in several structures including 2D structures and complex geometries that can be arranged with a robust, massively parallel, self-assembly technique.

The term "polynucleotide" as used herein indicates an organic polymer composed of two or more monomers including nucleotides, nucleosides or analogs thereof. The term "nucleotide" refers to any of several compounds that consist of a ribose or deoxyribose sugar joined to a purine or pyrimidine base and to a phosphate group and that is the basic structural unit of nucleic acids. The term "nucleoside" refers to a compound (such as guanosine or adenosine) that consists of a purine or pyrimidine base combined with deoxyribose or ribose and is found especially in nucleic acids. The term "nucleotide analog" or "nucleoside analog" refers respectively to a nucleotide or nucleoside in which one or more individual atoms have been replaced with a different atom or a with a different functional group. Accordingly, the term "polynucleotide" includes nucleic acids of any length, and in particular DNA, RNA, analogs and fragments thereof. A polynucleotide of three or more nucleotides is also called "nucleotidic oligomer" or "oligonucleotide."

Linker polynucleotides in the sense of the present disclosure are polynucleotides that are configured to attach a nanomaterial of interest to a polynucleotidic structure.

The term "attach", "attached" or "attachment" as used herein, refers to connecting or uniting by a bond, link, force or tie in order to keep two or more components together, which encompasses either direct or indirect attachment such that for example where a first compound is directly bound to a second compound, and the embodiments wherein one or more intermediate compounds, and in particular molecules, are disposed between the first compound and the second compound.

In particular, in several embodiments, linker polynucleotides include a duplex protected labeling polynucleotide domain configured to allow identification of the linker polynucleotide, a toehold moiety configured to specifically attach a corresponding moiety presented on a polynucleotidic platform, and a nanomaterial attaching moiety, configured to allow attachment of the linker polynucleotide to the nanomaterial.

In several embodiments, the nanomaterial attaching moiety is one or more single polynucleotide strands or a chemical linker moiety configured to specifically attach a corresponding moiety presented on the nanomaterial. In particular the nanomaterial attaching moiety, herein also dispersal domain, can be formed by an optionally modified single strand polynucleotide that varies in length and sequences in view of the nanomaterial to be attached and the experimental design of choice. For example in several embodiments, where the nanomaterial is formed by nanotubes, the dispersal domain can be formed by a single strand polynucleotide of from approximately 10 to approximately 100 nucleotides, and/or can have a specific sequence for selection of different chiralities of nanotubes in application of techniques identifiable by a skilled person (see [60] incorporated herein by reference in its entirety). In several embodiments where the nanomaterial is other than nanotubes, the dispersal domain can either be a chain of polynucleotides which hybridizes to polynucleotide chain attached to the nanomaterial and/or can be a chemical modification at the end of a short polynucleotide section which chemically interacts with the surface chemical groups present on the nanomaterial.

In several embodiments, the duplex protected labeling domain is configured to minimize the interaction between the domain and the nanomaterial to be attached to the linker including the duplex domain. In particular, in several embodiments, the duplex protected labeling domain is approximately 10 base pairs or longer unless synthetic bases such as LNA, PNA or 2'-o-methyl DNA are used to increase the melting temperature of the duplex.

In some embodiments, the duplex protected labeling polynucleotide is a chemically modified duplex protected labeling polynucleotide domain to minimize attachment of the nanomaterial to the duplex protected labeling polynucleotide domain. (see e.g. Example 17, FIG. 23, Panel F). In particular, in some embodiments the chemically modified duplex protected labeling polynucleotide domain comprises polymeric side chains. In particular, in several embodiments, where length shorter (e.g. approximately 5 or more base pairs) than 10 base pairs the duplex can also be modified to further minimize binding with the nanomaterial. An exemplary modification is illustrated in Example 17 with reference of description of FIG. 24, panel D.

In several embodiments the duplex protected labeling domain is configured to allow deprotection and subsequent binding with a complementary sequence, upon binding of a toehold moiety. In those embodiments, at least part of the duplex protected labeling domain is comprised in the polynucleotide linker portion which specifically binds to a corresponding sequence in a hook on any platforms herein described.

In several embodiments, the toehold moiety is formed by a single stranded polynucleotide complementary to a corresponding moiety presented on the polynucleotidic platform.

In particular, in several embodiments, the toehold region is formed by locked nucleic acid nucleotides. The term "locked nucleic acids" (LNA) as used herein indicates a modified RNA nucleotide. The ribose moiety of an LNA nucleotide is modified with an extra bridge connecting the 2' and 4' carbons. The bridge "locks" the ribose in the 3'-endo structural conformation, which is often found in the A-form of DNA or RNA. LNA nucleotides can be mixed with DNA or RNA bases in the oligonucleotide whenever desired. The locked ribose conformation enhances base stacking and backbone pre-organization. This significantly increases the thermal stability (melting temperature) of oligonucleotides. LNA oligonucleotides display unprecedented hybridization affinity toward complementary single-stranded RNA and complementary single- or double-stranded DNA. Structural studies have shown that LNA oligonucleotides induce A-type (RNA-like) duplex conformations.

In several embodiments, the toehold region is formed by single stranded polynucleotides presented on the linker polynucleotide for binding to a corresponding region on the polynucleotidic platform. The term "present" as used herein with reference to a compound or functional group indicates attachment performed to maintain the chemical reactivity of the compound or functional group as attached. Accordingly, a functional group presented on a surface, is able to perform under the appropriate conditions the one or more chemical reactions that chemically characterize the functional group.

In particular, such a configuration can be achieved by appropriate selection of sequences and length of the toehold region in view of the nanomaterial to be attached. For example with reference to nanomaterial such as SWNTs, the relative instability of SWNTs dispersed by short polynucleotides, such as ssDNA of 4 to 6 nt [42], supports the conclusion that the interaction of short toeholds with the SWNT sidewalls is dynamic, and that ssDNAs of 4 to 6 nt included in a linker attached to a SWNT are available for binding corresponding sequences on a polynucleotidic platform (see Example 2). In other embodiments, length of the toehold would depend on the strength of interaction between the toehold and the nanomaterial surface and/or chemical group/polynucleotide on the surface interacting with the toehold.

In several embodiments, length of the toehold is selected to control rate of the hybridization reaction with corresponding sequences on the polynucleotidic scaffold. For example, toehold regions of 3 to 4 nucleotides allow a fast initiation of deprotection and toeholds of 4 bases maximize the reaction rate [43].

In some embodiments, the toehold moiety can comprise a chemical linker in addition or in place of a single stranded polynucleotide, and the chemical linker is configured to specifically attach a corresponding moiety presented on the polynucleotidic platform. In particular, the toehold region can have a terminal or internal linker for attachment to the platform. In those embodiments, if the nanomaterial attaching moiety is also formed by a chemical linker, the toehold chemical linker should be a different moiety than the nanomaterial chemical linker for attaching to the nanomaterials. (see Example 17)

In several embodiments, the toehold moiety is comprised in a labeling domain together with the duplex protected labeling polynucleotide domain which is configured to allow deprotection and subsequent binding upon binding of the toehold to the platform. In particular, in some of those embodiments, the toehold moiety is comprised of a short linker single stranded polynucleotide toehold region configured to initiate a binding process of the linker to the to the polynucleotidic platform, and a linker binding region configured to allow specific binding of the linker polynucleotide to a corresponding binding region on the polynucleotidic platform (see Example 1).

In embodiments, wherein the labeling domain comprising the duplex protected labeling domain is formed by PNA recognition and formation of triplex structures with specific dsDNA segments is possible. Accordingly in some of the embodiments wherein the duplex protected labeling domain is formed by PNA segment and the toehold region is comprised in the labeling domain, the labeling domain can specifically bind to dsDNA segments in the platform. (Example 17)

Figure 4:
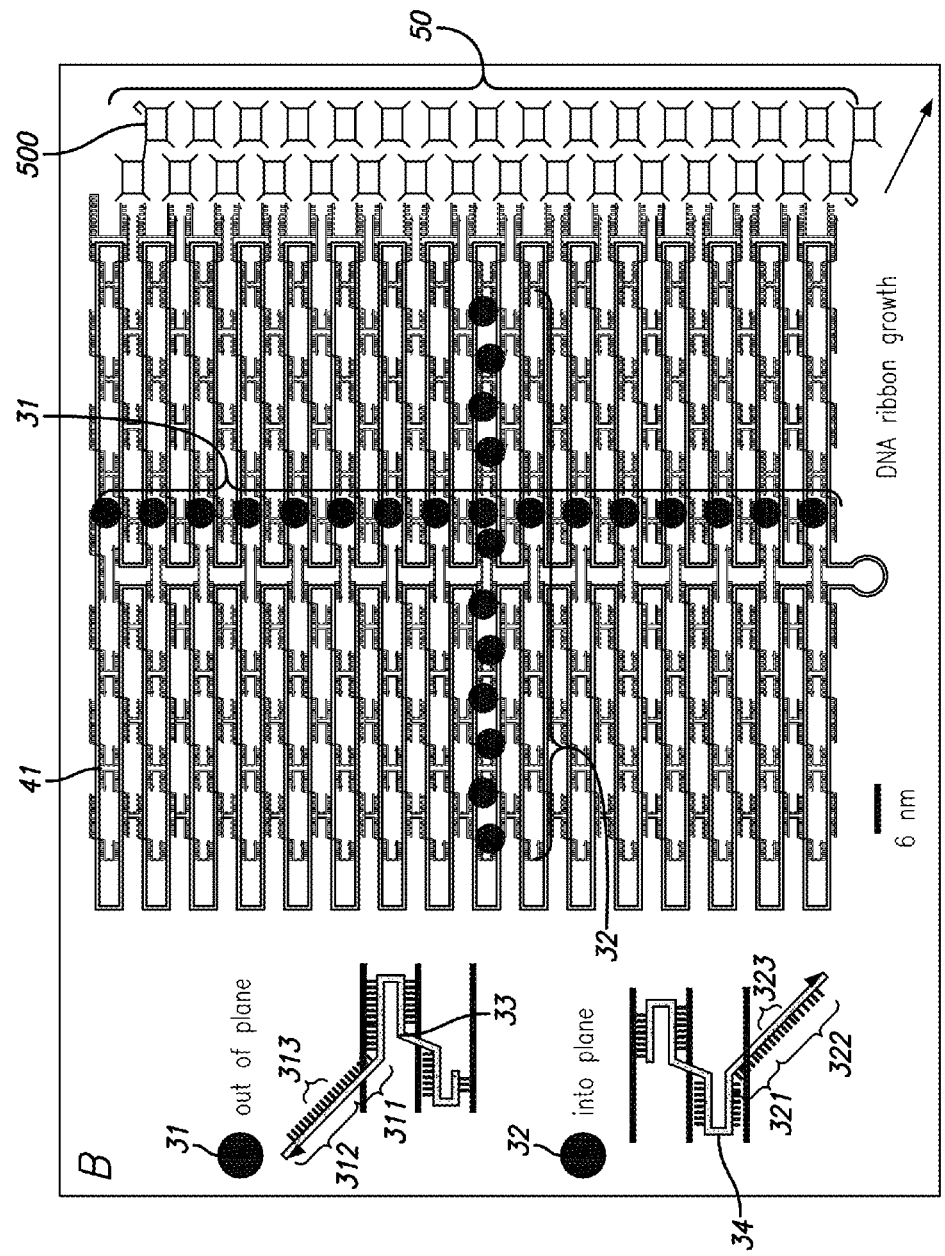
FIG. 4 shows a schematic illustration of a polynucleotidic platform according to some embodiments herein described where the configuration of hook polynucleotides according to some embodiments herein described is schematically indicated on the left.

According to several embodiments, a linker polynucleotide is formed by a double-stranded, partially-duplex polynucleotide complex with a poly-thymine (poly-T) dispersal domain and a labeling domain such as the one exemplified in Example 1 (FIG. 1). The dispersal domain can be variable in length. An example length is 40 bases (FIG. 1). The labeling domain, 20 nucleotides in length, for example, has a specific sequence and is complementary to polynucleotide hooks on a polynucleotide platform template (FIG. 4). The labeling domain further comprises a base protection strand of less than the length of the entire labeling domain which leaves several bases of the labeling domain unprotected. For example, FIG. 1 describes a labeling domain of 15 bases and 5 bases unprotected. These unprotected bases comprise a toehold. During the dispersal of nanomaterials with the linker polynucleotides (Example 2), the poly-T dispersal domain adsorbs on the nanomaterial while the protection strand prevents adsorption of the labeling domain.

In other embodiments, linker polynucleotides can be formed by other double stranded polynucleotides or single stranded polynucleotides, such as the ones illustrated in Example 17. In some embodiments, the linker polynucleotide is made of a first strand and a second strand, the toehold moiety is formed by a first region of the first strand, the duplex protected labeling polynucleotide domain is formed by a second region of the first strand and the second strand, and the nanomaterial attaching moiety is formed by a third region of the first strand (see e.g. Example 1, Example 17).

In some embodiments, the linker polynucleotide is made of a first strand and a second strand, the toehold moiety is formed by a first region of the first strand, the duplex protected labeling polynucleotide domain is formed by a second region of the first strand and a first region of the second strand, and the nanomaterial attaching moiety is formed by a third region of the first strand and a second region of the second strand. (see e.g. Example 23 FIG. 23, panel B)

Figure 23:
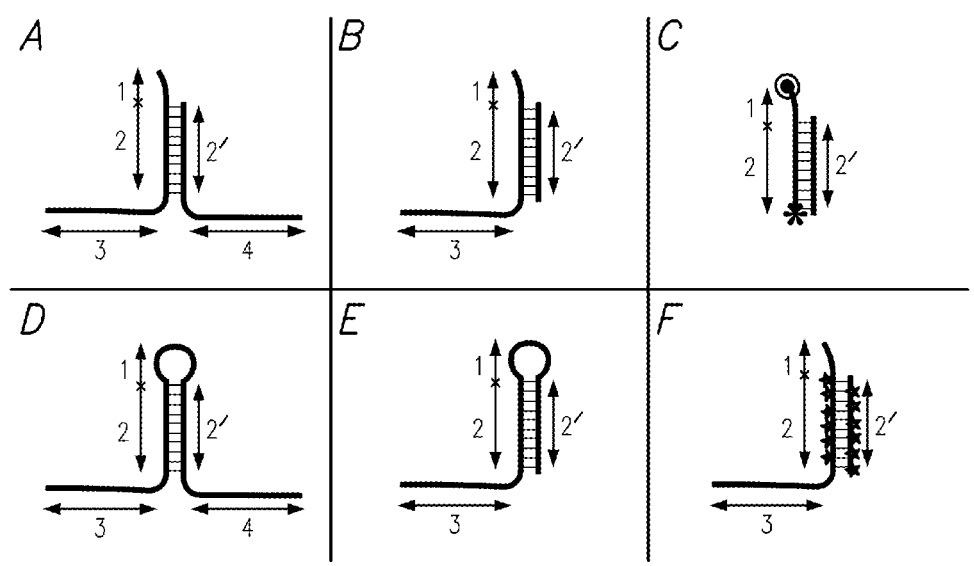
FIG. 23, panels A-F, shows a schematic representation of linker polynucleotides according to some embodiments herein described. In particular, Panels A and B shows a schematic representation of linker polynucleotides comprised of 2 strands according to some embodiments herein described. Panels D and E shows a schematic representation of linker polynucleotides comprised of 1 strand. Panel C shows a schematic representation of linker polynucleotides attaching the nanomaterials via a chemical linker moiety (*). Panel D shows a schematic representation of linker polynucleotides where the binding region has additional chemical modifications for protection purposes. Panel F shows a linker where region (2) has additional chemical modifications.

In several embodiments, the linker polynucleotide is made of a first strand and a second strand (see e.g. Example 1, FIG. 1, and Example 17, FIG. 23, Panels A, Be C and F).

In several embodiments, the linker polynucleotide is made of a single strand forming a hairpin. (see e.g. Example 17, FIG. 23, Panels D and E). In particular in some these embodiments, the hairpin comprises a hairpin loop and a hairpin stem the toehold is formed by the hairpin loop, the duplex protected labeling polynucleotide domain is formed by the hairpin stem, and the nanomaterial attaching moiety is formed by a remaining region of the single strand. In some embodiments, the hairpin stem is formed by a first region of the single strand paired to a second region of the single strand, and wherein the remaining region of the single strand comprises a first strand portion on the side of the first region of the single strand and a second strand portion on the side of the second region of the single strand. (see e.g. Example 17 FIG. 23 Panel D). In some embodiments, the hairpin stem is formed by a first region of the single strand paired to a second region of the single strand, and wherein the remaining region of the single strand comprises a strand portion on the side of the first region of the single strand (see e.g. Example 17 FIG. 23 Panel E). In some embodiments, the hairpin stem has a length of at least five base pairs.

In several embodiments, the polynucleotide linker configuration is such that the toehold moiety can comprise a chemical linker moiety configured to specifically attach a corresponding moiety presented on the polynucleotidic platform, and the nanomaterial attaching moiety is one or more single polynucleotide strands or a chemical linker moiety configured to specifically attach a corresponding moiety presented on the nanomaterial (see e.g. Example 17 FIG. 23 Panel C).

In several embodiments, a nanoassembly comprising a linker polynucleotide and a nanomaterial of interest is formed by noncovalent attachment of a nanomaterial structure to a polynucleotide linker structure. The noncovalent attachment can be formed, for example, when single-stranded DNAs (ssDNAs) such as a poly-T dispersal domain of a polynucleotide linker structure is sonicated in the presence of nanomaterials such as carbon nanotubes. This causes noncovalent attachment of the polynucleotide to the nanomaterial attachment via physisorption of polynucleotide bases to nanomaterial sidewalls [4] and causes the nanomaterials to disperse [2] in aqueous This non-specific interaction allows noncovalent attachment of polynucleotide labels to nanomaterials without disrupting their electronic properties [35] and provides a simple route to polynucleotide linker-nanomaterial structures. An exemplary method for assembling a linker polynucleotide with a nanomaterial is illustrated in Example 2.

In some embodiments, additional covalent or non-covalent chemistries for attaching a polynucleotide can be employed that depend on the specific nanomaterial to be attached and are identifiable by a skilled person upon reading of the present disclosure.

In several embodiments, the linker polynucleotide is configured to allow attachment of the related nanoassembly to a polynucleotide platform presenting hook polynucleotides.

The term "polynucleotidic platform" as used herein indicates a structure formed at least in part by a polynucleotide, which is suitable to carry a nanomaterial attached to the structure or a portion thereof. Polynucleotidic platforms of the present disclosure include a polynucleotide template which forms the backbone of the platform and a hook polynucleotide presented on the platform for binding with a corresponding linker polynucleotide.

Exemplary, polynucleotidic templates include but are not limited to 2D structures e.g. DNA origami, DNA ribbons, nanoscale polyhedra [17, 18, 19, 20]. Some of these structures are known and have been also used to organize nanoparticles or proteins [21, 22, 23, 24, 25], and self-assemble 1D electronic devices [8].

In several embodiments, polynucleotidic template can take the form of origami. For example, one type of polynucleotide platform is a DNA origami, which is a nanoscale folding of DNA to create nanoscale shapes, taking advantage of the specificity of interactions between complementary base pairs between different DNA strands in the origami. To produce a desired DNA origami shape, for example, images are drawn with a raster fill of a single long DNA molecule. This design is then fed into a computer program (such as SEQUIN) which calculates the placement of short individual DNA staple strands. Each staple binds to a specific region of the DNA template, and thus due to Watson-Crick base pairing the necessary sequences of all staple strands are known and displayed. The DNA is mixed and then heated and cooled. As the DNA cools the various staples pull the long strand into the desired shape. Designs are directly observable via several methods including atomic force microscopy, or fluorescence microscopy when DNA is coupled to fluorescent materials.

Several origami scaffolds can be provided including at least one template component formed by a polynucleotide scaffold strand. In some embodiments, the polynucleotide template is a long (≥7000 bases), and in particular approximately 7400 nt. single stranded polynucleotide strand that is folded and organized into a structure, often planar, by a plurality of polynucleotide staples. The polynucleotide template may be linear or circular. Polynucleotide template structures coupled with polynucleotide staples are highly versatile and can be a variety of shapes and sizes according to the requirements of their use. For example, DNA templates have been built that are rectangular, circular, or that have complex and stylized designs such as a "smiley face".

In several embodiments, scaffolded DNA origami [29] allows construction of arbitrary, about 100 nm, 2D shapes that can display desired patterns of 200 chemical modifications with about 6 nm resolution. Additionally, in several embodiments, trillions of origami can be self-assembled in milliliter reaction volumes in a single step. Accordingly, in several embodiments DNA origami can be used to organize SWNTs into desirable device architectures [30, 31, 32, 33] in polynucleotidic scaffolds that are suitable to form a polynucleotidic platform herein described.

In several embodiments, polynucleotidic template can take the form of ribbons. Polynucleotidic ribbons are comprised of multiple units/tiles each formed by two long strand and two short strands arranged in a tile shaped structure such as the one illustrated in Example 11. In particular, DNA ribbons are one of the most robust forms of algorithmic self-assembly and are made using double crossover (DX) molecules/tiles as their main component. The DX molecules/tiles are made of four or five ssDNA conformed in a four arm junction that forms the basic structure (see [61] and [62]). Many different kinds of tiles can be manufactured on the basis of this basic structure and are used in structural DNA nanotechnology applications. Those additional structures are identifiable by a skilled person and are all comprised in the scope of the present disclosure.

In some embodiments, polynucleotide ribbon although cannot display the arbitrary patterns of hooks that origami do can be very long one and improve the angular alignment of SWNTs to ribbons. This approach allows fabrication of dense arrays of parallel, long SWNT arrays with a controlled spacing between the individual SWNTs. In some embodiments, the ribbons can be modified to introduce a binary counter pattern and is described in ref. [47].

Additional polynucleotide templates are identifiable by a skilled person and comprise the templates indicated in [63] and [64] each incorporated herein by reference in its entirety, and further additional templates identifiable by a skilled person upon reading of the present disclosure.

Polynucleotidic platforms comprising polynucleotidic templates can be formed by altering structural components of the template, such as multiple staples in origami, or any of the polynucleotide strands in ribbons or other platforms, to introduce the polynucleotide hook as illustrated in detail below. In those embodiments formation of the template is usually performed by allowing self assembling of the template component into the platform, wherein location, sequence, length and possible modification of the hooks is such that upon assembly a linker polynucleotide binding moiety is presented on the platform for specific binding to a corresponding toehold binding moiety of the linker polynucleotide. In other embodiments, hook polynucleotides can be placed on the template following assembling of the template according to the original or a modified structure. In those embodiments, attachment of the hooks to the template can be performed by base pairing of polynucleotides and/or by reacting corresponding moieties presented on the hook and the linker to be attached and that able to specifically bind each other.

In several embodiments, wherein the hooks are added through modification of template components and/or by subsequent addition of hooks to a template, the location, sequence, length and possible modification of the hook polynucleotides can be designed to minimize impact on the structural integrity of the platform according to approaches exemplified in Example 16 and identifiable by a skilled person upon reading of the present disclosure. For example, preservation of the integrity of the template can be performed by taking in account the topology of the B-form DNA duplex where torsional stress or helical disruption can be introduced if to the periodic twist of the DNA backbones in the helix and its asymmetry due to the presence of major and minor grooves is not taken in account. An exemplary indication of strain in a DNA nanostructure is described in [20] herein incorporated by reference in its entirety and in particular in sections 215 to 220 wherein some general design parameters are outlined.

In several embodiments, the platform herein described present hook polynucleotides for binding with linker polynucleotides. In particular, a hook polynucleotide comprises a polynucleotidic template binding moiety configured to allow attachment of the hook polynucleotide to the polynucleotidic template; and a linker polynucleotide attaching moiety configured to allow attachment of the hook polynucleotide to a linker polynucleotide of the nanoassembly The hook configuration and morphology is dependent on the linker configuration and morphology. In some embodiments, wherein the toehold moiety is a single stranded polynucleotide, the linker polynucleotide attaching moiety has to be complementary to the linker toehold region and if the linker polynucleotide comprises a labeling domain configured to bind to the hook polynucleotide, the linker polynucleotide attaching moiety also has to be complementary to the portion of the labeling domain other than the toehold moiety.

In several embodiments, a hook linker polynucleotide attaching moiety can base pair with any single stranded DNA or modified polynucleotide forming a linker polynucleotide that is attached to the nanomaterial. Similarly, a hook polynucleotidic template binding moiety can base pair with any single strand or modified polynucleotide forming part or attached to a specific polynucleotidic template of choice. Specific examples of hooks and related binding to a platform and a linker are shown in Example 18. In particular, a hook polynucleotide can be attached via base pairing to a scaffold strand of an origami. For example, the 5' or 3' end of a staple strand in a DNA origami could be extended. Alternatively, the hook may be attached via base pairing to other short DNA strands comprising the platform. For example, in a platform assembled from DNA tiles, one of the DNA strands in a selected tile could be extended. Alternatively, a hook could be attached via base pairing to a single stranded DNA region or a single stranded DNA hook that already exist on the platform. This could be used to adapt one set of hooks to bind a different polynucleotide linker than their original intended targets. Alternatively, a multi branched polynucleotide strand can be synthesized. For example, a DNA staple in a DNA origami can have a single stranded extension covalently attached to its backbone. A DNA staple having a single stranded extension is available for purchasing from some DNA synthesis companies.

In some embodiments, alternatively or in addition to the base pairing, a covalent or non-covalent chemical linkage (other than base pairing) can be used to attach a hook to a linker and/or to a platform through the linker polynucleotide attaching moiety and polynucleotidic template binding moiety respectively. In particular, in several embodiments, the linker polynucleotide attaching moiety comprises a chemical linker moiety configured to specifically attach a corresponding moiety presented on a corresponding toehold region of the linker polynucleotide of the nanoassembly. In several embodiments, the polynucleotide template binding moiety comprises a chemical linker moiety configured to specifically attach a corresponding moiety presented on the polynucleotidic template For example, in several embodiments, a same or different chemical linker can form either one or both the linker polynucleotide attaching moiety and polynucleotidic template binding moiety of the hook polynucleotide. In those embodiments corresponding moieties capable of specific binding to the chemical linker are comprised on the toehold moiety of the linker polynucleotide and on the polynucleotidic template respectively. Exemplary moieties able to specifically bind to each other include but are not limited to ligand-receptor, antigen-antibody, streptavidin biotin and additional moieties all identifiable by a skilled person.

In several embodiments, the hook polynucleotide is attached to the polynucleotidic template in a configuration that allows the hook polynucleotide to project out of the plane. In particular, in some of those embodiments the linker polynucleotide attaching moiety of the polynucleotide hook is adjacent to the polynucleotidic template binding moiety. In other embodiments, the linker polynucleotide attaching moiety of the polynucleotide hook is spaced from the polynucleotidic template binding moiety.

In several embodiments, wherein the hook polynucleotide projects out of the template plane and the linker polynucleotide attaching moiety of the polynucleotide hook is spaced from the polynucleotidic template binding moiety, the hook polynucleotide can comprise a spacer region interposed between the template and the linker polynucleotide attaching moiety. (see e.g., Example 19, FIG. 25, panes A and B). In particular, the spacer region in the hook polynucleotide can be 4 to 5 nt or more. In some of those embodiments inclusion of a spacer region o improve presentation of the hook polynucleotide on the platform. In particular, length and sequence of the spacer can be selected based on the polynucleotide helical twist (10.5 bases per turn) to control the angle and orientation of the hook on the platform. In particular, in some embodiments angle and orientation are selected to present hooks on both sides of the origami template. In particular, this can be performed taking into account that the DNA duplex has a helical structure so the orientation of the hook is determined by the angle at which it emerges from the double-stranded region of the origami. Adjusting the angle can therefore be performed by changing the length of the staple within the origami.

Figure 24:
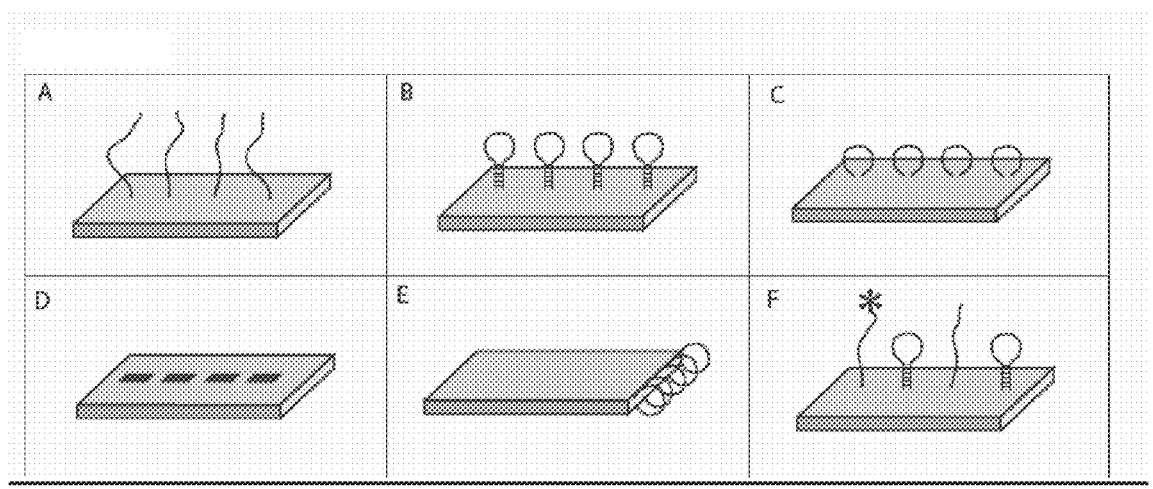
FIG. 24 shows a schematic representation of hook polynucleotides according to some embodiments herein described. In particular, Panel A shows a schematic representation of a single stranded hook polynucleotide with one end attached to the platform. Panel B shows a schematic representation of a row of hairpins acting as hooks. Panel C shows a schematic representation of a row of single stranded regions on the platform acting as hooks. Panel D shows a schematic representation of duplex regions on a DNA platform serving as attachment points for DNA linkers. Panel E shows a schematic representation of DNA hooks positioned on the side of a DNA platform. Panel F shows a schematic representation of multiple types of DNA hooks presented on a single DNA platform.
Figure 25:
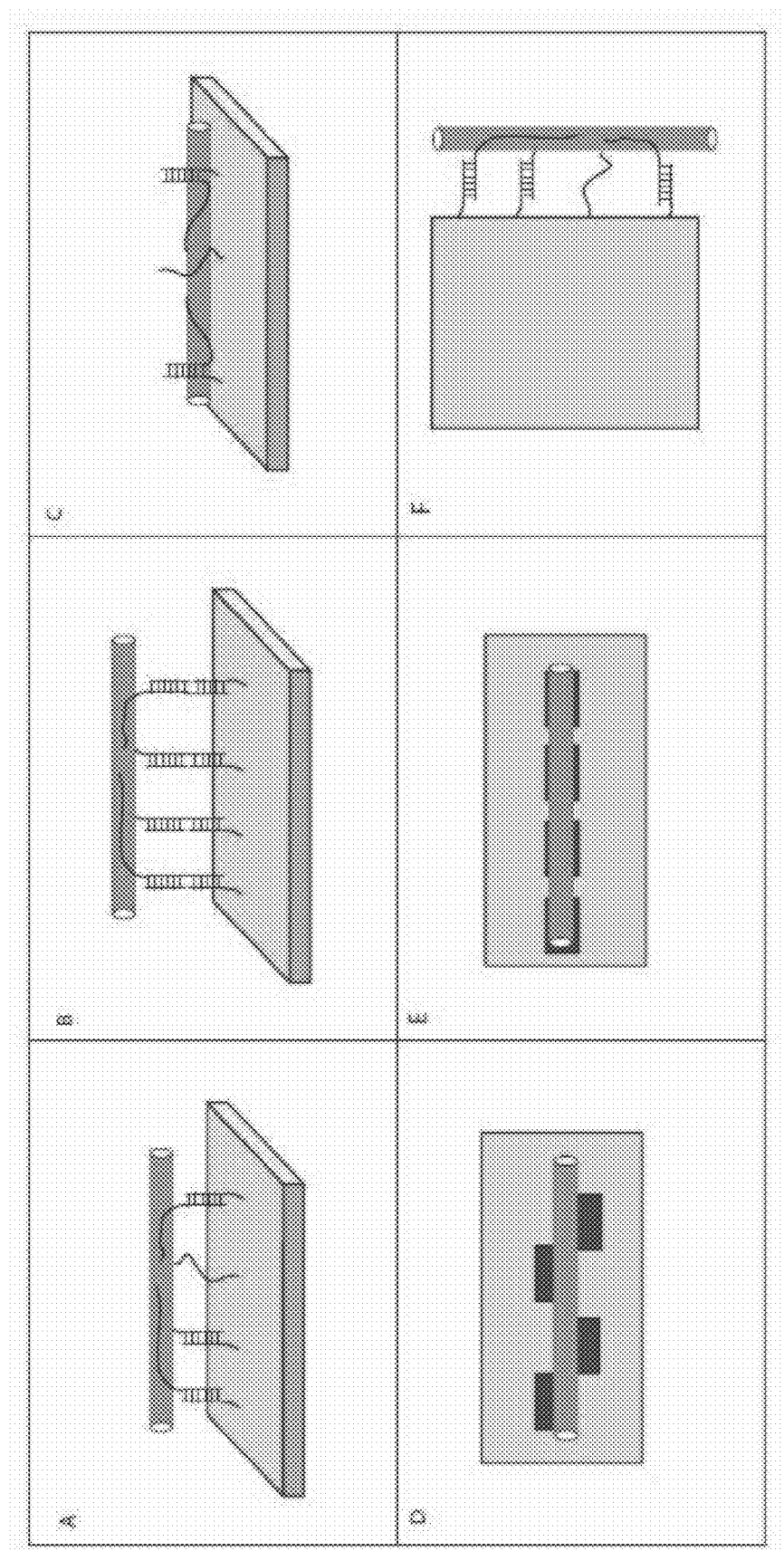
FIG. 25 shows a schematic representation of structures according to some embodiments herein described. In particular, Panel A shows a schematic representation of a DNA hooks from FIG. 24 Panel A binding to a corresponding linker. Panel B shows a schematic representation of a DNA hook binding to a toehold segment on a corresponding DNA linker. Panel C shows a schematic representation of a DNA hook binding to a toehold region of a corresponding linker. Panels D and E shows a schematic representation of nanotubes bound to hooks arranged in a row or in staggered configurations. Panel F shows a schematic representation of a nanotube bound to the side of a platform.

In some embodiments, the hook polynucleotide projects out of the template plane and the linker polynucleotide attaching moiety of the hook polynucleotide is adjacent to the polynucleotidic template binding moiety (see e.g., Example 19, FIG. 25, panel C). In some embodiments, in the platform the hook polynucleotide comprises duplexes regions (see e.g., Example 18, FIG. 24, panel C). In several embodiments, the hook polynucleotide is made of a single strand forming a loop (see e.g. Example 18, FIG. 24 panel C). In several embodiments, the polynucleotidic template binding moiety is a single stranded polynucleotide configured to allow attachment of the hook polynucleotide to the polynucleotidic template via base pairing. (see e.g., Example 18, FIG. 24 panel A).

In some embodiments, in the platform the hook polynucleotide is made of a single strand forming a hairpin (see e.g., Example 18, FIG. 24, panel E). In particular, in several embodiments, the hairpin comprises a hairpin loop, and the linker polynucleotide attaching moiety is formed by the hairpin loop. (see e.g., Example 18, FIG. 24 panel B). In some embodiments, in the platform the hook polynucleotide is on the polynucleotidic template (see e.g., Example 18, FIG. 24, panel D). In some embodiments, in the platform the hook polynucleotide is on a side of the polynucleotidic template (see e.g., Example 18, FIG. 24, panel E).

In several embodiments, hook polynucleotides can be placed on the polynucleotidic template of choice by modifying one or more of the polynucleotidic template components to include the hook polynucleotide in a configuration that allows presentation of the hook polynucleotide on the platform upon assembly of the template components. In particular in several embodiments where the platform is based on an origami scaffold, the hook polynucleotide can be attached to the 3' attaching the toehold hook region of the hook polynucleotide (see Example 5). In several embodiments, where the platform is based on a polynucleotide ribbon the hook can be attached to the 3' a long strand of a DNA tile which can attach the toehold region of hook polynucleotide (see Example 5).

Alternatively, a DNA staple in a DNA origami can have a single stranded extension covalently attached to its backbone. Alternatively, a covalent or non-covalent chemical linkage (other than base pairing) can be used to attach a hook to a platform. Another possible modification for strands in a DNA tile or staples of the origami is polynucleotide internal chemical modification. For example, polynucleotides could have internal biotin functionalizations. A biotin functionalized DNA hook could be attached to each biotin functionalized DNA tile via an intermediary Streptavidin. Other linker chemistries included disulfide bonds, acrodite-amine linkages, CLICK compatible chemistries and all chemistries that are (i) able to function in an aqueous solution at (ii) pH 6-9 and (iii) with salt concentrations tolerable by the self assembled platform (iv) at a temperature below the melting temperature of the platform and (v) will not react non-specifically with other chemical moieties that comprise the platform.

The platform can then be provided by allowing assembling of the template components following procedures such as the ones exemplified in Example 6 and to additional procedures identifiable by a skilled person upon reading to the present disclosure.

In several embodiments, the polynucleotidic platform is based on the "tall rectangle" origami [29], formed by about 200 DNA staples that fold a long scaffold strand into the desired sheet of B-form helices. In some of those embodiments, the sequence of each staple is 20 nucleotides or longer (typically about 32 bases) determines its unique position in the sheet.

In some of those embodiments hooks projecting into the plane defined by the scaffold and hooks projecting out of the same plane can be added to the origami by adding the hook at one end of the staples. In particular, in embodiments where the original design comprises staples whose end is configured in a direction different from a desired one for the hook, such end can be shifted of by adding a spacer (e.g. a four thymine spacer) designed to impart the polynucleotide a certain number of turns (e.g. a half a turn—5 nucleotides—to change orientation of 180°) to position it with a desired angle and orientation, and concatenated the e hook sequence onto the end. Between each hook and staple sequence In an embodiments, where the scaffold is an origami a typical number of polynucleotide staples is ~200, but the number can be in a range of 100-1000. In particular, in several embodiments rectangular origami templates (75 nm×95 nm) that display two lines of single stranded DNA "hooks" in a cross pattern with 6 nm resolution. These lines serve as sequence-specific binding sites for two types of modified SWNT. Each type is coated noncovalently by a distinct DNA molecule whose hook binding domain is protected to ensure efficient hybridization.

Additional polynucleotide platforms include any arbitrary two or three dimensional nanoscale shape comprising polynucleotides.

In several embodiments, platforms are used in combination with the nanoassemblies herein described to arrange nanomaterial into desired shapes. In particular, in several embodiments, structures and methods are provided for aligning polynucleotide linker-nanomaterial structures along lines of complementary single-stranded hooks [34] on a polynucleotide platform. Multiple populations of polynucleotide linker-nanomaterial structures with different properties (semiconducting or conducting, length-sorted, or chemically modified) can be labeled with different sequences, and self assemble simultaneously into a complex device geometry defined by the layout of lines on a polynucleotide platform.

In several embodiments, a method for arranging nanomaterials is provided. The method comprises providing a polynucleotide platform with protruding hook sequences projecting out of a plane defined by the platform. Nanoassemblies herein described attaching the nanomaterial of interest are then contacted with the platform to allow hybridizing the polynucleotide linker to a hook polynucleotide, thus producing nanomaterials arranged on a polynucleotide platform.

In particular, a polynucleotide platform can be mixed in solution with a polynucleotide linker-nanomaterial structure. The term "mix" as used herein indicates addition of one solution comprising a molecule of interest with another solution comprising another molecule of interest. For example, an aqueous solution of polynucleotide linker-nanomaterials may be mixed with an aqueous solution of polynucleotide platforms in the context of the present disclosure. Alternatively, assembly can be performed on surface. For example, origami can be positioned on the substrate first, and then the nanotube solution can be introduced on the substrate. In this method the nanotubes assemble on DNA nanostructures already pre-positioned on substrate. The term "solution" as used herein indicates any liquid phase sample containing molecules of interest. For example, an aqueous solution of polynucleotide platforms may comprise polynucleotide platforms diluted in water or a buffered solution.

In several embodiments, where the labeling domain of the polynucleotide linker comprise protection strands, the protection strands can be removed during hybridization of the labeling domain with the polynucleotide hooks on the polynucleotide platform (see Example 8). Thus, throughout the process, single stranded polynucleotide labels (such as the DNA linker labeling domain) remain almost completely protected until they bind the polynucleotide platform; only short "toehold" sequences are ever exposed as single stranded polynucleotides. The protection strand can be omitted in embodiments where other strategies are used such as a one strand approach described in FIG. 23 panel D and E where energetically stable hairpin structures are used to protect the labeling region rather than a second DNA strand.

In particular, in some embodiments, the linkers and hooks are designed so that during hybridization, a polynucleotide hook complementary to the labeling domain binds first to the toehold and initiates branch migration; to allow the hook to displace the protection strand and bind to the entire labeling domain [40, 44]. In particular, since branch migration efficiency increases with toehold binding stability [45], toehold regions can be designed to increase stability, e.g. by using locked nucleic acids (LNA) or similar nucleic acids (see Example 8).

Additional interactions between the linker polynucleotide attaching moiety and the toehold moiety are exemplified in Example 19.

In some embodiments, nanomaterials such as SWNTs can be dispersed into a solution, e.g. an ultrasonic bath, with polynucleotide linkers such as DNA linkers for a time and under condition to allow minimizing disruption of the duplex DNA section of the linker structure. The nanoassemblies are then incubated together with platform formed e.g. by DNA nanostructure templates (e.g. origami and/or ribbons) projecting hooks, to form composite structures in an appropriate solution (e.g. a sodium ion solution) (see Example 8).

Several embodiments encompassing a solution-based self-assembly allow preservation of the DNA nanoscaffold and the geometric arrangements of SWNTs during the transfer from solution to a dry substrate. Hence, the process is compatible with standard semiconductor fabrication techniques and could serve as a bridge between bottom-up and top-down nanofabrication technologies. In those embodiments a large number of SWNT-origami structures synthesized (between approximately 1 billion to approximately 100 trillion and in particular from approximately 50 billion to approximately 500 billion devices per liter of solution) can be produced and deposition of the structures on different substrates can be performed as further described in the present disclosure. For large scale integration the origami can be organized onto the substrate prior to SWNT assembly and length sorted SWNTs could be used to address problem with parasitic connections.

In several embodiments, multiple populations of NL-SWNTs with different properties (semiconducting or conducting, length-sorted, or chemically modified) could be labeled with different sequences, and self-assemble simultaneously into a complex device geometry defined by the layout of lines on an origami or ribbon platform.

In several embodiments the nanomaterial is arranged in the structure to contact the polynucleotide template (see e.g., Example 19, FIG. 25, panels C, D and E). In some embodiments the nanomaterial is arranged in the structure to be distanced from the template (see e.g., Example 19, FIG. 25, panels A and B). In several embodiments, in the structure one or more hook polynucleotides are on the template plane in a staggered configuration, and the nanomaterial is located between the one or more hook polynucleotides on the template plane. (see e.g., Example 19, FIG. 25, panel D). In several embodiments, in the structure, one or more hook polynucleotides are on the template plane in a lined-up configuration, the nanomaterial is located on the hook polynucleotides (see e.g., Example 19, FIG. 25, panel E)

Strand displacement-mediated deprotection and binding can yield alignment of nanomaterial and in particular SWNTs into various structure 3D assembled structures. For example, cross junctions, field effect transistors (FET) sandwiched 3D device stacks with layers of origami stacked together on top of each other and other structures identifiable by a skilled person <Q please describe>

In embodiments where the structures formed are cross-junctions, formation can be shown by suitable detection techniques such as AFM, different types of electron microscopy (SEM, TEM, CryoTEM etc.), fluorescence and additional techniques identifiable by a skilled person Several SWNT cross-junctions formed by the methods herein described can then be electrically characterized; stable field effect transistor-like behavior demonstrated.

In several embodiments field effect transistors (FET) can be formed by self-assembling cross junction devices from two different SWNTs, e.g. in solution, and then by integrating standard electron beam lithography techniques to create metal contacts for electrical measurements.

Devices more complex than two nanotubes, such as logic gates or nanoelectromechanical memory elements [26, 27, 28] can also be synthesized rationally using methods and systems herein described.

In some embodiments DNA linker, origami composites structures could be extended to introduce other types of 1D nanotubes and nanowires such as CdS, silver, Si, titatia, eand additional nanowires identifiable by a skilled person.

Hence in several embodiments, polynucleotidic platforms herein described can be used as programmable nanobreadboards and in particular can be used to develop a rapid prototyping and production of complex nanomaterial structures and in particular SWNT structures.

In several embodiments incorporation in the assembly processes of methods for sorting SWNTs by length and electrical property [29, 30, 31], is associated with improving alignment of short SWNTs and the predictability of device characteristics. In particular, when the nanomaterial to be attached is formed by carbon nanotubes, the nanotubes have different chiralities which translate into different electronic properties which can be drastically different. For example, nanotubes can be metallic or semi-conducting and an appropriate combination has to be selected for a particular circuit element. For example, in a FET configuration herein described one metallic and one semiconducting nanotube are to be selected for an ideal cross junction formation.

In several embodiments, nanomaterials carried on a polynucleotidic platform herein described can be deposited on a substrate following arrangement on the platform. In particular, a substrate can be provided for the deposition of arranged nanomaterials, and the arranged nanomaterials can be attached on the substrate.

Suitable substrates include but are not limited to silicon, silicon nitride, diamond-like carbon on silicon, and additional material identifiable by a skilled person, Exemplary substrates include mica and $SiO_2$. Arranged nanomaterials can be further manipulated either under fluid or they can be dried. Polynucleotide platform structures may be retained or removed, leaving behind the deposited nanomaterials for subsequent use.

In several embodiments, the platform can be deposited on silicon/silicon dioxide substrates, by creating a negatively charged silicon/silicon dioxide surface is created using oxygen plasma and then attaching the platform formed e.g. by DNA nanostructure composites to the surface in presence of mixture of nickel, magnesium ions In certain embodiments, nanomaterials can be arranged using a system comprising a polynucleotide platform structure, a polynucleotide linker, and a nanomaterial structure. In some embodiments of the system, nanomaterials are arranged by mixing components of the system such as a polynucleotide platform structure and a polynucleotide linker-nanomaterial structure.

The systems herein disclosed can be provided in the form of kits of parts. For example, the nanomaterials can be provided separately from a suitable polynucleotide linker or already adsorbed to a suitable polynucleotide linker. A polynucleotide platform may also be provided together with or separate from a nanomaterial, a linker polynucleotide, and/or a nanoassembly. The components of the kit of parts can be included as a molecule alone or in a composition further including a suitable vehicles or diluents.

The term "diluent" or "vehicle" as used herein indicates a diluting agent which is issued to dilute or carry an active ingredient of a composition.

Additional components can also be included and comprise microfluidic chip, reference standards, buffers, and additional components identifiable by a skilled person upon reading of the present disclosure.

In the kit of parts herein disclosed, the components of the kit can be provided, with suitable instructions and other necessary reagents, in order to perform the methods herein disclosed. In some embodiments, the kit can contain the compositions in separate containers. Instructions, for example written or audio instructions, on paper or electronic support such as tapes or CD-ROMs, for carrying out the assay, can also be included in the kit. The kit can also contain, depending on the particular method used, other packaged reagents and materials (such as wash buffers and the like).

EXAMPLES

The methods system herein described are further illustrated in the following examples, which are provided by way of illustration and are not intended to be limiting. In particular, in the following examples, reference will be made to the schematic illustration of the FIGS. to provide an exemplary description of embodiments referred to assembly and arrangement of SWNTs. In the present disclosure reference is often made to SWNTs. A skilled person will be able to make and use the polynucleotides and related assemblies structures methods and systems with other nanomaterials in view of the present disclosure.

Example 1

Design and Formation of Linker Polynucleotides

Linker polynucleotides were designed according to the approach schematically illustrated in FIG. 1 In the illustration of FIG. 1, linker polynucleotides (11) and (21) are schematically shown in a representation where the main strand (16) and (26), and the protection strands (15) and (25) are indicated.

Oligos were purchased in lyophilized form from IDT DNA. Sequences of the oligos are shown in Table 1 where each sequence is shown together with the corresponding component of the linker polynucleotide to be formed and the corresponding relevant identifier in the schematic illustration of FIG. 1

TABLE 1

Linker polynucleotide sequences

| Linker portion | Sequence | SEQ ID NO | FIG. 1 element |
|---|---|---|---|
| Main strand | 5'TTTTTTTTTTTTTTTTTTTT TTTTTTTTTTTTTTTTTTGTT GCGAGGTCTTGC + C + G + A + C + A 3' | 1 | main strand (26) of linker polynucleotide (21) |
| Protection strand | 5' GCAAGACCTCGCAAC 3' | 2 | protection strand (25) of linker polynucleotide (21) |
| Main strand | 5' TTTTTTTTTTTTTTTTTTTT TTTTTTTTTTTTTTTTTATA CGGGGCTGGTTA + G + G + A + T + G 3' | 3 | main strand (16) of linker polynucleotide (11) |
| Protection strand | 5' TAACCAGCCCCGTAT 3' | 4 | protection strand (15) of linker polynucleotide (11) |

In the LNA nucleotides are written as +C+G+A, etc. All other nucleotides in this and the following examples are DNA.

In the main strands (26) and (16), sequences 5'GTTGC-GAGGTCTTGC+C+G+A+C+A3' (SEQ ID NO: 5) and 5'ATACGGGGCTGGTTA+G+G+A+T+G 3' (SEQ ID NO: 6) which correspond to the labeling domains (13) and 23) respectively, were computer-optimized [31] to minimize sequence complementarity, homology, and melting temperature differences with programs written in MATLAB available at http://www.dna.caltech.edu/DNAdesign/.

The strands were separately dissolved in water purified by a Milli-Q unit (Millipore) to form stock solutions at ~300 µM. A 2 M NaCl stock solution is created and filtered using 0.22 µm filters. For the complex of linkers (11) and (21), the main strand (16, 26) and the protection strand (15, 25) are mixed with NaCl stock solution and Milli-Q purified water to obtain 600 µL of dispersal solution with ~33 µM of the main strand (16, 26), ~36 µM of the protection strand (15, 25), and 0.1 M NaCl; the concentrations of the main (16, 26) and protection strands (15, 25) were chosen to give a 10% excess of protection strand (15, 25). This solution is put in a 0.6 mL PCR tube and annealed in an Eppendorf Mastercycler from 95° C. to 20° C. at 1° C. per minute. The protection strand/main strand partial duplex has a melting temperature $T_{melting}$ ~50° C. in our buffers.

Each of the resulting linker polynucleotides (11) and (21) is a two-stranded, partially-duplex complex that adsorbs onto a SWNT via a 40-base poly-thymine (poly-T) dispersal domain (12) and (22). Its 20 nucleotide labeling domain (13) and (23)

has a sequence specific and is complementary to a corresponding-hook polynucleotide on a DNA origami template as will be illustrated in Example 3 below. A 15 base protection strand (15) and (25) leaves 5 bases of the labeling domain unprotected. These 5 bases comprise the toehold (14) and (24), which is composed of locked nucleic acid (LNA). During the dispersal of SWNTs with the DNA linkers, the poly-T dispersal domain adsorbs on the SWNT while the protection strand prevents adsorption of the labeling domain.

Example 2

Formation of Nanoassemblies Including SWNTs

Nanoassemblies comprising SWNT were produced following the approach schematically illustrated in FIG. 1. In the illustration of FIG. 1, nucleic acid labeled SWNTS (NL-SWNTs) (10) and (20) are produced using DNA linkers (11) and (21) whose labeling domains (13) and (23) have different sequences (see example 1). Dispersal domains (12) and (22) of the linkers (11) and (21) bind the linkers to SWNTs (1) and (2); so that labeling domains (13) and (23) project into solution The two types of NL-SWNTs are created by using two different DNA linkers to disperse separate aliquots of High Pressure CO Conversion (HiPco) SWNTs.

In particular, to create the NL-SWNTs (11) and (21) of FIG. 1, ~1 mg of dry HiPco SWNTs were added to 400-600 µL of the dispersal solution of Example 1 in a 1.7 mL PCR tube. The tube is then placed in an ice-water bath and sonicated for ~90 min in a Branson 2510 sonicator (100 W). The water level inside the sonication chamber and the position of the PCR tube is adjusted to apply maximum sonication power to the sample. The temperature of the water bath is maintained at ~15° C. The SWNTs are sonicated until the solution turns a uniform gray color and all the SWNTs are completely solubilized. The solution is then centrifuged at 16,000 g for 90 min at 15° C. Following this step, the supernatant is retained while the insoluble condensate is discarded. This process yields a high concentration of well-dispersed NL-SWNTs as determined by AFM and TEM images.

After dispersal, the concentration of excess free linkers (which could poison later assembly) was reduced by electrodialysis, and monitored by spectrophotometry or gel electrophoresis as illustrated in Example 3.

Example 3

Removal of Excess Free Linker Polynucleotides

The dispersal procedure for creating NL-SWNTs of Example 2 leaves a large excess of free polynucleotidic linker complexes in solution that was reduced before self-assembly. In one typical experiment the post-purification concentration of free linker was reduced to 120 nM while the concentration of desired SWNT-attached linkers was 420 nM, a ratio of <1:3 and batch variation was considerable, e.g. concentrations of SWNT-attached linkers varied from 100 nM to 1 µM.

In particular, electrodialysis was applied using a Harvard Apparatus Electroprep system. A 500 µL Teflon fast dialysis tube is filled with NL-SWNT solution and capped at both ends with 50 kD MWCO cellulose ester dialysis membranes. The dialysis tube is then placed in the Electroprep tank. The tank was filled with 0.1 M $Na_2HPO_4$ buffer (filtered with a 0.22 µm membrane).

A constant current of 15 to 20 mA is applied across the electrodes of the Electroprep tank. The current was run for two hours. The electrodes were then disconnected and the tank was washed. Fresh buffer is added, the direction of the dialysis tube is reversed such that the membrane facing the cathode now faces the anode, and the current is run for another two hours. Buffer exchange and current reversal are repeated two more times before retrieving the NL-SWNT solution (eight hours total of electrodialysis).

To retrieve the NL-SWNTs, the capped dialysis tube was washed using Milli-Q purified water and was then placed in a beaker with 0.1 M $Na_2HPO_4$ buffer and ultra-sonicated for 30 seconds to 1 minute in a Branson 2510 sonicator. This releases any NL-SWNTs stuck on the membranes back into the solution contained inside the dialysis tube. The tube was then uncapped and the purified NL-SWNT suspension was recovered using an appropriate pipette.

The UV absorbance at 260 nm was measured and compared to the absorbance of an unfiltered NLSWNT sample. The self-assembly of NL-SWNTs on a polynucleotidic platform was most efficient when the UV absorbance of the purified solution at 260 nm is <5% of that of the initial solution. If the UV absorbance was higher, or if assembly efficiency was poor, electrodialysis was repeated with fresh filter membranes and buffer. The eight hour dialysis process was repeated three times on the same sample. Immediately after purification, NL-SWNT solutions were divided into 50 pt aliquots and stored in a −80° C. freezer where they were stable for months. Room temperature storage or 4° C. storage causes aggregation and decreased binding to platform after a few days; −20° C. might afford stability for weeks or months but there has not been a systematic study of NL-SWNT stability as a function of storage temperature.

The method used to determine the stopping point for purification only addresses the decrease of the excess polynucleotidic linker and does not address the ratio of excess free polynucleotidic linker to polynucleotidic linkers bound to the SWNTs, which is the more important measure since it determines whether the remaining excess of free polynucleotidic linkers is so high that it saturates the polynucleotidic hooks on the polynucleotidic platform and prevents NL-SWNTS from binding to polynucleotidic platform. Thus gel-electrophoresis was used to evaluate this ratio for some batches of NL-SWNTs.

Non-denaturing polyarylamide gel electrophoresis (ND-PAGE) was used to estimate the amount of free polynucleotidic linker. Free polynucleotidic linkers migrated into the gel where they were quantified, while bound polynucleotidic linkers remained stuck on the carbon nanotubes that do not migrate from the well. 8% or 10% polyacrylamide gels were used (polymerized by 1% by volume of 10% ammonium persulfate (APS) and cross-linked by 0.075% by volume tetramethylethylenediamine [TEMED]) in a $1 \times TAE/Mg^{2+}$ buffer (40 mM Trisacetate, 1 mM EDTA, 12.5 mM magnesium acetate, pH 8.3). A constant field of 8 V/cm is applied across the gel (80 V, 10 cm length, I ~34 mA, 1 mm thick mini-gel) for 3-4 hours while the buffer temperature was kept at 15° C. A 10 base pair ladder (Invitrogen) was used in one of the gel lanes as a length reference. A lane of free polynucleotidic linker complexes is included to allow quantitation. Finally, the gel is stained with Sybr Gold (Invitrogen) for 25 minutes and imaged using a Bio-Rad Molecular Imager FX.

Denaturing PAGE (8%, 7 M urea, 175 V, 17.5 V/cm, 60° C., stained similarly to ND-PAGE) was used to estimate the total amount of polynucleotidic linker DNA in the sample after the electrodialysis procedure. The idea was that strong denaturing conditions and high temperature detach the polynucleotidic linkers from the nanotubes, so that the total can be measured. Here, a field strength of 17.5 V/cm seemed to be more effective at detaching polynucleotidic linkers than 8 V/cm. This could have been caused incidentally by greater heating, or perhaps the somewhat elevated field played a direct role since the carbon nanotubes do not migrate in the gel and are not free to move with the polynucleotidic linkers. From the total and the free polynucleotidic linker concentration, the amount of polynucleotidic linker bound to the carbon nanotubes was estimated (bound=total−free).

The amount of free and SWNT-bound polynucleotidic linkers varies between different preparations of NL-SWNTs; bound polynucleotidic linker typically ranged from ~100 nM to 1 μM.

As a specific example, for the batch of SWNTs projecting into the plane used to prepare the structure illustrated in Example 10, the concentration of polynucleotidic linker bound to SWNTs was estimated to be 420 nM and the concentration of free polynucleotidic linker was 120 nM, even after it had undergone a few freeze thaw cycles (and been used in successful experiments). This represents a free:bound polynucleotidic linker ratio of ~1:3. If the ratio is too high, then presumably free polynucleotidic linker will bind all polynucleotidic hook sites and prevent SWNTs from binding. Because NL-SWNTs bind polynucleotidic platform at multiple sites, some poisoning of these sites by free polynucleotidic linker may be tolerated. The highest ratio of free:bound polynucleotidic linker that is acceptable has not been determined.

Example 4

Design of Modified "Tall Rectangle" Polynucleotidic Platform Templates

The polynucleotidic platform used in these examples is a modified version of the "tall rectangle" designed by Rothemund as described in [20] herein incorporated by reference in its entirety (see in particular [20] Supplementary Information FIGS. S36 and S48)

Figure 2:
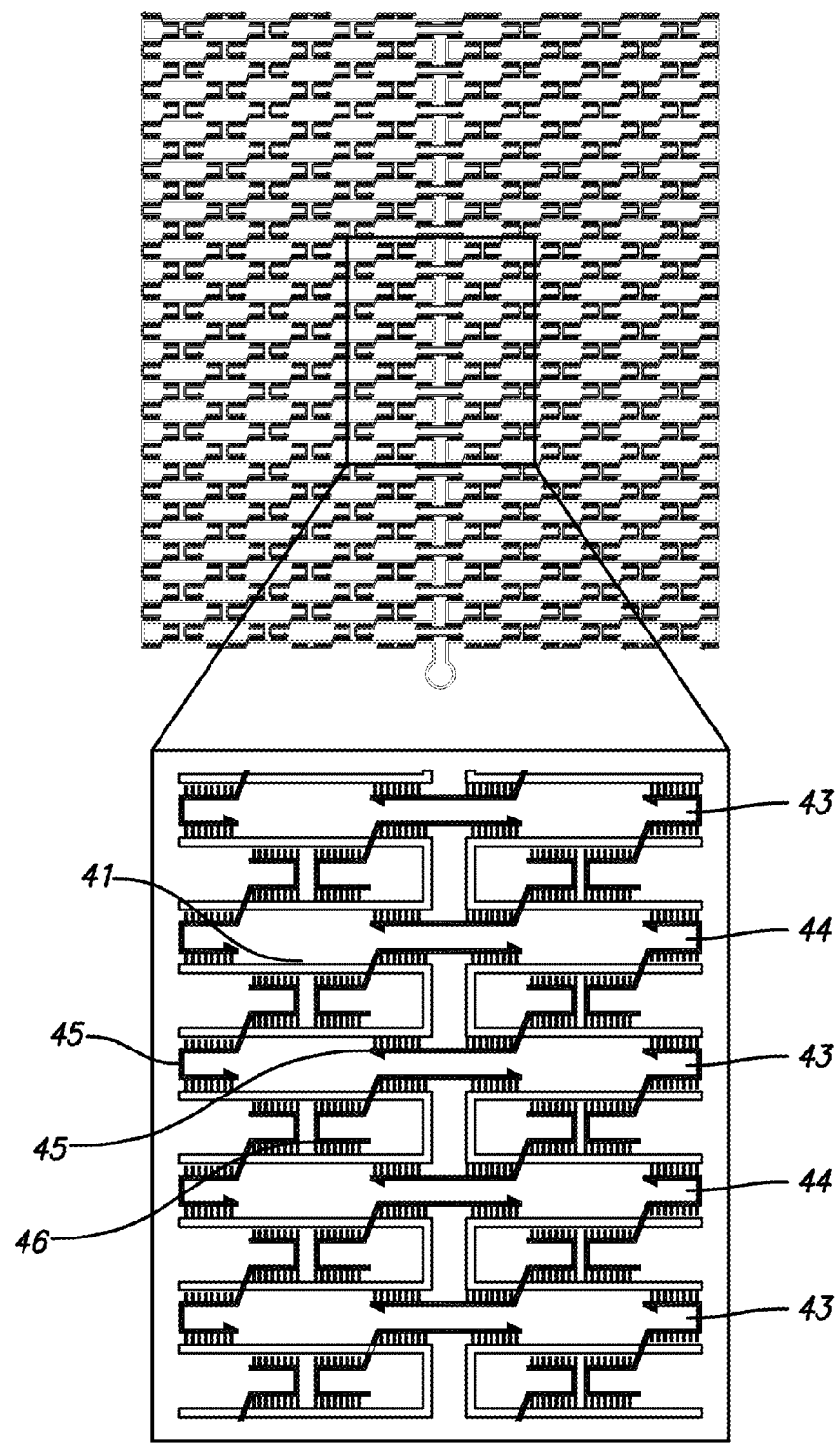
FIG. 2 shows a schematic illustration of a polynucleotidic scaffold suitable to be used in a polynucleotidic platform according to some embodiments herein described.

In particular, the template design is based on the "tall rectangle" origami, formed by ~200 DNA staples that fold a long scaffold strand into the desired sheet of B-form helices. The sequence of each staple (typically 32 bases) determines its unique position in the sheet [20]. A schematic illustration of the DNA origami Tall rectangle platform is also shown in FIG. 2, where exemplary scaffold strand (41) and staples (43), (44), (45), and (46), forming the origami template (40) are specifically indicated. The sequences for the original platform are shown in [20] FIG. S48.

Figure 3:
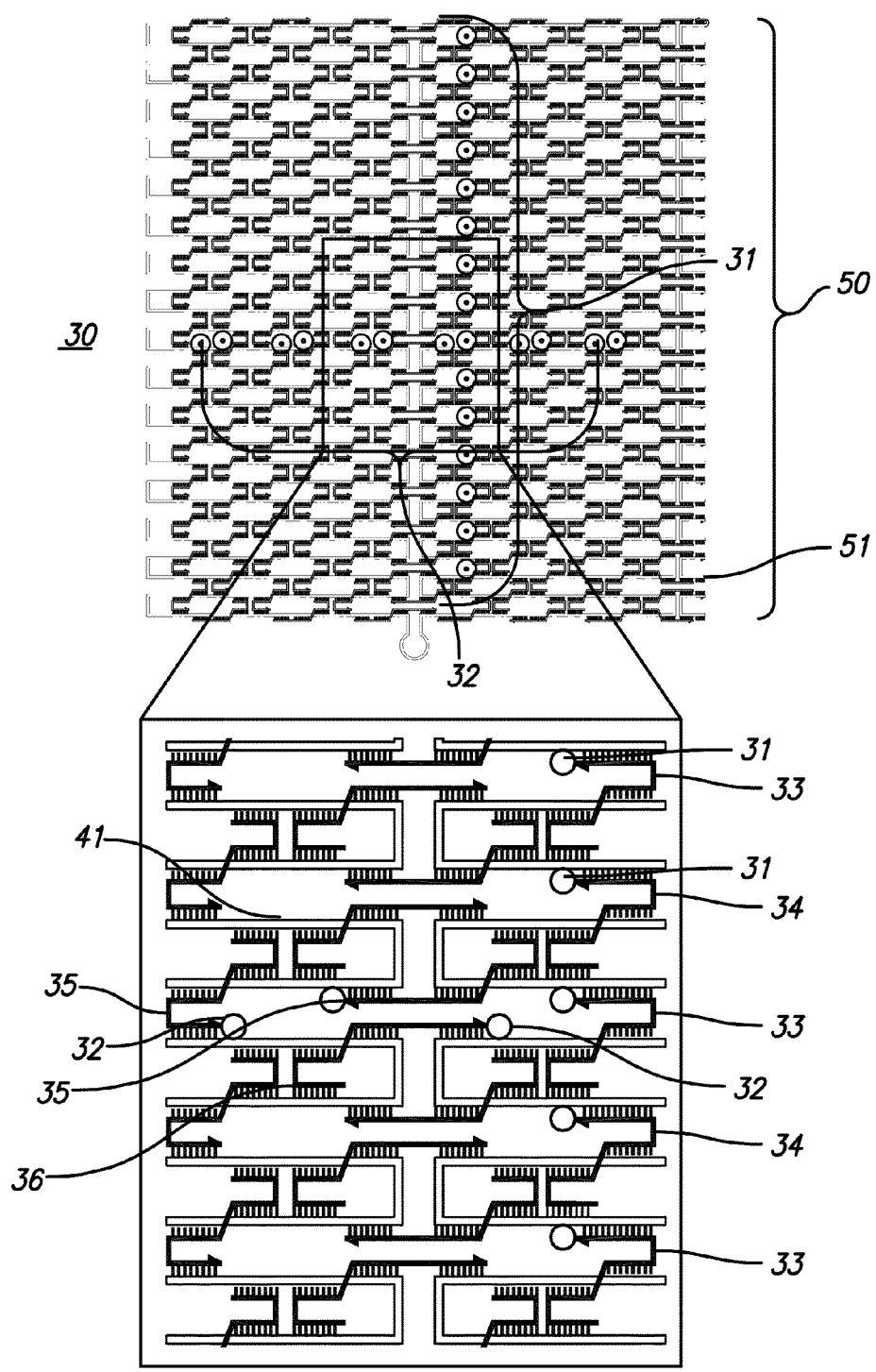
FIG. 3 shows a schematic illustration of a polynucleotidic platform comprising the scaffold of FIG. 2 modified according to some embodiments herein described.

Platform (40) of FIG. 2 was modified to include hook polynucleotides. In particular as schematically illustrated in FIG. 3, exemplary DNA staples (43), (44), (45), (46), (47) and (48) on scaffold (41) were replaced with DNA staples (33), (34), (35), and (36), which include staples (43), (44), (45), and (46), and a hook nucleic acids (31) projecting out of the plane formed by the origami template (30), and hook nucleic acids (32) projecting into the plane formed by the origami template (30).

The staples (33, 34) which are used for the column of (31) hooks are actually not quite simple catenations of original staples with the linker and hook sequence. The domain by which these staples bind the platform scaffold strand is actually shifted 5 nucleotides with respect to the binding domain which is used for the original staples—this can be observed in FIG. 3. It means that (i) the scaffold binding domain of each staple in the column of (31) hooks is actually a composite of two staples in the same column in the original platform, 5 nucleotides from one staple and 27 nucleotides from another and (2) one of the sequences (t1r0g-FHook2) does not actually bear a (31) hook-instead it is a staple on the top edge of the platform that had to be modified to accommodate the shift in strand ends implied by (1).

The sequence of each staple (typically 32 bases) determines its unique position in the sheet. Hence a DNA hook can be placed at any position by extending the 3' end of the appropriate staple. DNA helical twist (10.5 bases per turn) determines the angle of the backbone relative to the plane of the platform; this allows hooks to be added to either face. Applicants added a row of eleven (32) hooks to the bottom, and a column of sixteen (31) hooks to the top.

Some of the strands used to form the modified staples of the origami (30) are listed in Table 2 and Table 3, where the sequences plate position and names, as listed in the "Position and sequence" columns, correspond to the names of the original staples shown in Rothemund's FIG. S48 of [20] modified to include "FHook1" or "FHook2".

TABLE 2

Modified staples used to present the (31) ssDNA hooks

| SEQ ID NO. | Plate Position | Position and Sequence | Sequence |
| --- | --- | --- | --- |
| SEQ ID NO. 7 | B1 | t-5r18e-FHook1 | 5'TATATTTTCATACAGGCAAGGCAAAG CTATATTTTTGTCGGCAAGACCTCGC AAC3' |
| SEQ ID NO. 8 | C1 | t-3r18e-FHook1 | 5'CAACGCAAAGCAATAAAGCCTCAGG ATACATTTTTTGTCGGCAAGACCTCG CAAC3' |
| SEQ ID NO. 9 | D1 | t-1r18e-FHook1 | 5'CTGTAATAGGTTGTACCAAAAACACA AATATATTTTTGTCGGCAAGACCTCGC AAC3' |
| SEQ ID NO. 10 | E1 | t3r18e-FHook1 | 5'TATGTAAAGAAATACCGACCGTGTTA AAGCCATTTTTGTCGGCAAGACCTCGC AAC3' |
| SEQ ID NO. 11 | F1 | t5r18e-FHook1 | 5'TAACCTCCAATAAGAATAAACACCTA TCATATTTTTTGTCGGCAAGACCTCGC AAC 3' |

TABLE 2-continued

Modified staples used to present the (31) ssDNA hooks

| SEQ ID NO. | Plate Position | Position and Sequence | Sequence |
|---|---|---|---|
| SEQ ID NO. 12 | G1 | t-5r16f-FHook1 | 5'ATATAATGGGGCGCGAGCTGAAATTAACATCTTTTTGTCGGCAAGACCTCGCAAC3' |
| SEQ ID NO. 13 | H1 | t-3r16f-FHook1 | 5'TGCAACTAGGTCAATAACCTGTTTAGAATTAGTTTTTGTCGGCAAGACCTCGCAAC3' |
| SEQ ID NO. 14 | A2 | t-1r16f-FHook1 | 5'TCCATATATTTAGTTTGACCATTAAGCATAAATTTTTGTCGGCAAGACCTCGCAAC3' |
| SEQ ID NO. 15 | B2 | t1r16f-FHook1 | 5'AGAGGCATACAACGCCAACATGTATCTGCGAATTTTTGTCGGCAAGACCTCGCAAC3' |
| SEQ ID NO. 16 | C2 | t3r16f-FHook1 | 5'TAAAGTACCAGTAGGGCTTAATTGCTAAATTTTTTGTCGGCAAGACCTCGCAAC3' |
| SEQ ID NO. 17 | D2 | t5r16f-FHook1 | 5'CCAGACGACAAATTCTTACCAGTAGATAAATATTTTGTCGGCAAGACCTCGCAAC3' |

TABLE 3

The modified staples used to present the (32) ssDNA hooks

| SEQ ID NO. | Plate Position | Position and Sequence | Sequence |
|---|---|---|---|
| SEQ ID NO. 18 | A7 | t1r0g-FHook2 | 5'TGATATAAGTATAGCCCGGAATAGGTG-3' |
| SEQ ID NO. 19 | B7 | t1r2e-FHook2 | 5'GTCGGTAATAAGTTTTAACCCGTCGAGAGGGTTTTCATCCTAACCAGCCCCGTAT-3' |
| SEQ ID NO. 20 | C7 | t1r4e-FHook2 | 5'GAGACCCTCAGAACCGCCACGTTCCAGTAAGCTTTTCATCCTAACCAGCCCCGTAT-3' |
| SEQ ID NO. 21 | D7 | t1r6e-FHook2 | 5'GAGGTAGCACCATTACCATATCACCGGAACCATTTTCATCCTAACCAGCCCCGTAT-3' |
| SEQ ID NO. 22 | E7 | t1r8e-FHook2 | 5'ACGTAAAGGTGGCAACATACCGTCACCGACTTTTTCATCCTAACCAGCCCCGTAT-3' |
| SEQ ID NO. 23 | F7 | t1r10e-FHook2 | 5'AAAGATAACCCACAAGAATAAGACTCCTTATTTTTCATCCTAACCAGCCCCGTAT-3' |
| SEQ ID NO. 24 | G7 | t1r12e-FHook2 | 5'TGCACGCTAACGAGCGTCTGAACACCCTGAACTTTTCATCCTAACCAGCCCCGTAT-3' |
| SEQ ID NO. 25 | H7 | t1r14e-FHook2 | 5'CTGACCAAGTACCGCACTCTTAGTTGCTATTTTTTCATCCTAACCAGCCCCGTAT-3' |
| SEQ ID NO. 26 | A8 | t1r16e-FHook2 | 5'TTATTTCGAGCCAGTAATAAATCAATAATCGGTTTTCATCCTAACCAGCCCCGTAT-3' |
| SEQ ID NO. 27 | B8 | t1r18e-FHook2 | 5'GAAAATTTCATCTTCTGACAGAATCGCCATATTTTTCATCCTAACCAGCCCCGTAT-3' |
| SEQ ID NO. 28 | C8 | t1r20e-FHook2 | 5'AATCGTCGCTATTAATTAAATCGCAAGACAAATTTTCATCCTAACCAGCCCCGTAT-3' |

TABLE 3-continued

The modified staples used to present the (32) ssDNA hooks

| SEQ ID NO. | Plate Position | Position and Sequence | Sequence |
|---|---|---|---|
| SEQ ID NO. 29 | D8 | t1r22e-FHook2 | 5'CGTTCGGGAGAAACAATAACAGTAC<br>ATAAATCTTTTCATCCTAACCAGCCCC<br>GTAT-3' |
| SEQ ID NO. 30 | E8 | t1r24e-FHook2 | 5'AATGAACAAAGAAACCACCTTTTCAG<br>GTTTAATTTTCATCCTAACCAGCCCCGT<br>AT-3' |
| SEQ ID NO. 31 | F8 | t1r26e-FHook2 | 5'GCAAATCAATATCTGGTCACCCGAAC<br>GTTATTTTTCATCCTAACCAGCCCCGT<br>AT-3' |
| SEQ ID NO. 32 | G8 | t1r28e-FHook2 | 5'CAGATACGTGGCACAGACATGAAAA<br>ATCTAAATTTTCATCCTAACCAGCCCC<br>GTAT-3' |
| SEQ ID NO. 33 | H8 | t1r30e-FHook2 | 5'AGCCCTGAGTAGAAGAACTACATTCT<br>GGCCAATTTTCATCCTAACCAGCCCCG<br>TAT-3' |
| SEQ ID NO. 34 | A9 | t1r32h-FHook2 | 5'TACAGGGCGCGTACTATGGTTGCTAA<br>TTAACCGTTGTTTTCATCCTAACCAGC<br>CCCGTAT-3' |

In general, the sequences of the staples of the polynucleotidic platform (30) differ from the original staples of platform (40) by the addition, on the 3' end, of hook polynucleotides each comprising (i) a 4 thymine flexible linker and (ii) an appropriate hook sequence according to Table 4.

TABLE 4

(31) and (32) hook polynucleotides

| SEQ ID NO | Sequence | Hook polynucleotide | Corresponding linker labeling domain | SEQ ID NO | Corresponding linker polynucleotide |
|---|---|---|---|---|---|
| SEQ ID NO. 35 | 5'TTTTTGTCGGCAAG ACCTCGCAAC 3' | (32) | 5'GTTGCGAG GTCTTGCCGA CA 3' | SEQ ID NO: 5 | (23) |
| SEQ ID NO. 36 | 5'TTTTCATCCTAACC AGCCCCGTAT 3' | (31) | 5'ATACGGGG CTGGTTAGGA TG 3' | SEQ ID NO: 6 | (13) |

A schematic illustration of the resulting polynucleotidic platform is also shown in FIG. 4 wherein hooks (31) and (32) each including a 4 thymine flexible linker (311) and (321) respectively and (ii) an appropriate hook sequence (312) (322) respectively, each including a toehold (313) and (323) are indicated. Although in this example all hooks (31) or (32) have the same sequence, it would be apparent to a skilled person that hooks projecting out of the plane or into the plane can have same or different sequences according to the experimental design.

In the illustration of FIGS. 3 and 4, the ~7000 base long scaffold strand (41) and ssDNA staples forms a rectangular origami template with a row of eleven DNA hooks (32) that are projected to the bottom and a column of sixteen DNA hooks (31) that are projected to the top. Since in the original design of FIG. 2, all staple ends fall on the bottom; thus, to project (32) hooks down, Applicants concatenated the (32) hook sequence onto 3' ends of staples in the desired row. For each staple in the (31) hook column, Applicants shifted the staple's 3' end by half a turn (5 nucleotides) to position the hook (31) on top and concatenate the (31) hook sequence onto the end. Between each hook and staple sequence, inserted a four thymine spacer was inserted (see FIGS. 3 and 4).

In the illustration of FIGS. 3 and 4, the rightmost column of staples is replaced with DNA strands that nucleate growth of a ~100 nm wide, typically >500 nm long, DNA ribbon (50) via algorithmic self-assembly of DNA tiles (500) according to a procedure described for example in [18]. Addition of ribbons makes image interpretation easier and appeared to increase the deposition rate of SWNT/DNA constructs. The ribbons can be utilized as DNA templates for self-assembling the SWNTs as well. An exemplary process to add DNA ribbon structures to an origami template and to possibly include hooks on the ribbon structure so formed are illustrated in detail in the following Example 5.

Example 5

Design of a Modified "Tall Rectangle" Origami/Ribbon Template

A larger polynucleotidic template from the polynucleotidic platform was produced by growing a periodic structure from the edge of the polynucleotidic platform using DNA tiles assembled in DNA ribbon structures. The structures, known as zig-zag ribbons, were first described in [34] incorporated herein by reference in its entirety, and their nucleation and growth from platform was shown in [35] herein also incorporated by reference in its entirety.

Figure 5:
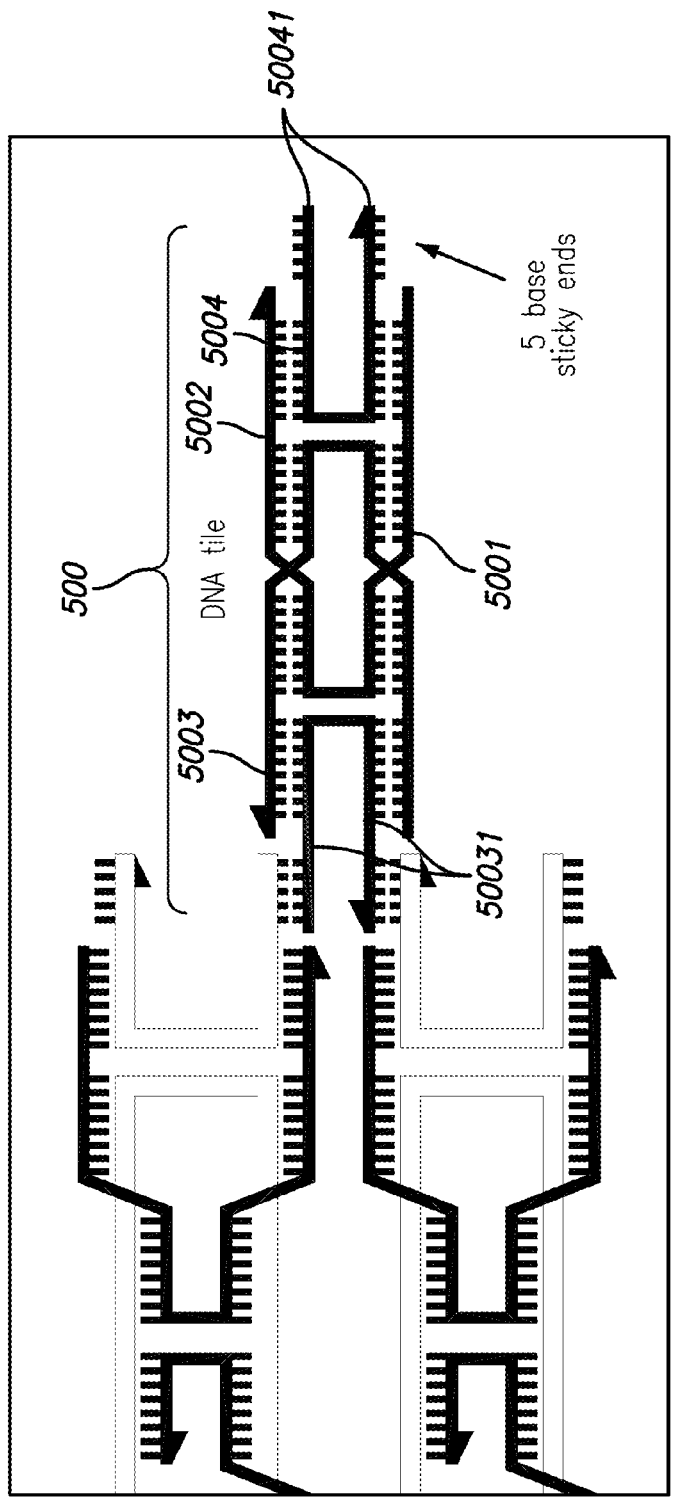
FIG. 5 shows a schematic illustration of a polynucleotidic scaffold and of a related method of manufacturing according to some embodiments herein described.

A schematic for a tile attached to a platform herein described is presented in FIG. 5. In particular, in the schematic illustration of FIG. 5, tile (500) comprise two long DNA helices (5001) and (5002) and two short helices (5003) and (5004) each having sticky ends (50031) and (50041) for attaching the tile to a preexisting structure or another tile. The DNA tiles are much smaller (~12 nm×4 nm) than a DNA platform (~95 nm×75 nm), but they can assemble into a much larger periodic ribbons, which are typically from 4-16 tiles wide and hundreds of tiles long. The long edge of the tall rectangle platform has 32 helices, so up to 16 DNA tiles can be fit onto the edge of the platform by using a set of adapter strands [35]. In platform herein described ribbon like structures can be grown by adding tiles that can be modified to include a hook polynucleotide.

Figure 6:
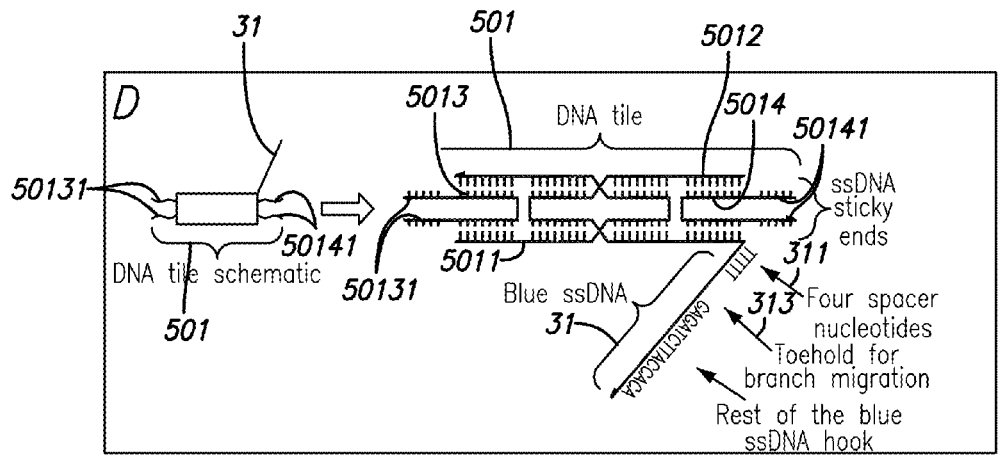
FIG. 6 shows a schematic illustration of a portion of a modified polynucleotidic scaffold according to some embodiments herein described and the related polynucleotidic template components.
Figure 7:
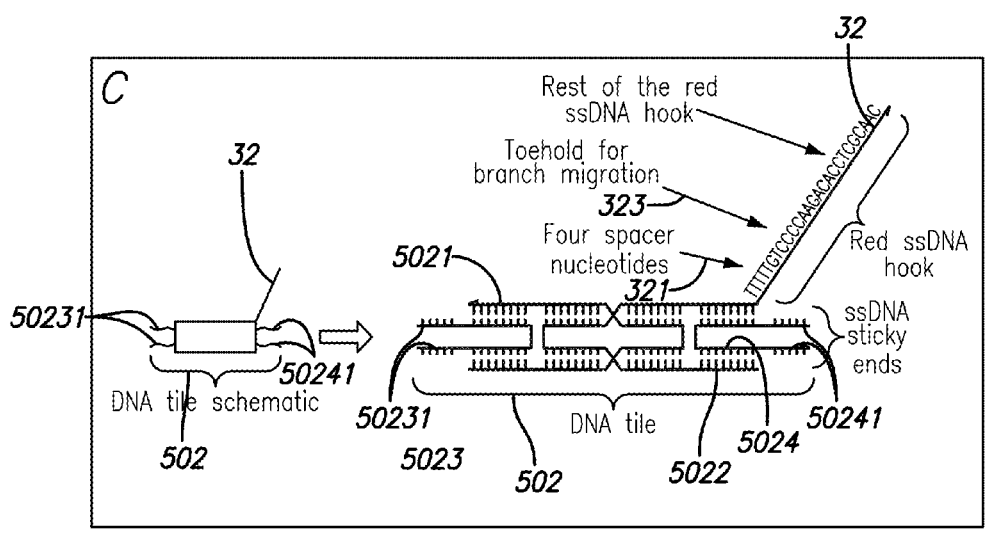
FIG. 7 shows a schematic illustration of a portion of a modified polynucleotidic scaffold according to some embodiments herein described and the related polynucleotidic template components.
Figure 8:
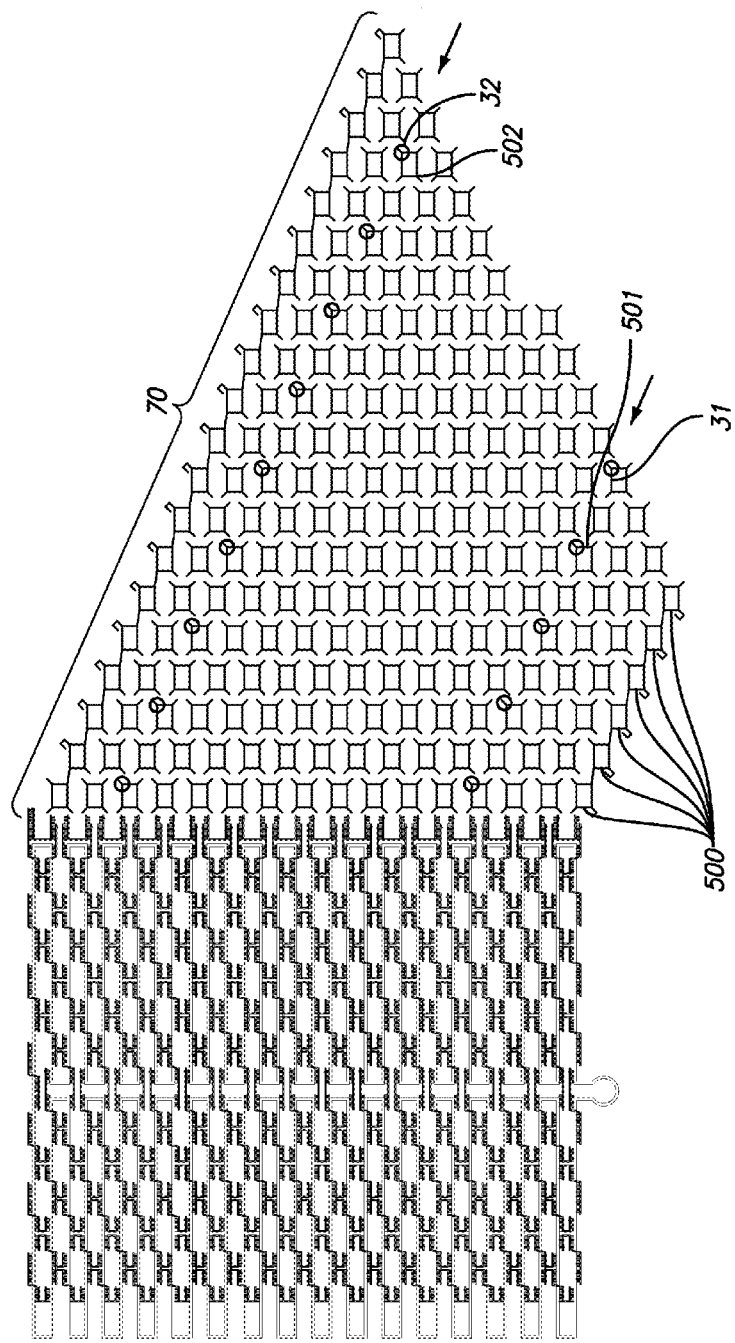
FIG. 8 shows a schematic illustration of a polynucleotidic platform according to some embodiments herein described.

A schematic representation of a DNA tile comprising a hook and related assembly in a ribbon structure is schematically illustrated in FIGS. 6, 7 and 8. In particular, in the schematic illustration of FIGS. 6 and 7 the DNA tiles (501) and (502) respectively presenting hooks (31) and (32) are shown. The DNA tiles (501) and (502) are each made from four single DNA strands: two long strands (5011), (5012) and (5021), (5022) of 37 nt, and two short strands (5013), (5014) and (5023), (5024) of 26 nt, which display 5-base sticky ends (50131) (50141), (50231) and (50241) for binding with other tiles.

In the schematic illustration of FIGS. 6 and 7 a hook (31) and (32) is respectively attached to long strands (5012) and (5022). In particular, long strands (5012) and (5022) have been modified to bind hooks (31) and (32) at their respective 3' end. In particular, hook (31) and (32) are bound to the tile with the spacers (311) and (321) that are thus located proximate to the tile. In the modified long strand (5012) and (5022), the binding portions (312) and (322) of the hooks (31) and (32) are attached to the spacer through binding of the toehold regions (313) and (323).

Here, 16-tile wide ribbons were used everywhere except for the experiments described in Example 9, where an 8-tile wide ribbon was used. Because the platform forms at higher temperatures than the assembly of tiles into zig-zag ribbons, platform serve as good nuclei for the growth of zig-zag ribbons-a cooled mixture of their component strands forms products that are almost entirely composed of DNA platform with crystalline zig-zag ribbons grown from their edge. The resulting ribbons are ~100 nm wide and typically 500 nm to 1 µm long. A schematic illustration of those ribbons is shown in FIG. 8, where ribbon (70) formed by, among the others, tiles (500), (501) and (502), the latter bearing hooks (31) and (32).

Ribbons (70) coupled to a platform are a highly visible marker for the orientation of the DNA platform (SWNT (1) or (2) face up), even when imaging resolution is low. Patterns of hairpins on the DNA platform could have served to disambiguate orientation, but experiments or analysis would have been much more challenging since they require higher resolution imaging. Qualitatively, more SWNT/DNA template structures were observed post-assembly when DNA platform/ribbon structures were used rather than platform alone; but this effect has not been quantified or explored.

Platform aggregate via stacking interactions between helix ends along their vertical edges. Thus, to provide ribbon (70) on origami (30) or 40 (40) applicants omitted the leftmost column of staples from the original design [29]; this resulted in a column of single-stranded loops that inhibited stacking (see right portion of FIG. 4). Also, Applicants replaced the rightmost column of staples with DNA strands that nucleated growth of a _100 nm wide, typically >500 nm long, DNA ribbon (FIGS. 4 and 8) via algorithmic self-assembly of DNA tiles described in [46, 47] incorporated herein by reference in their entirety. Addition of ribbons made image interpretation easier and appeared to increase the deposition rate of SWNT/DNA constructs. Applicants also used enzymatic ligation to covalently link adjacent short strands in the platform and ribbon [48] incorporated herein by reference in its entirety, which reduces platform/ribbon template fragmentation during deposition.

Exemplary procedures that can be used to assemble and purify an origami ribbon structure are illustrated in the following Examples 7 and 8.

Example 6

Assembly and Ligation of DNA Platform/Ribbon Templates

Short DNA strands were purchased from IDT DNA. Single-stranded M13mp18 bacteriophage DNA, T4 DNA Polynucleotide Kinase, and T4 DNA Ligase were purchased from New England Biolabs. DNA strands and buffers are mixed to obtain 50 µL of the following "assembly mixture". (Amounts of components are given as either the final concentration of that component, or the volume of that component added.)
1×TAE $Mg^{2+}$ (12.5 mM Mg-acetate, 40 mM Tris-acetate, 1 mM EDTA, filtered with a 0.22 µm filter)
1×T4 DNA ligase buffer (50 mM Tris-HCl, 10 mM $MgCl_2$, 1 mM ATP, 10 mM Dithiothreitol)
10 nM M13 mp18 bacteriophage DNA
50 nM of each platform staple
10 nM of each DNA ribbon adapter strand
100 nM of each zig-zag ribbon tile
3 µL T4 Polynucleotide Kinase The above reaction mixture is placed in a 0.6 mL PCR tube and incubated using the following temperature profile:
1) 37° C. for 1 hour
2) 65° C. for 20 minutes
3) 90° C. for 5 minutes
4) 90° C. to 40° C. at 1° C. per 1 minute
5) 40° C. to 25° C. at 1° C. per 1 hour The assembly mixture is then diluted and mixed with additional components to form 500 µL of the following "ligation mixture":
1×TAE $Mg^{2+}$
1×T4 DNA ligase buffer
25 µL T4 DNA ligase
50 µL assembly mixture Ligation is allowed to proceed in the above solution at room temperature for 12 to 24 hours.

Example 7

Purification of DNA Platform/Ribbon Templates

Assembled and ligated templates (Example 6) are separated from other reaction products using Millipore Microcon YM-100 spin filters (100 kD MWCO). 100 µL of the ligation mixture is gently mixed with 300 µL of sodium-based assembly buffer (0.75 M NaCl, 0.01 M $Na_2HPO_4$, pH ~8 at 25° C., 0.22 µm filtered) and transferred to a YM-100 spin filter according to the product's instructions. The filter is spun in an Eppendorf temperature-controlled centrifuge at 4° C. and 1000 g for 12 min. 400 μL of assembly buffer is added to the retentate in the spin filter and gently mixed using a 1000 μL pipette. The filter is spun again at 4° C. and 1000 g for 8 minutes. The retentate is then recovered according to the product's instructions. The recovery yields about 100 μL of solution. (Note that the spin time for the second filtration can be adjusted to obtain approximately the desired volume). The recovered solution contains ~1 nM concentration of DNA templates in sodium buffer. Without this buffer exchange, the presence of magnesium at millimolar concentrations causes precipitation of NL-SWNTs when DNA templates are later mixed with the NL-SWNTs. The elimination of free assembly components was verified using ND-PAGE analysis. (Platform/ribbons do not migrate in ND-PAGE gels, but excess staples, which are of interest, do.) Ligated platform/ribbon templates remain stable in the sodium-based assembly buffer, as evidenced by subsequent AFM.

Figure 9:
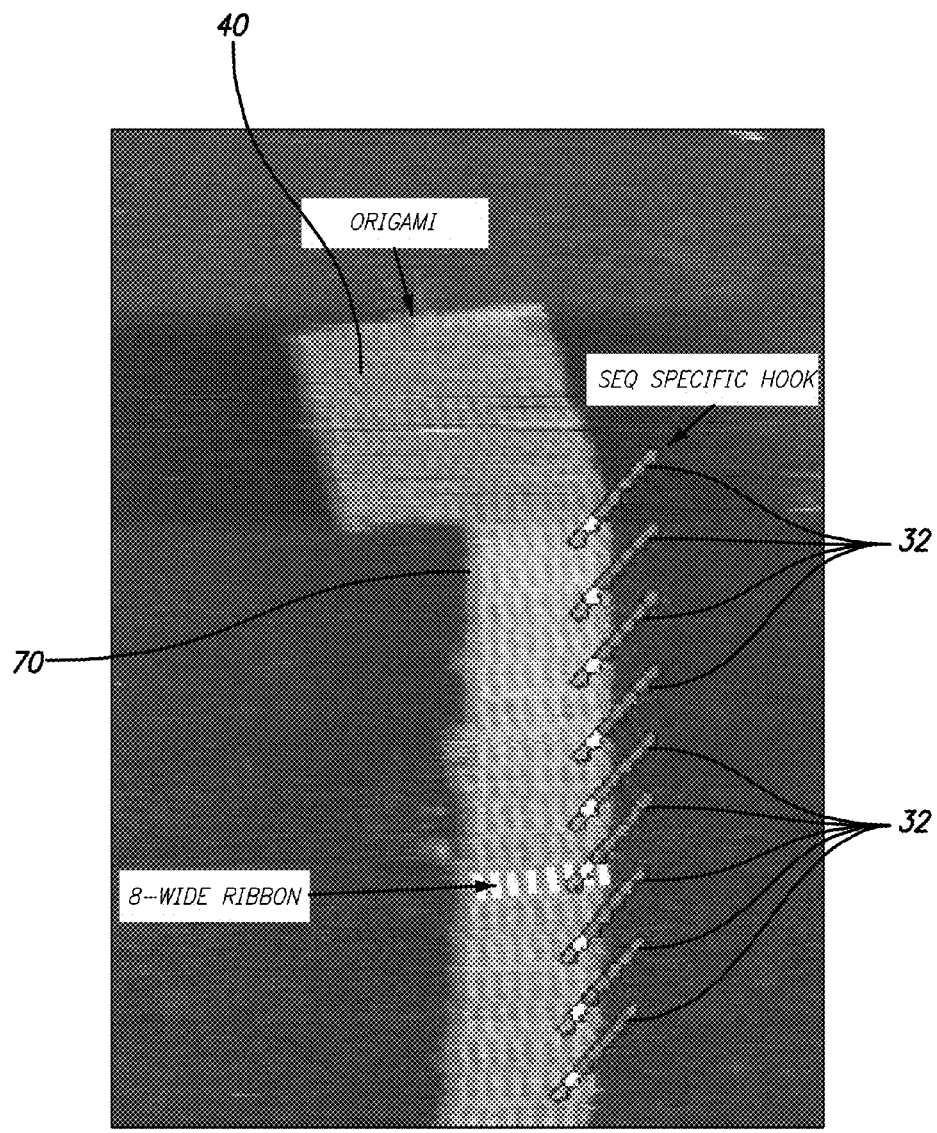
FIG. 9 shows a fluid mode topographic AFM image of a polynucleotidic platform according to some embodiments herein disclosed with schematic of the hooks to show their positions on the platform.

A schematic illustration of the resulting origami/ribbon platform is shown in FIG. 9.

Example 8

Assembly of NL-SWNTs with DNA Platform/Ribbon Templates

Figure 10:
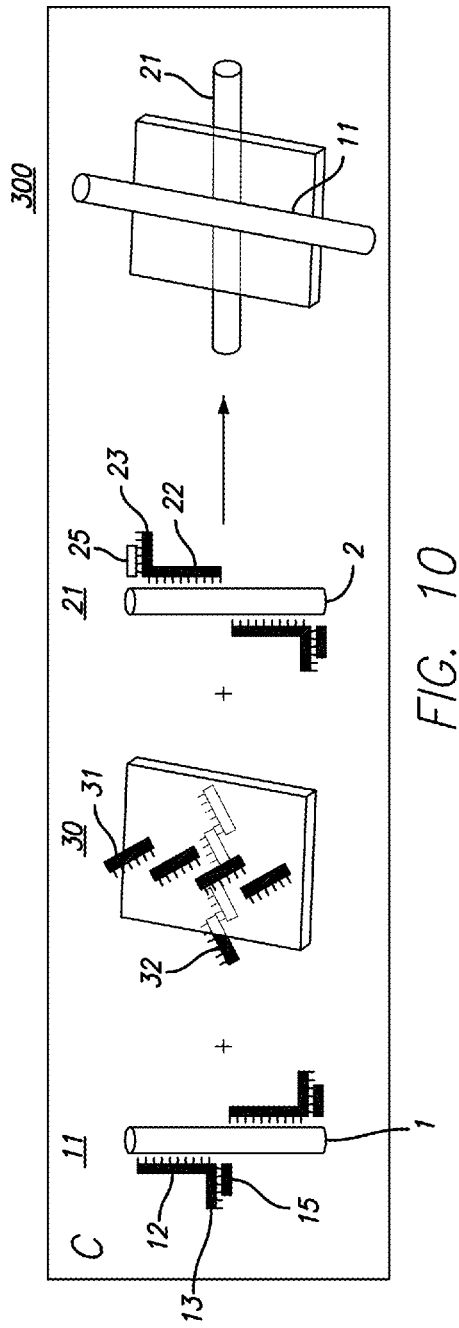
FIG. 10 shows a schematic illustration of a method to assemble a structure comprising a nanoassembly and a polynucleotidic platform according to some embodiments herein described.
Figure 11:
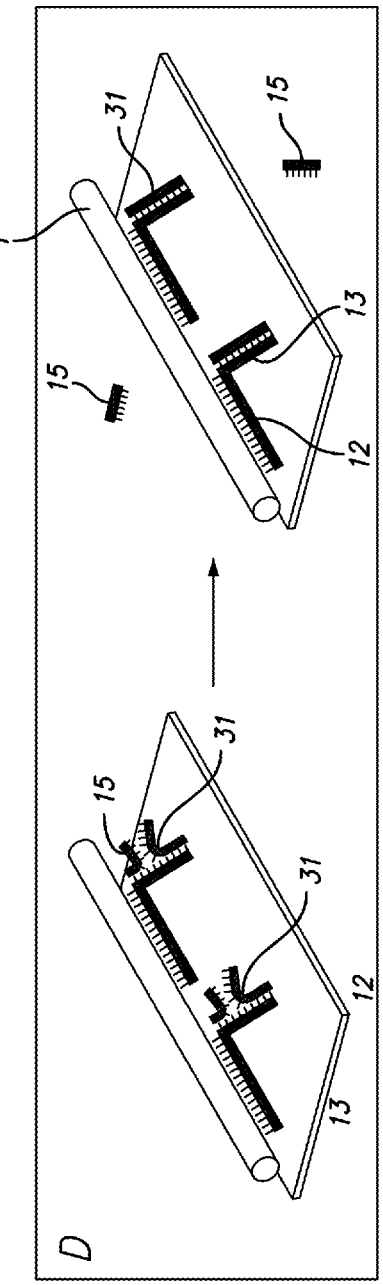
FIG. 11 shows a schematic illustration of interaction between the labeling domain of a linker polynucleotide in a nanoassembly and a hook domain of a hook polynucleotide on a platform according to some embodiments herein described.

To create a structure comprising the SWNT, the NL-SWNT (11) and (21) were finally assembled with the platform produced in outcome of Example 7 according to an approach schematically illustrated in FIGS. 10 and 11. In particular, the NL-SWNT (11) and (21) are contacted with platform (30) presenting hooks (31) and (32) to allow interaction between labeling domains (13) and (23) with hook sequences (312) and (322) and the resulting attachment of the SWNT to the platform (30) through displacement of protection strand (15) and (25) from the SWNT (11) and (21) respectively. According to the experimental design illustrated here displacement of protection strand (15) is performed with the aid of toehold regions (14) (24) (313) and (323). In particular, according to the schematic illustration of FIG. 11 the toehold on a linker initiates binding to a hook, leading to branch migration and release of the protection strand. The protection strands are therefore removed by the process of labels hybridizing to the origami hooks. Thus throughout the method exemplified here, ssDNA labels remain almost completely protected until they bind the DNA origami; only short "toehold" sequences are ever exposed as ssDNA.

In particular, to create NL-SWNT/DNA constructs, NL-SWNTs were mixed with ~0.5 nM platform/ribbon templates produced with the procedure of Example 7.

The concentration of NL-SWNTs was not known but in this final assembly buffer the concentration of NL-bound linkers was 10-100 nM.) A variety of buffers and incubation temperatures were tried, achieving best results at 25° C., 0.75 M NaCl, 0.01 M $Na_2HPO_4$ (pH ~8). The fraction of templates with attached SWNTs increased with incubation time. However, incubation times >30 minutes sometimes resulted in aggregates of many templates and SWNTs, perhaps due to attachment of long SWNTs to multiple templates.

NL-SWNTs were combined with platform-ribbon templates in two different types of experiments: (i) the binding of NL-SWNTs (21) or NL-SWNTs (11) independently with platform-ribbon templates bearing cross patterns of hooks (31) and (32) to measure the specificity of binding and fidelity of alignment to the hooks and (ii) the binding of NL-SWNTs (21) and NL-SWNTS (11) simultaneously with platform ribbon templates bearing cross patterns of hooks (31) and (32) to create cross-junctions. In both cases, the basic recipe (with amounts of components given as either the final concentration of that component, or the volume of that component added) for combining NL-SWNTs with platform-ribbon templates is the same:

~0.75 M NaCl
~0.01 M $Na_2HPO_4$
10 μL of purified DNA templates
0.5 to 3 μL of NL-SWNTs (2)
0.5 to 3 μL of NL-SWNTs (1)

This mixture (pH ~8) is kept at 25° C. for 10 to 100 minutes and then deposited directly on the desired substrate for characterization. The kinetics have not been systematically studied but binding times between 30 and 35 minutes appear to give the best results under the conditions used in this example.

Figure 12:
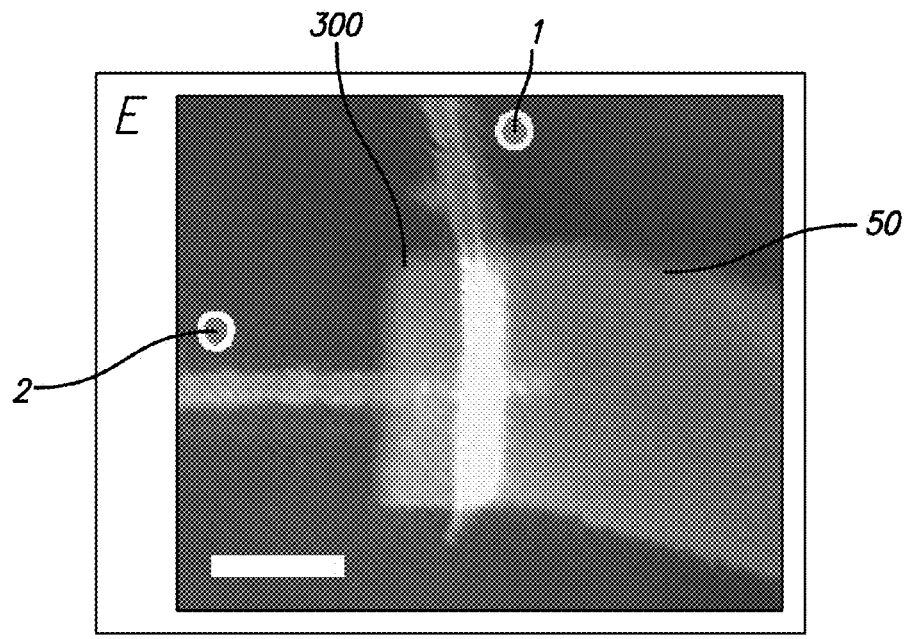
FIG. 12 shows a fluid mode topographic AFM image of a structure formed by a polynucleotidic platform and a nanoassembly according to some embodiments herein disclosed.
Figure 13:
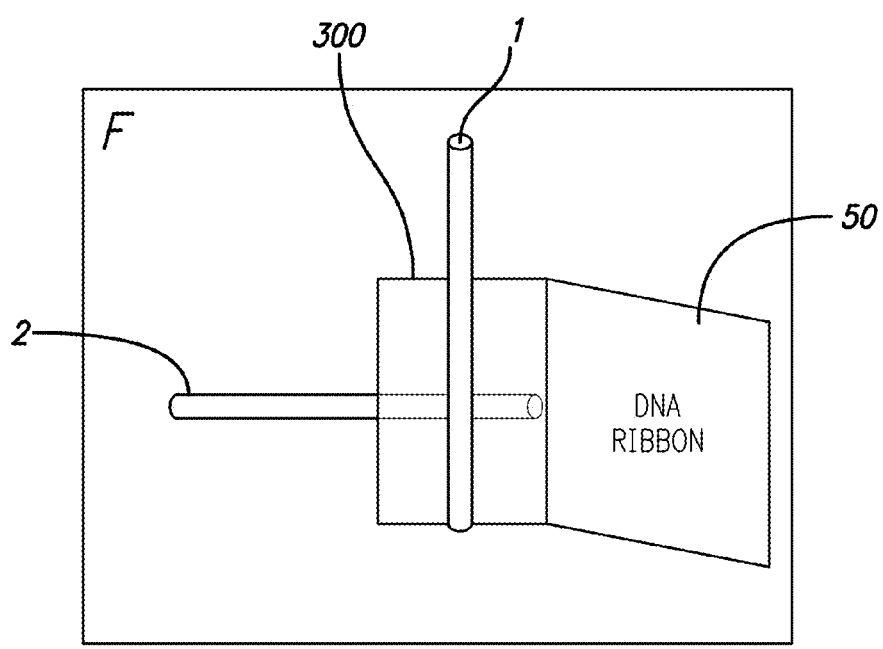
FIG. 13 shows a schematic illustration of a structure formed by a polynucleotidic platform and a nanoassembly drawn based on the interpretation of the fluid mode topographic AFM image of FIG. 12.

The resulting structures are illustrated in FIGS. 12 and 13, where positioning of SWNTs (1) and (2) on the origami (300) as nanomaterial bearing portion of the structure also comprising ribbon (50) is indicated.

Example 9

Deposition of NL-SWNTs/DNA Ribbon/Templates on Mica Substrates

After assembly (Example 8), 5 μL of the assembly solution is added to a piece of freshly cleaved mica. Following this, a 40 μL drop of 1×TAE/$Mg^{2+}$ was added on top. Finally, a 20 μL drop of 10 mM nickel (II) acetate (0.22 μm filtered) was added. The sample was then immediately imaged with an AFM.

Figure 14:
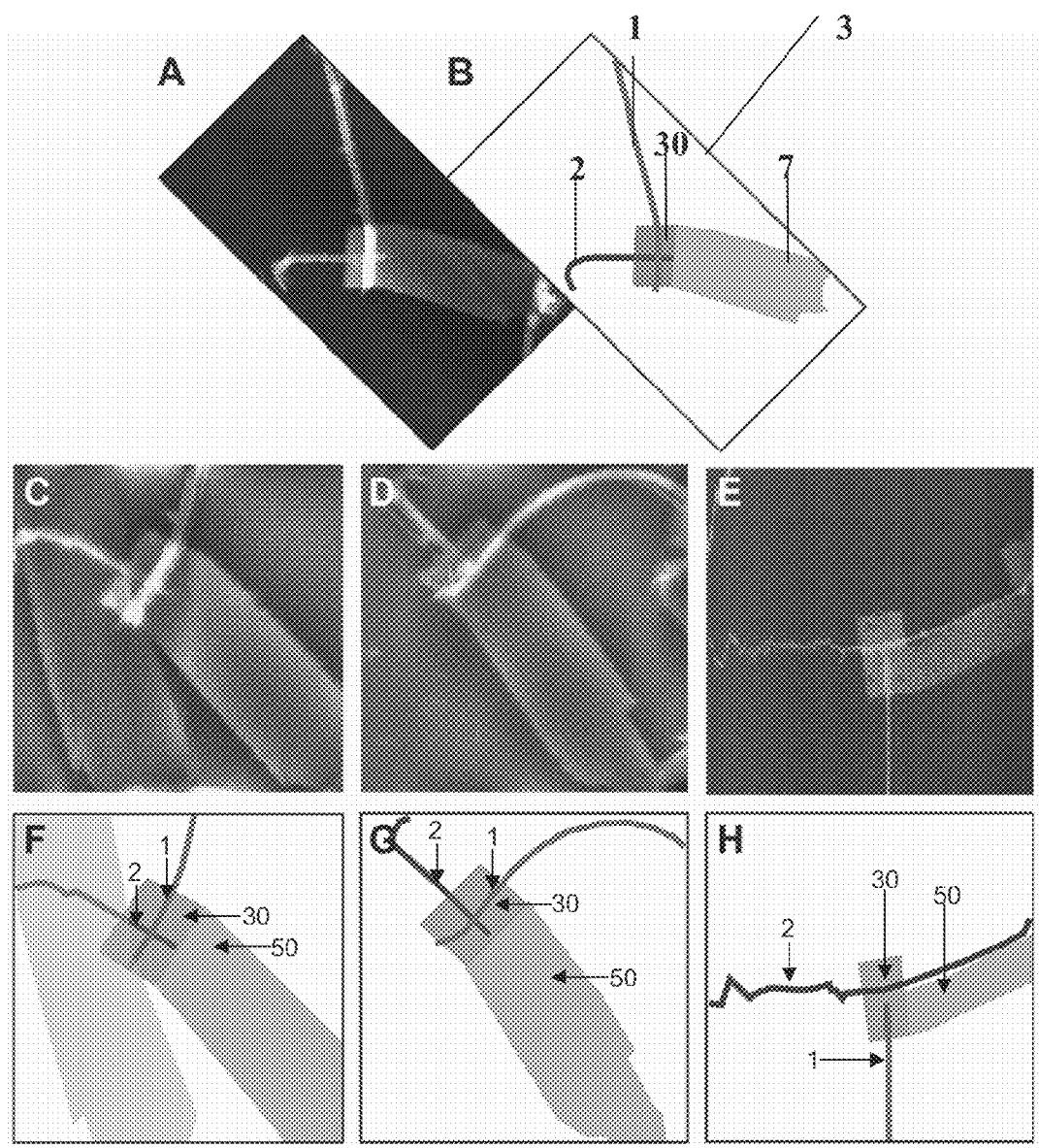
FIG. 14, panels A-H, shows images of structures comprising a nanoassembly and a polynucleotidic platform according to an embodiment of the present disclosure. In particular, Panels A and C-E show topographic tapping mode AFM images of the self-assembled SWNT cross-junction nanoassembly deposited on a mica substrate and kept under fluid. Panels B and D-H shows schematic illustration of the interpretations of Panels A and C-E respectively.

FIG. 14 shows examples of self-assembled SWNT cross-junctions of SWNT (1) and (2) deposited on mica (3) and imaged using tapping mode AFM under fluid. AFM characterization suggests that the asymmetry of the constructs may play a role in deposition. In particular, in the illustration of FIG. 14A and corresponding interpretation of FIG. 14B cross-junctions on origami (30) attached to 16-wide tile-wide ribbons (70) are shown. FIG. 14C and corresponding interpretation FIG. 14F show a cross-junction on an origami attached to an 8-tile wide ribbon. Nanotube (1) is under the origami according to the ribbon orientation; this is consistent with the faint details of the origami fine structure that may be seen on top of it.

In FIG. 14D and corresponding interpretation FIG. 14G a ribbon (50) that has fallen on top of part of the origami and red SWNT is indicated. Details of the ribbon (50) can clearly be seen in the AFM coincident with nanotube (2), which supports the interpretation of positioning of ribbon (50) on top of the SWNT (2).

In FIG. 14E and corresponding interpretation FIG. 14H a nanotube (2) is shown that has been attached to the origami (30) so to be placed along ribbon (50) in a configuration substantially parallel to ribbon (50).

In the same experiments used to measure the alignment of nanotubes (1 or 2) to their respective hook (31 or 32) arrays, the number of occurrences of DNA platform/ribbon constructs with their face down were counted:

TABLE 5

| Number of Occurrences of DNA platform/ribbon constructs | | | | |
|---|---|---|---|---|
| | undecidable | (1) face down | (2) face down | total |
| (2) tubes attached | 16 (11%) | 29 (19%) | 106 (70%) | 151 |
| (1) tubes attached | 9 (8%) | 14 (12%) | 97 (80%) | 120 |

There is a bias (70-80%, when 50% was expected) for an platform/ribbon construct to have its (2) face down and its (1) face up, regardless of whether it is bound by a (1) or a (2) tube. While the platform are symmetric at the coarse scale of their overall shape, they are highly asymmetric at a smaller length scale; almost all of the nicks in the phosphate backbone (except for at the row of (31) hooks) of the platform used fall on the (2) face of the platform. Thus one might expect that the platform can assume a configuration with the (2) face being convex much more easily that it can assume a configuration with the (1) face being convex; if the (2) face is convex, the nicks can open and relieve strain, if the (1) face is convex, no such strain relief can occur. Perhaps this plays a role in the asymmetric deposition rate.

Example 10

Measuring the Fidelity of Alignment of NL-SWNTs on DNA Platform/Ribbon Templates To measure the efficiency, specificity, and orientation of attachment for (2) and (1) NL-SWNTs (independently), >200 SWNT/DNA constructs assembled using only (2) or (1) SWNTs were imaged. Whether the DNA template was intact was also catalogued. Constructs were assembled by separately mixing either (11) or (21) NL-SWNTs with templates displaying the cross pattern of (31) and (32) hooks (see FIGS. 1 and 4). In each case SWNTs had an opportunity to bind to either (31) or (32) hooks. The desired outcome for each construct was a single SWNT aligned over the complementary hook array. Nonspecific attachment would result in incorrect alignment or binding of more than one tube per construct. Constructs were deposited on mica as exemplified in Example 9 and scanned under buffer.

A VeecoMultimode AFM with a Nanoscope IIIa controller was operated in tapping mode with a fluid cell. The imaging parameters were the same as described in [30]. All images were collected at 512×512 pixel resolution using a scanning speed between 1.0 and 6.0 lines per second. A 10 μm×10 μm or 7 μm×7 μm area scan was first taken at a random location on mica. Every visible DNA template in that area was scanned in greater detail until the template quality, template orientation and SWNT alignment angle could be clearly established (usually requiring a 500 nm×500 nm or smaller scan area).

86% of templates mixed with (1) SWNTs had ≥1 SWNTs attached, as did 80% of templates mixed with (2) SWNTs. Of templates with attached SWNTs, ~25% were distorted or aggregated. Overall, ~50% of all templates were intact and had a single SWNT attached, as desired.

Figure 15:
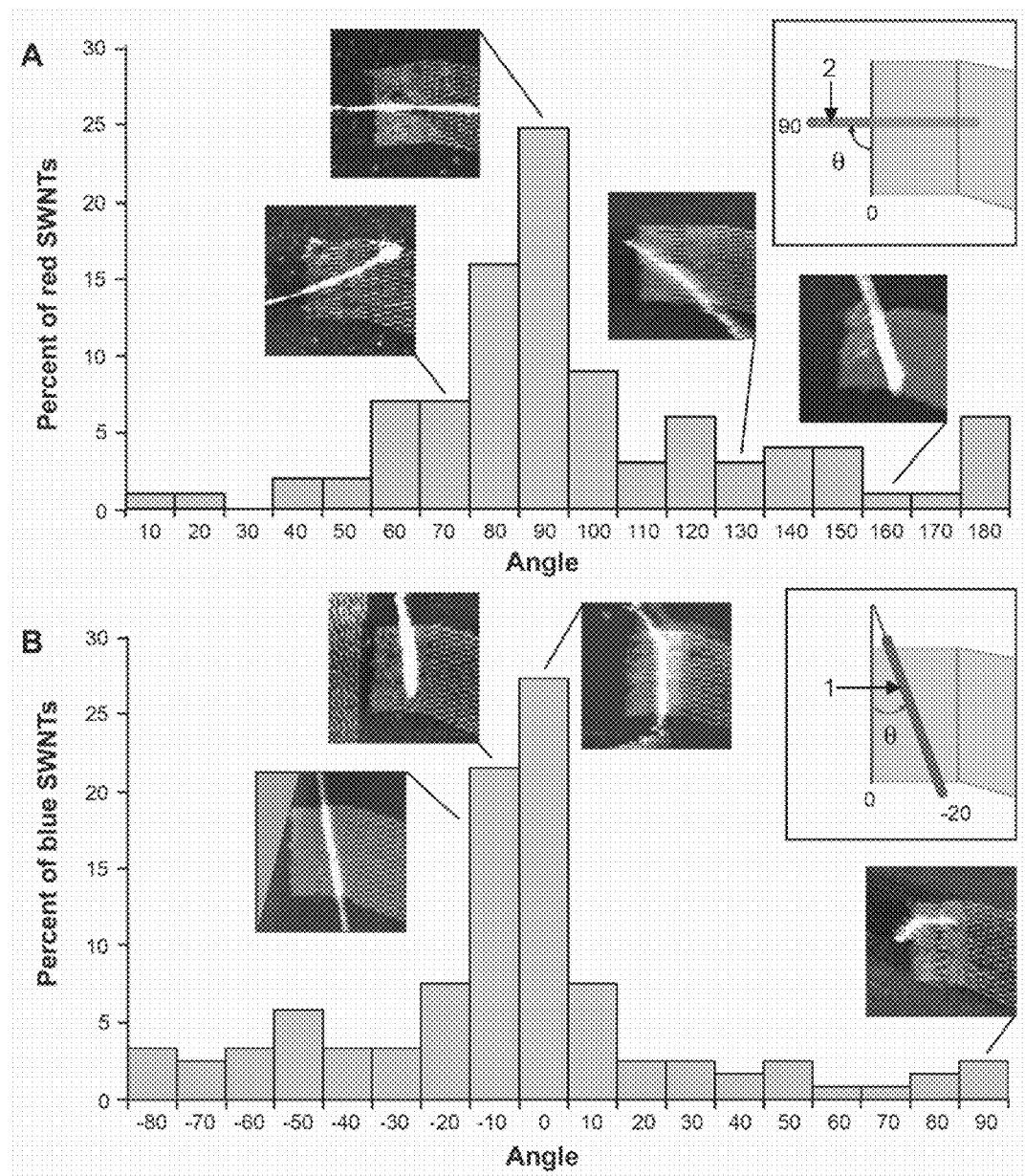
FIG. 15 shows diagrams illustrating sequence-specific attachment of nanoassemblies to polynucleotidic platforms and angular control over orientation according to some embodiments herein described. In particular, Panel A shows a diagram illustrating the angle of 100 randomly selected polynucleotidic platforms incubated with NL-SWNT presenting SWNT (1). Panel B shows a diagram illustrating the angle of 120 randomly selected polynucleotidic platforms incubated with NL-SWNT presenting SWNT (2). Insets in Panel A and Panel B show a schematic of how SWNT angle was defined with respect to the platform's edge and ribbon orientation as well as AFM images of the structures indicated on the diagrams. The third image from left in (Panel B) is flipped; unlike the others this structure landed with the (1) NL-SWNT face down.

FIGS. 15A and 15B shows the distribution showing sequence-specific attachment of NL-SWNTs to DNA templates and angular control over orientation. This demonstrates the efficiency, specificity, and orientation of attachment for red and blue NL-SWNTs (independently). The data includes >200 SWNT/DNA constructs assembled using only red or blue NL-SWNTs.

Randomly selected origami templates incubated with NL-SWNTs (11) or (21) were imaged by AFM. Of these, 100 NLSWNT (12)/template constructs (FIG. 15A) and 121 NL-SWNT (11)/template constructs (FIG. 15B) were intact and had a single SWNT bound, ~50% of the total templates of each type. AFM images show examples of attachment at various angles.

Insets in FIG. 15A and FIG. 15B show how SWNT angle was defined with respect to the origami's edge and ribbon orientation. Angles are defined similarly but the ranges are offset; angles of 100° to 180° in FIG. 15A correspond to angles of −80° to 0° in FIG. 15B. For both distributions ~50% of tubes fall within ±15° of desired angle. The third image from left in FIG. 8B is flipped; unlike the others this structure landed face presening SWNT (1) down.

The angle of the ribbon with respect to the platform allowed distinguishing between faces presenting SWNT (1) and SWNT (2) and to define SWNT alignment angles. FIG. 15B shows that the angular distribution for (1) SWNTs peaks at ~0° (as expected) with 56% oriented within ±15° of the peak. The distribution of (2) SWNTs (FIG. 15A) peaks at ~90° (as expected) with 50% within ±15° of the peak. These data suggest NL-SWNTs strongly prefer their complementary hook array and align parallel to it. Also, the importance of the protection strands for binding efficiency was verified in a control experiment: when (1) SWNTs were prepared without protection strands <10% of DNA templates had SWNTs attached.

Figure 16:
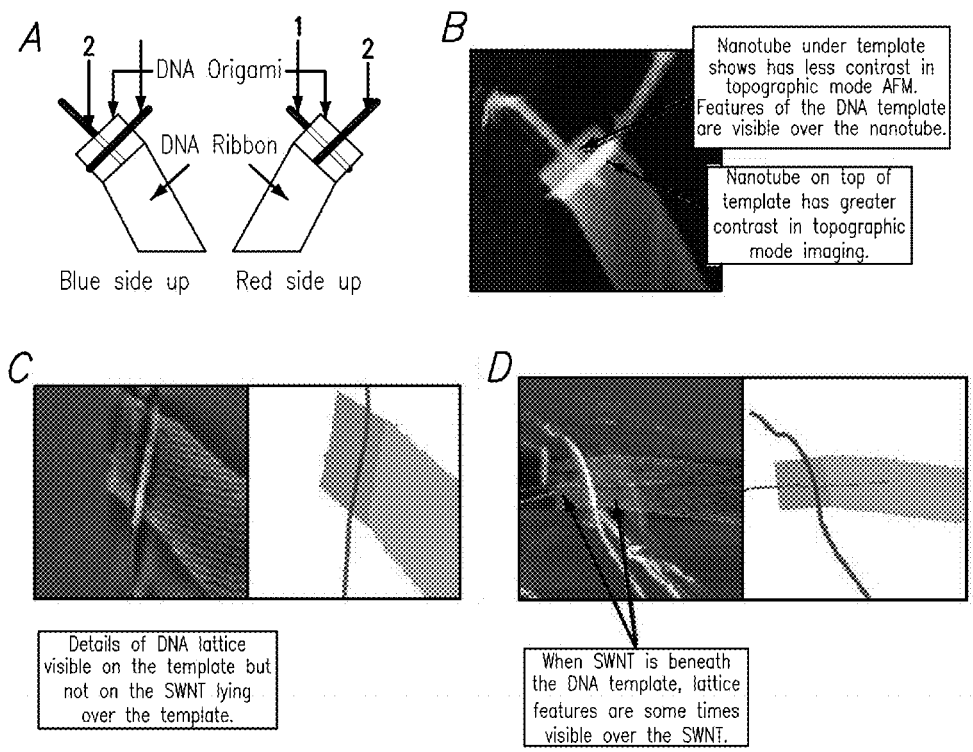
FIG. 16 shows AFM images and a related schematic illustration of a structure comprising a nanoassembly and a polynucleotidic platform according to an embodiment of the present disclosure. In particular, Panel A shows a schematic of origami/ribbon constructs bearing SWNTs according to an embodiment of the present disclosure. Panels B to D show AFM images of origami/ribbon constructs bearing SWNTs according to some embodiments of the present disclosure.

Further images of structure presenting SWNT (1) and (2) and corresponding schematic interpretation are further illustrated in FIG. 16 which shows further examples of orientation of SWNT/origami/ribbon constructs. In particular, in FIG. 16A, origami/ribbon constructs have a handedness that allows one to distinguish which face of the origami is facing up, and which is facing down on the substrate. This allows the relative orientation of a SWNT and an origami to be measured over an 180° range rather than the 90° range possible if the origami were used alone, without further markings. FIG. 16B shows another cue which aids in understanding the structure of the cross-junctions is the topographic height contrast of the two different nanotubes. In general the nanotube under the template images with lower height contrast than the nanotube on top of the origami.

FIGS. 16C and 16D show a third cue is the "texture" of the carbon nanotube. Nanotubes that are apparently on top of the origami have a smooth (yet noisy) texture do the nanotubes (1) in FIG. 16C and FIG. 16D. When imaged with very high resolution, nanotubes apparently underneath the origami sometimes have a dashed or periodic appearance that seems correlated to the fine periodic structure of the origami or the ribbon, as does the red tube in FIG. 16D. AFM height contrast and the texture of the nanotube are secondary cues as to the position (over or under the origami) of the nanotubes. They are not always observed but when observed are typically consistent with the position derived by the orientation of the origami/ribbon. Rarely do they disagree—this may indicate nonspecific binding of blue tubes to red hooks or red tubes to blue hooks, which may explain some of the few nanotubes that have an incorrect orientation in the alignment distributions in FIG. 15.

Example 11

Assembly of NL-SWNTs on a DNA Ribbon Template

Figure 17:
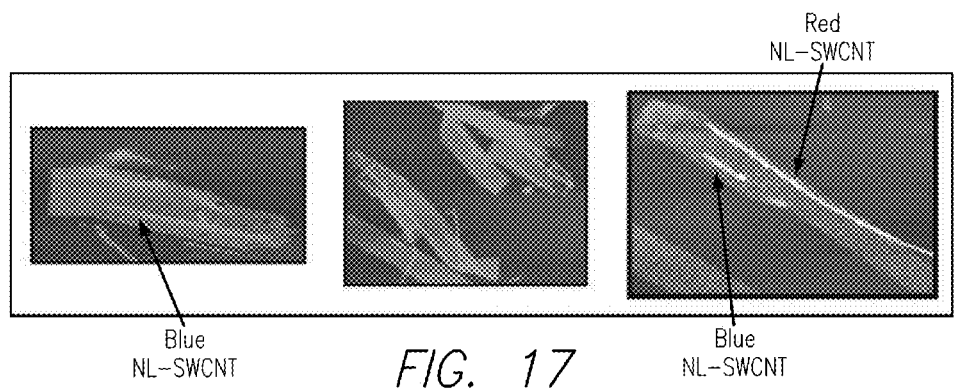
FIG. 17 shows AFM images of structures comprising a nanoassembly and a polynucleotidic ribbon according to an embodiment of the present disclosure.

Experiments aligning SWNTs along the length of zig-zag ribbons, rather than on platform, can be performed following the procedures exemplified in Examples 7 and 8 using modified DNA tiles such as (501) and (502) of FIGS. 6 and 7. This was done by labeling selected rows of tiles (500), (501) and (502) in the DNA ribbon (70) with hooks (31, 32) so that they project up out of the ribbon plane. Each tile carrying a hook is modified by adding the hook sequence to one of the tiles long strands. FIGS. 6 to 8 show a schematic for a polynucleotidic platform-ribbon template in which one row of tiles (502) has been modified to carry a (32) hook, and another row of tiles (501) has been modified to carry a (31) hook. FIG. 17 shows the results of this experiment, and in particular illustrates AFM images of the 16-tile wide ribbons from self-assembly of SWNTs (1) and (2) onto the appropriate rows of tiles. It is apparent from the images of FIG. 17 that three out of the six 16 tile wide ribbons in this figure have both (2) and (1) nanotube aligned along their length. (Platform can be programmed to specify the width and pattern of a ribbon and so easily change the pattern of SWNTs organized on the ribbons).

In particular FIG. 17 demonstrates NL-SWNT self-assembly on a DNA ribbon template. AFM images of the 16-tile wide ribbons from self-assembly of (2) and (1) SWNTs onto the appropriate rows of tiles. Here, half of the clearly distinguishable ribbons have tubes along both intended rows of tiles. AFM image show the correct attachment of the (2) and (1) NL-SWNT on the (32) and (31) hooks respectively, as designed.

Example 12

Assembly of Nanodevice Cross-Junctions

Cross-junctions were assembled according to Example 8 by mixing templates with both (2) and (1) NL-SWNTs simultaneously and visualized them by AFM, (FIGS. 12-13 and FIG. 14).

Example 13

Deposition of Nanodevice Cross-junctions on $SiO_2$ Substrates

A ~1 cm×1 cm piece of p-doped Silicon wafer with a thermally grown $SiO_2$ layer (300 nm or 1 μm) was cleaned with dichloroethane (DCE) and isopropanol (IPA) in an ultrasonicator bath. The wafer was then exposed to $O_2$ plasma in an Anatech SP100 plasma system (Anatech) at 80W, 200 mTorr for 3 minutes. A 5 μL solution containing SWNT/DNA template constructs (Example 12) was then immediately deposited onto the wafer surface followed by a 7 μL drop of 10 mM $Ni^{2+}$ acetate solution and 40 μL drop of 1×TAE/$Mg^{2+}$. After 1 hour of incubation at room temperature, excess salt residue was washed away using 0.1 M ammonium acetate, (pH 6 at 25° C.). The wafer was dried using compressed nitrogen gas. Deposited SWNT/DNA template constructs could then be imaged by tapping mode AFM on the dry silicon substrate and by scanning electron microscope (SEM) albeit with lower resolution as exemplified by FIGS. 18 and 19.

In particular the illustration of FIG. 18A and corresponding interpretation of FIG. 18B show topographic AFM images of the self-assembled SWNT cross-junctions deposited on a silicon substrate. The image is taken on a dry substrate in tapping mode. The width of the ribbons is ~100 nm. SWNT (11) and (21) are indicated together with origami (30), ribbon (70) and places where the ribbon folds on itself to give a double-width ribbon.

Figure 19:
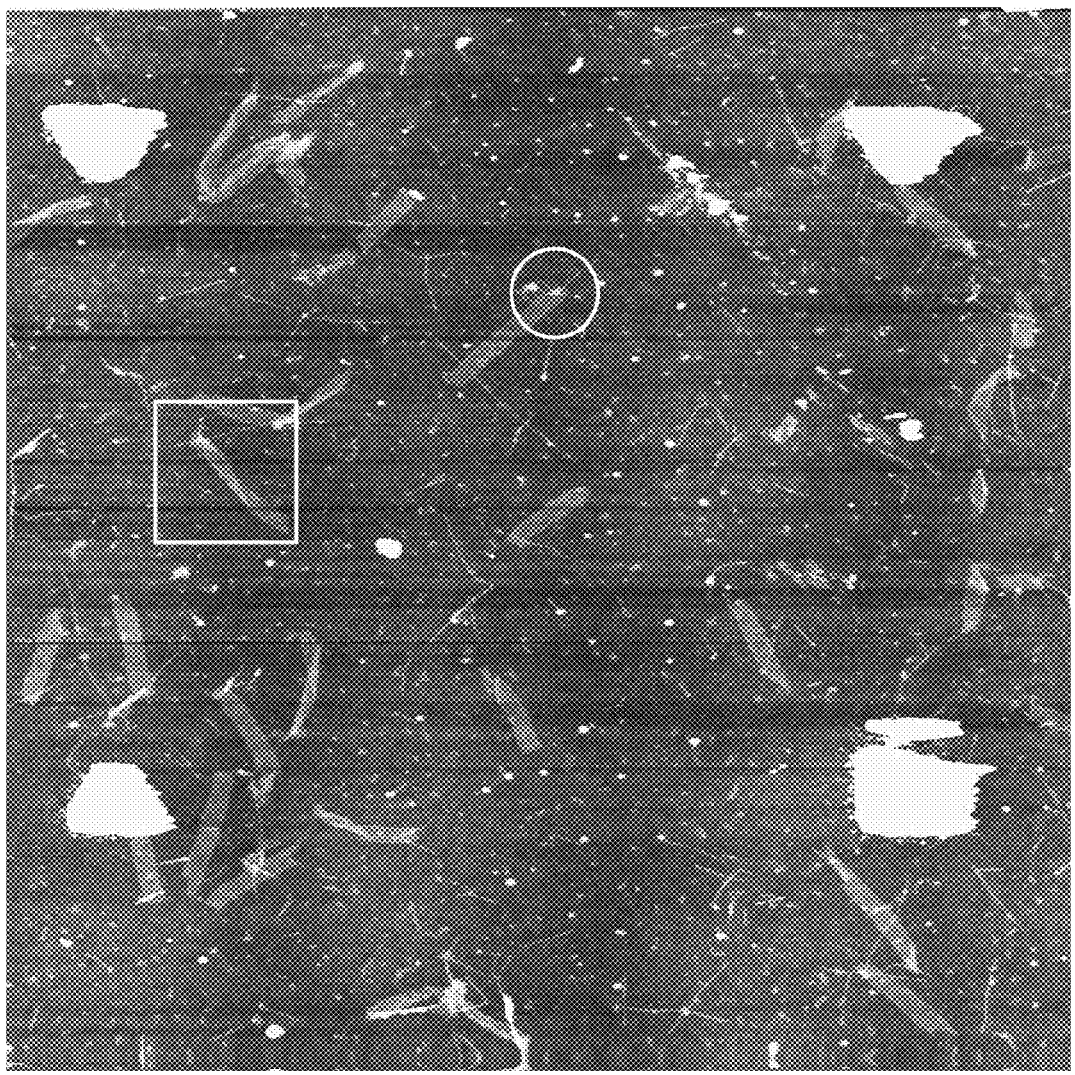
FIG. 19 shows a wide-field image of cross-junction nanoassembly on silicon according to an embodiment of the present disclosure. The boxed area contains the cross-junction shown at the top of FIG. 18. Scale bar 500 nm. ~500 nm white features are gold alignment markers.

FIG. 19 shows a typical wide-field view of cross-junctions on silicon. In this particular wide-field view roughly 35 distinct DNA structures can be identified. 17 have identifiable origami and ribbon domains. Of these 12 have one or more SWNTs associated with the origami, and of these two have geometry judged to form a cross-junction. The boxed area contains the cross-junction shown at the top of FIG. 5. The yield of DNA-templated cross-junctions is not greater, per unit area, than the number of crosses created by randomly associating SWNTs (perhaps a few here). Our measurement of the alignment of SWNTs to the lines of hooks on the origami (FIG. 15), as well as the relative sparsity of individual SWNT/SWNT crosses on ribbons in this image, suggest that the individual SWNT/SWNT crosses associated with the origami in this image are the result of specific binding rather than random association. Scale bar 500 nm. _500 nm white features are gold alignment markers.

Figure 18:
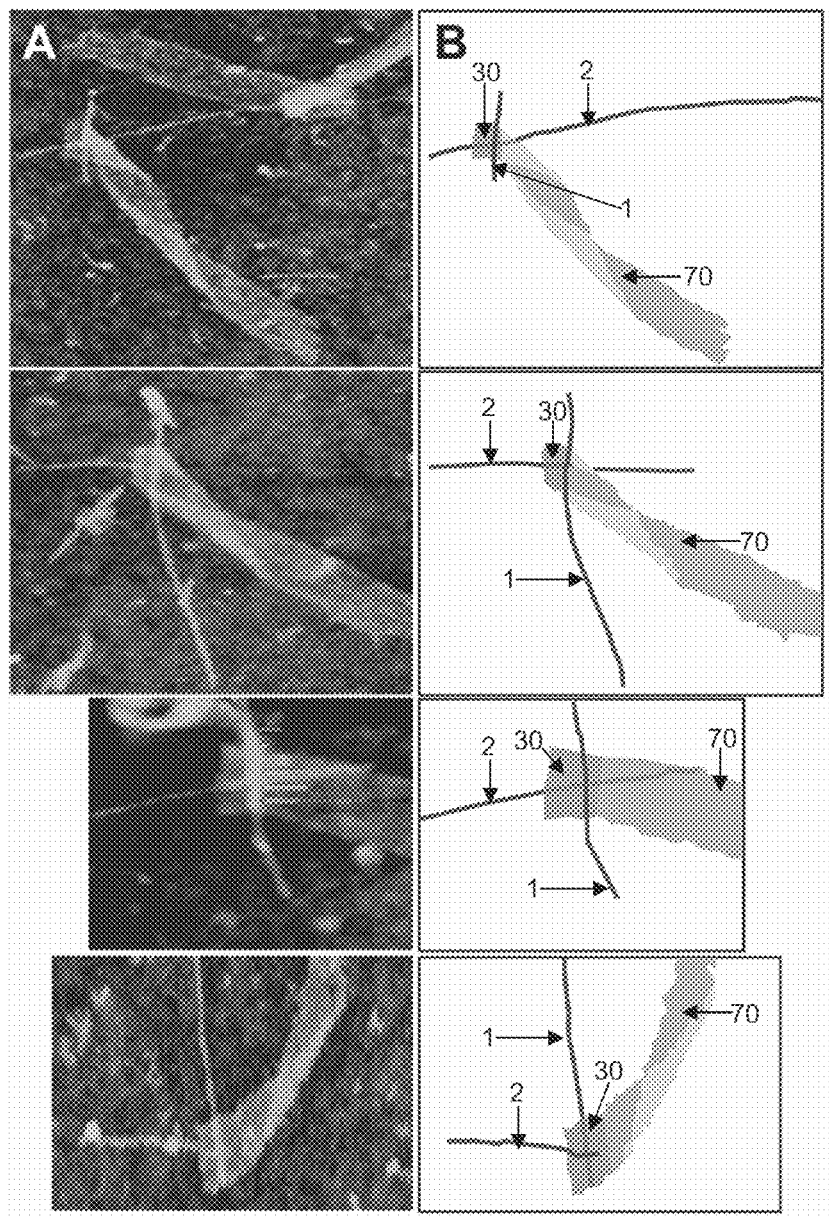
FIG. 18 shows images of assembled structures comprising a nanoassembly and a polynucleotidic platform according to an embodiment of the present disclosure. Panel A: topographic AFM images of the self-assembled SWNT cross-junctions deposited on a silicon substrate. The image is taken on a dry substrate in tapping mode. The width of the ribbons is ~100 nm. Panel B shows interpretations of the AFM images in Panel A.

Although the ribbons on DNA templates appeared twisted and folded under dry mode AFM, cross-junction geometry of SWNTs was typically intact (FIG. 18 and FIG. 19). Within a 400 μm$^2$ area of the silicon wafer, typically 5 to 10 self-assembled SWNT cross-junctions were found.

Crossjunctions, like these examples, are frequently asymmetric as NL-SWNTs often bind near their ends (for unknown reasons), even appearing to align so that their ends are flush with the edge of the platform template. In the final constructs, (2) and (1) NL-SWNTs are separated by a layer of DNA composed of their respective linkers (at least 1 nm where linkers attach due to the thickness of the poly-T dispersal domains, potentially up to a few nm depending on the detailed configuration of linkers) and the DNA platform (2 nm thick) that lies between them. AFM height measurements of the cross junctions (~4 nm) provide a weak upper bound for the thickness of the layer. In principle the intervening DNA layer is thicker with the SWNT on opposite sides of the platform, and this geometry was chosen (over binding both SWNTs to the same side). If retained, a thicker intervening DNA layer might function as a better insulator so that in the randomly occurring cases where one SWNT of the cross junction was metallic and the other SWNT semiconducting, the metallic SWNT would more likely exert FET-type gating on the semiconducting SWNT. To look for possible FET-behavior, the electrical characteristics of several cross-junctions were studied.

Example 14

Lithographic Fabrication of Contacts to the SWNT Cross-junctions

Positions of self-assembled SWNT cross-junctions are located on the Si/$SiO_2$ substrate (Example 13), with respect to the pre-fabricated reference markers, using AFM. Standard electron-beam lithography techniques are employed to make electrical contacts to the nanotubes. Briefly, a bi-layer resist consisting of 250 nm LOR 3B lift-off resist (MicroChem, baked at 190° C. for 1-3 minutes) and 150 nm PMMA C2 (MicroChem, baked at 160° C. for 10-15 minutes) are spun on the sample.

Electrode patterns are written using a Quanta 200F (FEI tools) SEM equipped with nanometer pattern generation system (NPGS). After the development of the resist, the sample is rinsed in "DNA AWAY" (Molecular BioProducts) for 6 seconds, washed with DI water, rinsed with HCl for 6 seconds and washed again with DI water. The rinsing steps have three purpose: first, to prime the surface (HCl has been shown to improve the hydrophilic nature of the silicates by hydrolyzing them, therefore, priming the metal wetting properties of the substrate surface), second, to degrade substrate bound DNA so that it does not adversely affect the adhesion of metal electrodes to the substrate and third, to remove DNA from NL-SWNTs at contact regions so that it does not adversely affect the metal-SWNT junction. (Note that at this point in the process, NL-SWNTs near the cross-junction and DNA templates are presumably protected from the rinses by resist. However, the DNA templates by AFM post-liftoff could not be resolved.) It is not known whether the DNA on the NL-SWNTs in the contact regions is fully degraded or whether the residue of degraded DNA is washed away. However, NL-SWNTs treated in this manner exhibit better conductivity, presumably due to better electrode-nanotube contact.

Figure 21:
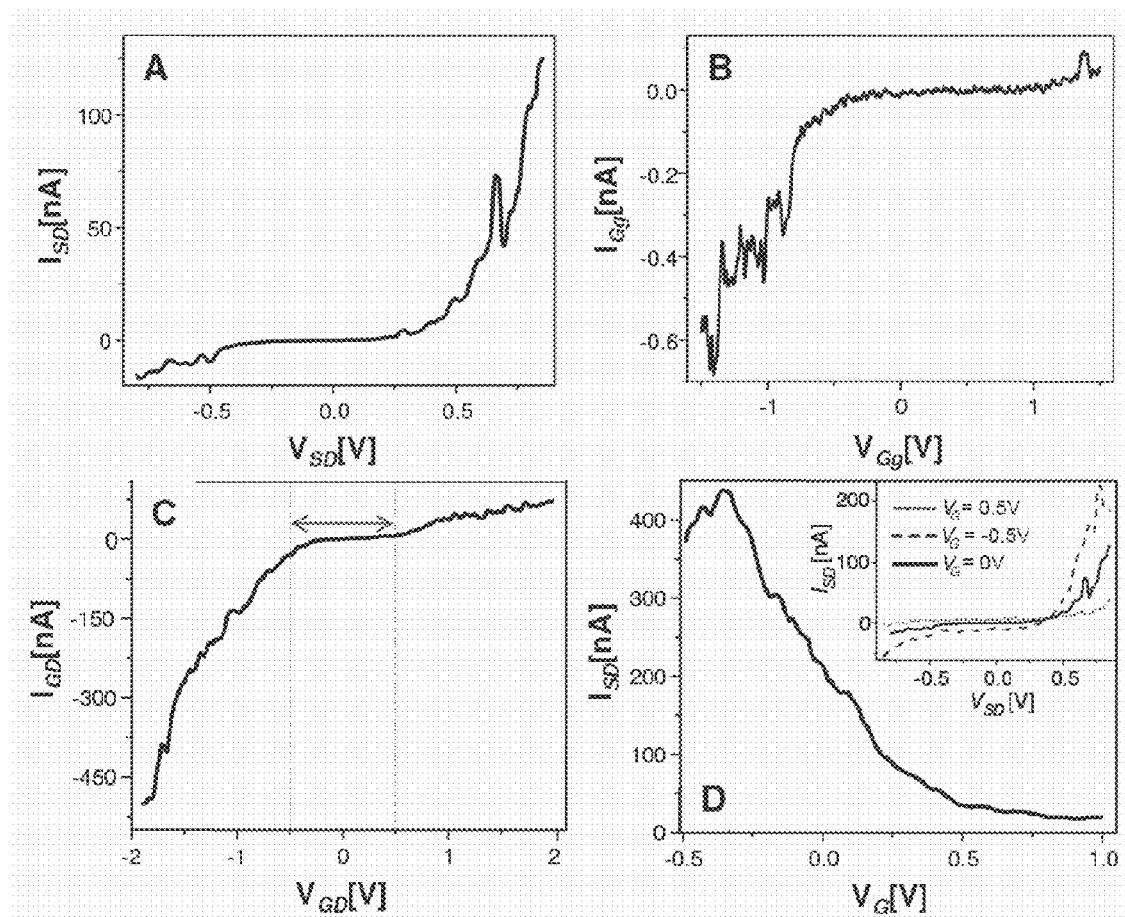
FIG. 21 shows diagrams illustrating a further electrical characterization of the self-assembled SWNT cross-junction nanoassemblies shown in FIG. 20. In particular, Panel A shows a chart of the electrical measurement for the SWNT (1) of FIG. 20 (source electrode S and drain electrode D) showing a nonlinear behavior suggestive of a p-type semiconductor. Panel B shows a chart of the electrical measurement for the SWNT (2) of FIG. 20 (across gate electrode G and auxiliary electrode g) showing high resistance. Panel C shows a chart of the intertube conductance as measured between electrode G and D of FIG. 20. The arrow marks the insulating region where there is little current leakage between the SWNTs. Panel D shows a chart of the source-drain current (electrodes S and D) versus SWNT gate voltage (electrode G) of FIG. 20 for source-drain bias of 0.85 V. The inset shows the source-drain I-V for different SWNT gate biases.
Figure 22:
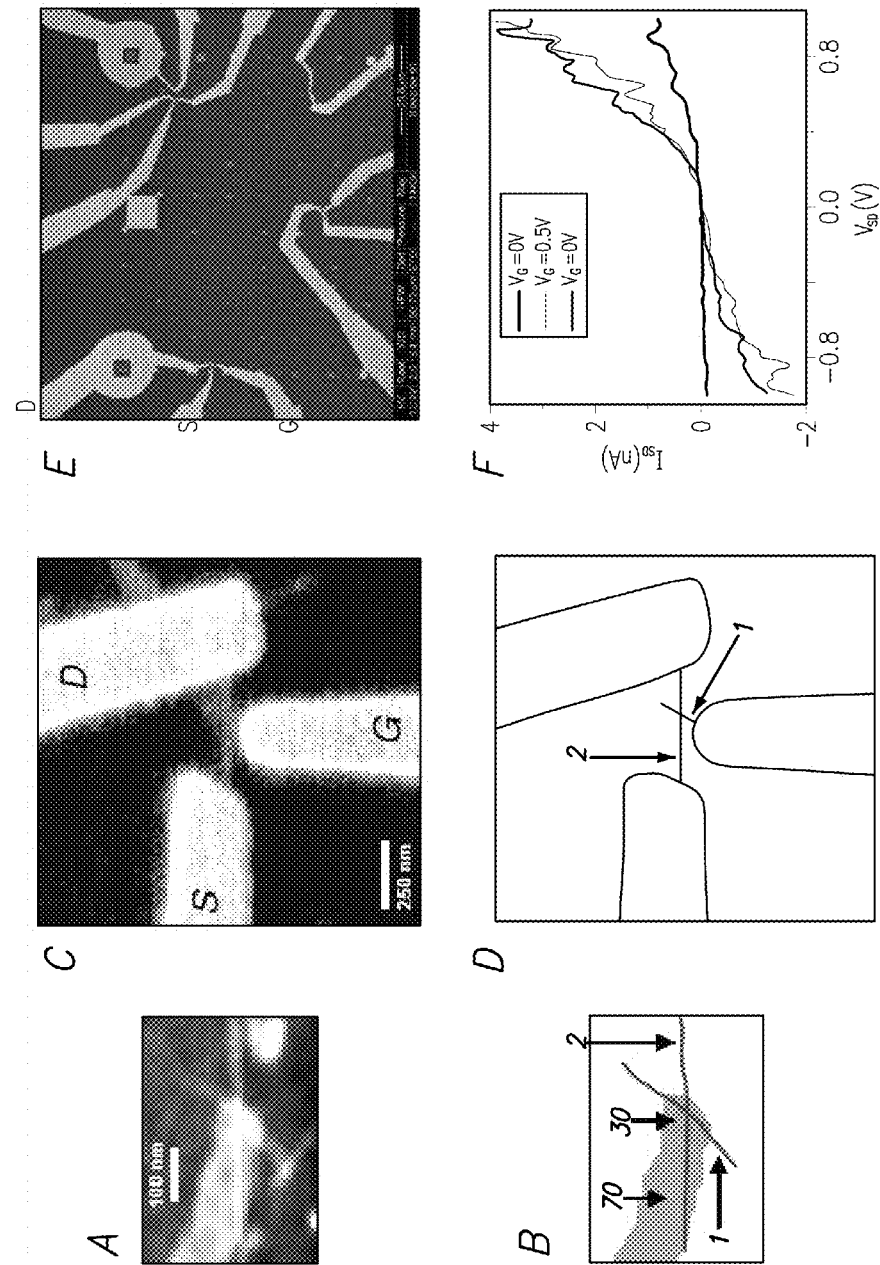
FIG. 22 shows electrical measurements from a second SWNT cross-junction nanoassembly exhibiting FET-type behavior according to some embodiments herein disclosed. In particular, Panel A shows a dry mode AFM image of a SWNT cross-junction on silicon before deposition of electrodes. Panel B shows a schematic of the interpretation of Panel A indicating position of SWNT (1, 2) as well as platform (30) and ribbon (70). Panel C shows a scanning electron micrograph (SEM) of the device of Panel A after Pd/Au electrode deposition. Panel D shows a schematics of the interpretation of Panel C indicating SWNTs (1, 2). Panel E shows an SEM of large field showing electrodes short-lived device, alignment marks, and a variety of contacts to other devices. Panel F shows a chart of the electrical measurement of gate-dependent switching of a resistive SWNT (2), where the SWNT (1) is used as the gate. A constant back gate voltage of 10 V is used for this measurement.

Electrodes are then thermally evaporated via e-beam evaporator (Temescal BJD 1800). Each electrode has ~5 nm thick Pd layer contacting the SWNT and 40 nm Au layer protecting the Pd contact. (Palladium was chosen over gold or chromium because palladium has better wetting properties than gold and it has been shown to produce a smaller Schottky barrier at contacts with SWNT than does chromium because its work function better matches that of carbon nanotubes. Further, a standard high temperature annealing protocol [e.g. 600° C. for 30 minutes under argon] was not applied in attempt to preserve the DNA templates.) Finished devices are shown in FIG. 20, FIG. 21 and FIG. 22 further illustrated in Example 15.

Example 15

Electrical Characterization of SWNT Cross-junction Nanodevices

After the resist lift-off process (Example 14), the device is mounted in a chip holder and electrical contact between the bonding pads and holders are made using a wire bonder. The chip holder is inserted in a socket connected to our measuring setup.

In all, fabrication on 23 cross-junctions was attempted. Of these, six had measurable conductance in one or both nanotubes, three had field effect transistor (FET) like behavior. Of the three FET-like devices, one had stable properties throughout the period of measurement.

All devices were characterized using similar procedures. FIG. 20 and FIG. 21 show the measurement setup and results of the stable FET-like device (giving similar results over tens of measurements). FIG. 22 shows the measurement setup and results for an additional FET-like device, which was short-lived (providing just the three sweeps in FIG. 22).

Outputs from a digital-to-analog converter (DAC) card (National instruments) in a PC were used to maintain voltages between different electrodes. Currents were measured via a current pre-amplifier which also served as a virtual ground. Our four-electrode setup allowed us to measure each SWNT independently and determine its room temperature properties. In general, for a given device, the two terminal current flow across each nanotube as a function of voltage was measured first (the other nanotube is left floating) to see if good contacts had been made. Then IV curves were measured as a function of back-gate voltage to determine if the SWNT was metallic or semiconducting (except in cases where the back-gate failed, as in the case of the stable device). Based on these IV curves (and if there was potential for FET-type behavior) one SWNT was chosen as the channel, and the other as the gate channel, and assigned the four electrodes as source (S), drain (D), gate (G) and auxiliary gate (g) electrodes.

After picking the channel and gate nanotubes, the inter-nanotube tunneling current as a function of applied gate voltage was measured. Using this data, a suitable range of gating voltage $V_G$ was chosen followed by a measurement of (a) $I_{SD}$ at fixed $V_{SD}$ as a function of $V_G$ and (b) $I_{SD}$ at fixed $V_G$ as a function of $V_{SD}$. During these measurements, one terminal of the gate SWNT (G) is connected to the applied voltage while the other terminal (g) is left floating. To protect the device from the gate's insulating layer breakdown etc. the voltage, $V_G$, is applied through a 100 MΩ resistor which, along with the gate capacitance, acts as a low-pass filter.

In particular, FIG. 20 shows the stable device and its function as a FET; FIG. 21 shows more detailed data on its electronic properties.

Two electrode measurements across each SWNT suggested that one SWNT (from source electrode S to drain electrode D) was a p-type semiconductor and the other SWNT (from gate electrode G to auxiliary electrode g) was either metallic or semiconducting. (For this particular device, the back-gate was not functioning.) The SWNT was chosen across electrodes S and D to be the conducting channel due the much lower apparent resistance of that channel (~2 MΩ, see FIG. 21). The SWNT across electrodes G and g was chosen to be the gate channel due to that channel's high resistance (~6 GΩ channel resistance, see FIG. 20B). However, the inter-nanotube current measurement between electrodes G and D indicates that the resistance (~3 MΩ resistance for $V_{GD}$<−0.5 V, FIG. 20C) through the gate nanotube and electrode G (where the gating voltage is applied) may be far lower than 1 GΩ at negative gate voltages.

Measurement of the inter-nanotube tunneling current (FIG. 20C) also shows an insulating region between $V_{GD}$~−0.5 V to 0.5 V. This could be due to insulation by DNA or other organic residue or an inter-nanotube Schottkey barrier. Sweep $V_{GD}$ in this range was done to characterize FET-type gating of the current channel and confirmed the identity of the (1) SWNT as a p-type semiconductor.

The gate electrode G is in close proximity (~70 nm) to the conduction channel SWNT and may contribute to the current switching behavior shown in FIG. 20D. Further experiments are needed to understand the field effect gating mechanism and to decouple the contribution of the SWNT gate from that of gate electrode.

For the stable device we were unable to separate the gate capacitance contribution of the metal side electrode (FIG. 20C, electrode G) from the nanotube top gate. To get an estimate for individual capacitance per unit length for the inter-nanotube junction and the metal side electrode we simulate our device geometry using Femlab software. The Femlab estimates are then used in a resistance ratio model to obtain a ratio of the gating contribution from the two possible gating mechanisms in our device.

The side metal electrode shape is modeled similar to the real metal electrode's shape shown in FIG. 20C. It is constructed as a semicircle of 100 nm diameter, connected to a rectangular piece, and of thickness 30 nm. The capacitance between a (1) nanotube of diameter 2 nm and the metal side gate with a 70 nm separation is simulated. For the capacitance simulation we confined the calculation to a 70 nm wide section centered around the gate electrode in order to better estimate the relative impact of the gate electrode as compared to the top nanotube gate. For this geometry we estimated the gate electrode capacitance to be 0.3 aF with a corresponding capacitance per length of ~0.004 aF/nm.

For the inter-nanotube capacitance a 10 nm section of the 2 nm diameter top gate nanotube (2) over a 2 nm diameter nanotube (1) with a 4 nm separation was considered. We chose a 4 nm inter-nanotube separation because the DNA nanoscaffolds between the NL-SWNTs is made of dsDNA (diameter of B-form dsDNA ~2 nm) and each NL-SWNT has a ssDNA (~1 nm diameter each) stacked around it. Also only capacitance for a 10 nm section of the top nanotube is considered as the fringing fields are not important past this point. The capacitance for this geometry is 0.2 aF which corresponds to ~0.02 aF/nm. Therefore the inter-nanotube geometric capacitance per length is approximately five times that of the metal electrode-nanotube capacitance per length.

The capacitance per unit length can be related to charge density to obtain a resistance ratio for the gating effect from the nanotube top gate ((2) nanotube) and the metal side electrode on a segment of the channel nanotube (1). Since the charge density determines the resistivity, we multiply it by appropriate length to get a resistance for each segment. Then the resistance for a particular segment is $R=L/(C_L V_g \mu)$, where $C_L$ is the capacitance, $V_g$ is the gate voltage and, $\mu$ is the electron mobility. We assume the electron mobility to be a constant along the length of the (1) nanotube and the gate voltage to be the same for the top nanotube gate and side metal electrode. Then the ratio of the two segment resistances from the two different gating mechanisms gives, $R_1/R_2=(C_2 L_1)/(C_1 L_2)$ where $L_1$ and $L_2$ are the nanotube segment lengths, $R_1$ and $R_2$ are the segment resistances with respect to the nanotube top gate and the metal side electrode, ($C_1$ and $C_2$ are the capacitances per unit length for each segment. Using the Femlab simulation values above for ($C_1$ and $C_2$, we get $R_1/R_2=35$.

For the stable device (FIG. 20C), the (1) SWNT was used as the conduction channel and the (2) SWNT as the presumptive gate. Two-terminal I/V measurement across the source (S) and drain (D) electrodes of the (1) SWNT (with $V_G=0$) gave ~2 MΩ resistance in the ohmic region (FIG. 21A). I/V measurements across the gate electrodes (G and g) of the (2) SWNT (with channel electrodes S and D left floating) gave ~6 GΩ resistance (FIG. 21B). However the inter-SWNT tunneling current ($I_{GD}$ with S and g floating) showed only ~3 MΩ of resistance when $V_{GD}<-0.5$ V (FIG. 21C), indicating that the portion of the (2) SWNT leading from electrode G to the cross-junction is more conductive than implied by the measurement of I/V between G and g, and suggesting that the (2) SWNT-electrode g contact is responsible for the high resistance between G and g. (It is extremely rare for all four contacts in such devices to below resistance [49].)

For $V_{GD}$ between ±0.5 V, the resistance was high (the inter-SWNT tunneling current was negligible, FIG. 21C) providing a region in which the (2) SWNT could serve as a gate. Our intent had been that the DNA layer between the SWNTs would act as an insulator/dielectric to create this effect. However, for this device, an intact template after liftoff of the resist was not found. Thus possible causes of the high resistance region include remnant DNA, a Schottky barrier between the two SWNTs [50] or defects in the conduction path from G to D. (In any case, an adequate conduction barrier was obtained.) Finally, to test for FET behavior, the gate voltage $V_{GD}$ (+0.5 V) was swept at constant channel voltage ($V_{SD}=0.85$ V). It was observed the that the channel current ($I_{SD}$) was consistent with field-effect gating of a p-type semiconducting SWNT (FIG. 20D). The transconductance ($dI_{SD}/dV_{Gg}$) may contain contributions from the electric fields of both the (2) SWNT and electrode G (G was ~70 nm from the (1) SWNT); quantification of these contributions and determination of gating mechanism will require more sophisticated experiments such as scanned gate measurements [51].

Previous electrical characterization of crossed carbon nanotubes [50, 52, 53, 54, 49, 55] includes the creation other of CNT-gated CNT-FETs from crosses of semiconducting and metallic SWNTs with explicitly deposited $SiO_2$ dielectric layers [55] and the observation of rectification in crossjunctions formed by metal and semiconducting SWNTs [50]. Our stable device is not directly comparable to these devices because identification of the gate SWNT as a metal or semiconductor is ambiguous. However the behavior of the stable device falls within the range of behaviors previously reported.

Example 16

Placement of DNA Hooks

Hooks can be placed on a template according to various approaches which vary in view of the experimental design. Assuming the goal is to position DNA hooks without unduly disturbing the geometric conformation or the integrity of the platform, there are a number of design principles.

The skilled person should determine that hook placement does not result in a situation where (i) hook placement creates lines of weakened sites such that it would be easy for a defect to travel down the line of hook positions and successively unravel the platform (ii) repulsion between neighboring single stranded hooks creates intolerable distortion of the platform geometry (iii) placement of hooks disturbs critical structural features such as crossover points that hold together neighboring DNA helices.

To properly project the hooks in the correct orientation, the designer should carefully note the position of the DNA backbone relative to the plane of the platform and place the attachment point of the DNA hook at a backbone position commensurate with the desired direction of hook projection.

The hooks should not be substantially complementary to neighboring segments or distal single stranded segments on the platform.

The user should take careful note of the expected spacing of linkers on the nanomaterials, and the length of the nanomaterials and place the hooks at a spacing that ensures (i) that the nanomaterial's linkers will bind to two or more hooks (ii) binding between the hooks and the linkers will not distort the platform or the material in an undesirable way.

In general, the user should examine the geometry of the resulting platform and the platform bound to the nanomaterials under an AFM, SEM, TEM or another microscopy method. If undesirable distortions or defects occur, the user can change (i) the positioning of the hooks (ii) the type of hooks used and (iii) the strength of the binding interaction between the hooks and the linkers.

Example 17

Linker Polynucleotides

Linker polynucleotides can be designed within a various range of shapes, lengths, configuration and sequences according to an experimental design of choice.

FIG. 23 shows different variants of a polynucleotide linker described with reference to embodiments where the polynucleotide is DNA. All of the linkers depicted in FIG. 23 are designed for usage when long segments of single stranded DNA can cause problems by nonspecific association with the nanomaterials. Thus, certain segments are protected by DNA duplexes. In all panels, segment (1) is a toehold, (2) and (2') are the two complementary sides of a duplex protected labeling segment, and (3) and (4) are single DNA regions designed to associate with the nanomaterials. All linkers consist of some combination of DNA, LNA, PNA and other nucleic acid analogues. Some of the reasons to use synthetic analogues of DNA include higher melting temperature, better compatibility with living organisms, better chemical stability.

All duplexes need to be ~10 bases or longer unless synthetic bases such as LNA, PNA or 2'-o-methyl DNA are used to increase the melting temperature of the duplex. PNA also has the special property that it can recognize and form triplex structures with specific dsDNA segments. Thus, use of a PNA segment (1) could allow the linker to bind to dsDNA segments in the platform. Panels A and B show DNA linkers comprised of 2 strands. Panels D and E show DNA linkers comprised of 1 strand. In this case, the strand forms a hairpin and the loop of the hairpin serves as the toehold. Because hairpin is energetically more stable than a duplex comprised of two separate strands, region (2) could be as short as 5 bases. Synthetic bases such as LNA can be inserted into region 2 to increase stability. Panel C shows a DNA linker where the attachment to the nanomaterials is accomplished via a chemical linker moiety (indicated by an asterisk *). The toehold region can also have a terminal or internal linker for attachment to the platform. This linker should be a different moiety than the one for attaching to the nanomaterials. Panel F shows a linker where region (2) has additional chemical modifications such as poly ethylene glycol sidechains to prevent binding to the nanomaterials.

Example 18

Hooks Polynucleotides

Hook polynucleotides can be designed within a various range of shapes, lengths, configuration and sequences according to an experimental design of choice.

FIG. 24 shows variations of polynucleotide hooks for attachment of carbon nanotubes and other nanomaterials that have been conjugated to polynucleotide linkers described with reference to embodiments where the polynucleotide is DNA. In general the DNA linker can base pair with any single stranded DNA or modified polynucleotide that is attached onto the "platform".

Specific examples are shown in the different FIG. 24A-C. FIG. 24A shows a single stranded DNA hook with one end attached to the platform. This DNA hook may be attached via base pairing to a scaffold strand. For example, the 5' or 3' end of a staple strand in a DNA origami could be extended. Alternatively, the hook may be attached via base pairing to other short DNA strands comprising the platform. For example, in a platform assembled from DNA tiles, one of the DNA strands in a selected tile could be extended. Alternatively, a hook could be attached via base pairing to a single stranded DNA region or a single stranded DNA hook that already exist on the platform. This could be used to adapt one set of hooks to bind a different DNA linker than their original intended targets. Alternatively, a multi branched DNA strand can be synthesized.

For example, a DNA staple in a DNA origami can have a single stranded extension covalently attached to its backbone. This is available for purchasing from some DNA synthesis companies. Alternatively, a covalent or non-covalent chemical linkage (other than DNA base pairing) can be used to attach a hook to a platform. For example, strands in a DNA tile could have internal biotin functionalizations. A biotin functionalized DNA hook could be attached to each biotin functionalized DNA tile via an intermediary Streptavidin. Other linker chemistries included disulfide bonds, acrodite-amine linkages, CLICK compatible chemistries and all chemistries that are (i) able to function in an aqueous solution at (ii) pH 6-9 and (iii) with salt concentrations tolerable by the self assembled platform (iv) at a temperature below the melting temperature of the platform and (v) will not react non-specifically with other chemical moieties that comprise the platform. FIG. 24B shows a row of hairpins acting as DNA hooks. The DNA linker can base pair with the single stranded loop regions of the hairpins provided that the loops are 6 bases or longer. The stems of the hairpins can be 5 base pairs or longer. Either the 5' end or the 3' end or both ends of the hairpin could be attached to the platform. FIG. 24C shows a row of single stranded regions on the platform acting as DNA hooks. For example, on a DNA origami, select segments of the scaffold strand can be single stranded.

Alternatively, a DNA staple (for an origami) or other short DNA strand can have an internal region that does not base pair to the scaffold (in the case of the origami) or other DNA strands comprising the platform (tile assemblies). FIG. 24D shows a case where duplex regions on a DNA platform can serve as attachment points for DNA linkers. This could be used if the DNA linker incorporates an element that can recognize and bind to double stranded DNA helix with a specific sequence of base-pairs. For example, PNA has well known mechanisms that recognize and bind to double stranded DNA (Targeting Double Stranded DNA with Peptide Nucleic Acid (PNA), Current Medicinal Chemistry, 2001, 8, 545-550). Other examples include small molecules that can bind to the major or minor grooves of double stranded DNA, RNA, etc ("Defining the sequence-recognition profile of DNA-binding molecules," Proc. Natl. Acad. Sci. USA 103, 867-872 (2006)).

This approach is most easily used when the platform has rows of repeated double stranded DNA base-pairs as in, for example, a DNA tile assembly. The main advantage is that since the molecules recognize double stranded DNA, excess single stranded DNA that fail to self assemble into DNA platforms need not be removed before the platform is mixed with the DNA linker conjugated nanomaterials. FIG. 24E shows that DNA hooks can be positioned on the side of the DNA platform. FIG. 24F shows that multiple types of DNA hooks could be placed on a single DNA platform and a subset of the hooks could incorporate additional chemical linkers (biotin, acrodite, Thiol, and others as outlined previously).

Example 19

Structures Comprising Nanomaterial Attached to a Template Via a Linker-hook Interaction Various structures can be formed by conjugating linkers and hooks presented on a platform according to an experimental design of choice.

FIG. 25 shows different ways that a DNA (or other polynucleotide) linker conjugated carbon nanotube (or other nanomaterials) can be attached to the platform. FIG. 25A shows DNA hooks from FIG. 24 Panel A binding to the linker. In this case, the side of the hook nearest to the platform binds to the toehold segment. The protection strand ((2') in FIG. 23) has been fully displaced. FIG. 25B is similar, but this time the DNA hook only binds to the toehold segment on the DNA linker. FIG. 25C is similar to FIG. 25A but the side of the DNA hook furthest from the platform binds to the toehold region. This ensures that the linker segment closest to the nanotube is base paired with the hook segment closest to the platform. Thus, it brings the nanotube closer to the platform surface. Note that the minimal length of base pairing between the linker and the hook should be 4 base pairs. FIG. 25D and FIG. 25E show nanotubes bound to hooks arranged in a row or in staggered configurations. The benefit of a staggered configuration is that the position of the nanotube is geometrically limited to sit between the staggered binding sites. Thus, this may offer more precise positioning. FIG. 25F shows a nanotube bound to the side of a platform. Note that not all hooks or linkers need to be bound.

The structures of FIG. 25 can all be produced using procedures herein described. A skilled person will be able to identify all the necessary modification of the techniques upon reading of the present disclosure.

Example 20

Structure Comprising Multiple Nanotubes Organized Following a Predetermined Pattern The above sections exemplify how to make and use the structure including one nanomaterial. Additional procedures are herein exemplified to make and use a grid of different kind and number of nanotubes.

Linkers and corresponding hooks can be designed using computational techniques to minimize interference between hooks and linkers on a template of choice. Design will take into account also interference with the integrity of the template of choice using techniques exemplified above in Example 16.

The template will be self assembled incorporating the linkers and using different carbon nanotubes. Different carbon nanotubes with different specifically designed properties will be separately conjugated with the respective linkers according to the experimental design and using techniques exemplified in previous examples (to be completed). Both the template and the carbon nanotubes will be separately purified using techniques previously exemplified in the present disclosure and mixed together under optimized solution conditions also exemplified in the present disclosure.

To maximize the efficiency of the assembly the templates can be first anchored to a solid support so they are all well separated and then add the carbon nanotube solution either all together or one by one.

Figure 26:
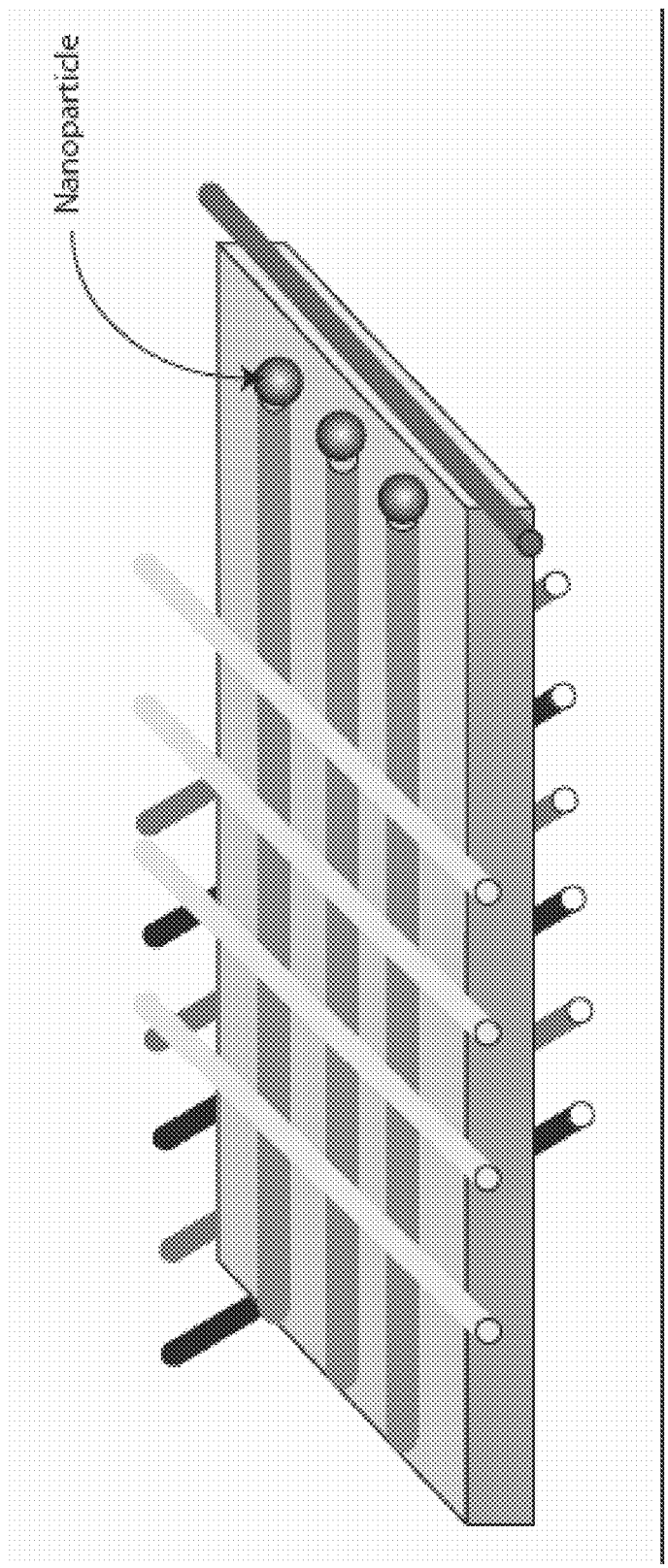
FIG. 26 shows a schematic representation of a structure according to some embodiments herein described.

An example of the resulting structure is described in FIG. 26, which shows an example of a cross bar nanomaterial organization placed on either side of an origami DNA structure. In the illustration of FIG. 26 the DNA structure has dots attaching additional nanoparticles of preselected sizes, different layers of nanomaterial, and positioning of the nanomaterial on various location on the origami structure which include the side of the DNA template.

In particular FIG. 26 shows several carbon nanotubes arranged in a pre-determined pattern on a DNA template. Different shading indicates carbon nanotubes with different pre-determined properties. There is one layer of carbon nanotubes of two types under the template, one carbon nanotube on the side of the template, and a two layer crossbar on top of the template. Each carbon nanotube position is assigned a distinctive linker sequence. At the ends of the first layer on top of the template, three nanoparticles are placed using another linker with a sequence common to the three.

The examples set forth above are provided to give those of ordinary skill in the art a complete disclosure and description of how to make and use the embodiments of the polynucleotides, structures, assemblies, arrangements, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) in the Background, Summary, Detailed Description, and Examples is hereby incorporated herein by reference.

Further, the hard copy of the sequence listing submitted herewith and the corresponding computer readable form are both incorporated herein by reference in their entireties.

It is to be understood that the disclosures are not limited to particular compositions or biological systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Although any methods and materials similar or equivalent to those described herein can be used in the practice for testing of the specific examples of appropriate materials and methods are described herein.

A number of embodiments of the disclosure have been described. Nevertheless, it will be understood that various modifications may be made without departing from the spirit and scope of the present disclosure. Accordingly, other embodiments are within the scope of the following claims.

REFERENCES

[1] Kenji Hata, Don N. Futaba, Kohei Mizuno, Tatsunori Namai, Motoo Yumura, and Sumio Iijima. Water-assisted highly efficient synthesis of impurity-free single-walled carbon nanotubes. *Science*, 306(5700):1362-1364, 2004.

[2] Ming Zheng, Anand Jagota, Ellen D. Semke, Bruce A. Diner, Robert S. Mclean, Steve R. Lustig, Raymond E. Richardson, and Nancy G. Tassi. DNA-assisted dispersion and separation of carbon nanotubes. *Nature Materials*, 2(5):338-342, 2003.

[3] Michael S. Arnold, Alexander A. Green, James F. Hulvat, Samuel I. Stupp, and Mark C. Hersam. Sorting carbon nanotubes by electronic structure using density differentiation. *Nature Nanotechnology*, 1(1):60-65, 2006.

[4] Ming Zheng, Anand Jagota, Michael S. Strano, Adelina P. Santos, Paul Barone, S. Grace Chou, Bruce A. Diner, Mildred S. Dresselhaus, Robert S. Mclean, G. Bibiana Onoa, Georgii G. Samsonidze, Ellen D. Semke, Monica Usrey, and Dennis J. Walls. Structure-based carbon nanotube sorting by sequence-dependent DNA assembly. *Science*, 302(5650):1545-1548, 2003.

[5] X. Huang, R. S. McLean, and M. Zheng. High-resolution length sorting and purification of DNA-wrapped carbon nanotubes by size-exclusion chromatography. *Analytical Chemistry*, 77(19):6225-6228, 2005.

[6] W.-Q. Deng, Y. Matsuda, and W. A. Goddard. Bifunctional anchors connecting carbon nanotubes to metal electrodes for improved nanoelectronics. *Journal of the American Chemical Society*, 129(32):9834-9835, 2007.

[7] Qing Cao and John A. Rogers. Ultrathin films of single-walled carbon nanotubes for electronics and sensors: A review of fundamental and applied aspects. *Advanced Materials*, 21:29-53, 2009.

[8] Richard D. Piner, Jin Zhu, Feng Xu, Seunghun Hong, and Chad A. Mirkin. "Dip-pen" nanolithography. *Science*, 283 (5402):661-663, 1999.

[9] C. Vieu, F. Carcenac, A. P'epin, Y. Chen, M. Mejias, A. Lebib, L. Manin-Ferlazzo, L. Couraud, and H. Launois. Electron beam lithography: resolution limits and applications. *Applied Surface Science*, 164:111-117, 2000.

[10] S. Y. Chou, P. R. Krauss, and P. J. Renstrom. Imprint lithography with 25-nanometer resolution. *Science*, 272(5):85-87, 1996.

[11] Wei Wu, William M. Tong, Jonathan Bartman, Yufeng Chen, Robert Walmsley, Zhaoning Yu, Qiangfei Xi, Inkyu Park, Carl Picciotto, Jun Gao, Shih-Yuan Wang, Deborah Morecroft, Joel Yang, Karl K. Berggren, and R. Stanley Williams. Sub-10 nm nanoimprint lithography by wafer bowing. *Journal of the American Chemical Society*, 8(11): 3865-3869, 2008.

[12] Yuhuang Wang, Daniel Maspoch, Shengli Zou, and George C. Schatz. Controlling the shape, orientation, and linkage of carbon nanotube features with nano affinity templates. *PNAS*, 103(7):2026-2031, 2006.

[13] Michael R. Diehl, Sophia N. Yaliraki, Robert A. Beckman, Mauricio Barahona, and James R. Heath. Self-assembled, deterministic carbon nanotube wiring networks. *Angew. Chem. Int. Ed.*, 41(2):353-356, 2002.

[14] Keith A. Williams, Peter T. M. Veenhuizen, Beatriz G. de la Torre, Ramon Eritja, and Cees Dekker. Nanotechnology: Carbon nanotubes with DNA recognition. *Nature*, 420: 761, 2002.

[15] Sébastien Lyonnais, Chia-Ling Chung, Laurence Goux-Capes, Christophe Escudé, Olivier Piétrement, Sonia Baconnais, Eric Le Cam, Jean-Philippe Bourgoin, and Arianna Filoramo. A three-branched DNA template for carbon nanotube self-assembly into nanodevice configuration. *Chemical Communications*, pages 683-685, 2009.

[16] K. Keren, R. S. Berman, E. Buchstab, U. Sivan, and E. Braun. DNA-templated carbon-nanotube field effect transistor. *Science*, 302(1380), 2003.

[17] Miron Hazani, Frank Hennrich, Manfred Kappes, Ron Naaman, Dana Peled, Victor Sidorov, and Dmitry Shvarts. DNA-mediated self-assembly of carbon nanotube-based electronic devices. *Chemical Physics Letters*, 391:389-392, 2004.

[18] J. P Bourgoin, J. Borghetti, P. Chenevier, V. Derycke, A. Filoramo, L. Goux, M. F. Goffman, J. M. Bethoux, H. Happy, G. Dambrine, S. Lenfant, and D. Vuillaume. Directed assembly for carbon nanotube device fabrication. *proceedings of the International Electron Devices Meeting (IEDM)*, pages 1-4, 2006.

[19] Nadrian C. Seeman. Nucleic-acid junctions and lattices. *Journal of Theoretical Biology*, 99(2):237-247, 1982.

[20] Nadrian C. Seeman. An overview of structural DNA nanotechnology. *Molecular Biotechnology*, 37(3):246-257, 2007.

[21] Bruce H. Robinson and Nadrian C. Seeman. The design of a biochip: A self-assembling molecular-scale memory device. *Protein Engineering*, 1(4):295-300, 1987.

[22] J. Chen and Nadrian C. Seeman. The synthesis from DNA of a molecule with the connectivity of a cube. *Nature*, 350:631-633, 1991.

[23] W. M. Shih, J. D. Quispe, and G. F. Joyce. A 1.7-kilobase single-stranded DNA that folds into a nanoscale octahedron. *Nature*, 427(6453):618-621, 2004.

[24] Dmytro Nykypanchuk, Mathew M. Maye, Daniel van der Lelie, and Oleg Gang. DNA-guided crystallization of colloidal nanoparticles. *Nature*, 451(7178):549-552, 2008.

[25] Sung Yong Park, Abigail K. R. Lytton-Jean, Byeongdu Lee, Steven Weigand, George C. Schatz, and Chad A. Mirkin. DNA-programmable nanoparticle crystallization. *Nature*, 451(7178):553-556, 2008.

[26] Yariv Y. Pinto, John D. Le, Nadrian C. Seeman, Karin Musier-Forsyth, T. Andrew Taton, and Richard A. Kiehl. Sequence-encoded self-assembly of multiple-nanocomponent arrays by 2D DNA scaffolding. *Nano Letters*, 5(12): 2399-2402, 2005.

[27] F. A. Aldaye and H. F. Sleiman. Dynamic DNA templates for discrete gold nanoparticle assemblies: Control of geometry, modularity, write/erase and structural switching. *Journal of the American Chemical Society*, 129(14): 4130-4131, 2007.

[28] Sung Ha Park, Peng Yin, Yan Liu, John H. Reif, Thomas H. LaBean, and Hao Yan. Programmable DNA self-assemblies for nanoscale organization of ligands and proteins. *Nano Letters*, 5(4):729-733, 2005.

[29] Paul W. K. Rothemund. Folding DNA to create nanoscale shapes and patterns. *Nature*, 440:297-302, 2006.

[30] A. DeHon. Array-based architecture for FET-based, nanoscale electronics. *IEEE Transactions on Nanotechnology*, 2(1):23-32, 2003.

[31] C. Dwyer, V. Johri, M. Cheung, J. Patwardhan, A. Lebeck, and D. Sorin. Design tools for a DNA-guided self-assembling carbon nanotube technology. *Nanotechnology*, 15(9):1240-1245, 2004.

[32] Jaidev P. Patwardhan, Vijeta Johri, Chris Dwyer, and Alvin R. Lebeck. A defect tolerant self-organizing nanoscale SIMD architecture. *SIGARCH Computer Architecture News*, 34(5):241-251, 2006.

[33] Ph. Avouris, J. Chen, M. Freitag, V. Perebeinos, and J. C. Tsang. Carbon nanotube optoelectronics. *Physica status solidi. B. Basic research*, 243(13):3197-3203, 2006.

[34] Yonggang Ke, Stuart Lindsay, Yung Chang, Yan Liu, and Hao Yan. Self-assembled water-soluble nucleic acid probe tiles for label-free RNA hybridization assays. *Science*, 319: 180-183, 2008.

[35] Yuerui Lu, Sarunya Bangsaruntip, Xinran Wang, Li Zhang, Yoshio Nishi, and Hongjie Dai. DNA functionalization of carbon nanotubes for ultrathin atomic layer deposition of high k dielectrics for nanotube transistors with 60 mv/decade switching. *J. Am. Chem. Soc.*, 128(11): 3518-3519, 2006.

[36] Esther S. Jeng, Paul W. Barone, John D. Nelson, and Michael S. Strano. Hybridization kinetics and thermodynamics of DNA adsorbed to individually dispersed single-walled carbon nanotubes. *Small*, 3(9):1602-1609, 2007.

[37] Yi Chen, Haipeng Liu, Tao Ye, Junghwa Kim, and Chengde Mao. DNA-directed assembly of single-wall carbon nanotubes. *J. Am. Chem. Soc.*, 129(28):8696-8697, 2007.

[38] Y. Li, X. Han, and Z. Deng. Grafting single-walled carbon nanotubes with highly hybridizable DNA sequences: Potential building blocks for DNA-programmed material assembly. *Angewandte Chemie International Edition*, 46:7481-7484, 2007.

[39] Eung-Soo Hwang, Chengfan Cao, Sanghyun Hong, Hye-Jin Jung, Chang-Yong Cha, Jae-Boong Choi, Young-Jin Kim, and Seunghyun Baik. The DNA hybridization assay using single-walled carbon nanotubes as ultrasensitive, long-term optical labels. *Nanotechnology*, 17:3442-3445, 2006.

[40] Bernard Yurke, Andrew J. Turberfield, Allen P. Mills, Jr., Friedrich C. Simmel, and Jennifer L. Nuemann. A DNA-fuelled molecular machine made of DNA. *Nature*, 406: 605-608, 2000.

[41] Nadrian C. Seeman. De novo design of sequences for nucleic acid structural engineering. *Journal of Biomolecular Structure & Dynamics*, 8(3):573-581, 1990.

[42] Stephanie R. Vogel, Manfred M. Kappes, Frank Hennrich, and Clemens Richert. An unexpected new optimum in the structure space of DNA solubilizing singlewalled carbon nanotubes. *Chem. Eur. J.*, 13:1815-1820, 2007.

[43] Bernie Yurke and A. P. Mills Jr. Using DNA to power nanostructures. *Genet. Program Evolvable Mach.*, 4:111-122, 2003.

[44] Igor G. Panyutin and Peggy Hsieh. Kinetics of spontaneous DNA branch migration. *Proc. Nat. Acad. Sci. USA*, 91:2021-2025, 1994.

[45] U. Christensen, N. Jacobsen, V. K. Rajwanshi, J. Wengel, and T. Koch. Stopped-flow kinetics of locked nucleic acid (LNA)-oligonucleotide duplex formation: studies of LNA-DNA and DNA-DNA interactions. *Biochemical Journal*, 354:481-484, 2001.

[46] Rebecca Schulman and Erik Winfree. Synthesis of crystals with a programmable kinetic barrier to nucleation. *Proc. Nat. Acad. Sci. USA*, 104:15236-15241, 2007.

[47] Robert D. Barish, Rebecca Schulman, Paul W. K. Rothemund, and Erik Winfree. An information-bearing seed for nucleating algorithmic self-assembly. *To appear in Proceedings of the National Academy of Sciences*, 2009.

[48] Patrick O'Neill, Paul W. K. Rothemund, Ashish Kumar, and D. Kuchnir Fygenson. Sturdier DNA nanotubes via ligation. *Nano Letters*, pages 1379-1383, 2006.

[49] B. Gao, A. Komnik, R. Egger, D. C. Glattli, and A. Bachtold. Evidence for Luttinger-liquid behavior in crossed metallic single-wall nanotubes. *Physical Review Letters*, 92(21):216804-1-216804-4, 2004.

[50] M. S. Fuhrer, J. Nygard, L. Shih, M. Forero, Y.-G. Yoon, M. S. C. Mazzoni, Y. H. J. Choi, J. Ihm, S. G. Louie, A. Zettl, and Paul L. McEuen. Crossed nanotubes junctions. *Science*, 288:494-497, 2000.

[51] A. Bachtold, M. S. Fuhrer, S. Plyasunov, M. Forero, Erik H. Anderson, A. Zettl, and Paul L. McEuen. Scanned probe microscopy of electronic transport in carbon nanotubes. *Physical Review Letters*, 84(26):6082-6085, 2000.

[52] Henk W. Ch. Postma, Mark de Jonge, Zhen Yao, and Cees Dekker. Electrical transport through carbon nanotube junctions created by mechanical manipulation. *Phys. Rev. B*, 62(16):R10653-R10656, October 2000.

[53] M. Ahlskog, R. Tarkiainen, L. Roschier, and P. Hakonen. Single-electron transistor made of two crossing multi-walled carbon nanotubes and its noise properties. *Journal of Applied Physics*, 77(24):40-37-4039, 2000.

[54] J. W. Park and Jinhee Kim K.-H. Yoo. Electrical transport through crossed carbon nanotube junctions. *Journal of Applied Physics*, 93(7):4191-4193, 2003.

[55] D. S. Lee, J. Svensson, S. W. Lee, Y. W. Park Y W, and E. E. B. Campbell. Fabrication of crossed junctions of semi-conducting and metallic carbon nanotubes: A CNT-gated CNT-FET. *Journal of Nanoscience and Nanotechnology*, 6(5):1325-1330, 2006.

[56] Anton Kuzyk, Bernard Yurke, J. Jussi Toppari, Veikko Linko, and Paivi Torma. Dielectrophoretic trapping of DNA origami. *Small*, 4(4):447-450, 2008.

[57] Thomas Rueckes, Kyoungha Kim, Ernesto Joselevich, Greg Y. Tseng, Chin-Li Cheung, and Charles M. Lieber. Carbon nanotube-based nonvolatile random access memory for molecular computing. *Science*, 289(5476):94-97, 2000.

[58] Adrian Bachtold, Peter Hadley, Takeshi Nakanishi, and Cees Dekker. Logic circuits with carbon nanotube transistors. *Science*, 294(9):1317-1320, November 2001.

[59] Zhaohui Zhong, Deli Wang, Yi Cui, Marc W. Bockrath, and Charles M. Lieber. Nanowire crossbar arrays as address decoders for integrated nanosystems. *Science*, 302:1377-1379, 2003.

[60] X. Tu, S Manohar, A. Jagota, M. Zheng, "DNA sequence motifs for structure-specific recognition and separation of carbon nanotubes", *Nature*, 460, 250-253 (2009)

[61] T-J. Fu and N. Seeman, "DNA double-crossover molecules." *Biochemistry*, 32, 3211 (1993)],

[62] E. Winfree, N. C. Seeman, et al., "Design and self-assembly of two-dimensional DNA crystals." *Nature*, 394, 539544 (1998)]

[63] Faisal A. Aldaye, Alison L. Palmer, Hanadi F. Sleimanl "Assembling Materials with DNA as the Guide" Science vol. 321 26 Sep. 2008, pp. 1795-1799

[64] Nadrian C. Seeman "An Overview of Structural DNA Nanotechnology" Mol Biotechnol (2007) 37:246-257

What is claimed is:

1. A structure comprising a linker polynucleotide attached both to a nonomaterial and to a polynucleotidic platform, the linker polynucleotide comprising:
   a toehold moiety specifically attached to a corresponding moiety presented on the polynucleotidic platform;
   a duplex protected labeling polynucleotide domain; and
   a nanomaterial attaching moiety comprising a poly T dispersal domain directly physisorbed on the nanomaterial,
   wherein the nanomaterial attaching moiety and the toehold moiety are on a same strand of the linker polynucleotide, and
   wherein the duplex protected labeling polynucleotide domain is configured to allow deprotection and subsequent binding upon binding of the toehold moiety to the platform.

2. The structure of claim 1, wherein the linker polynucleotide is made of DNA, nucleic acid analogues, or a combination of DNA and nucleic acid analogues.

3. The structure of claim 2, wherein the nucleic acid analogues comprise one or more of LNA and PNA.

4. The structure of claim 1, wherein the duplex protected labeling polynucleotide domain has a length of at least ten base pairs.

5. The structure of claim 1, wherein the toehold moiety is a single-stranded polynucleotide region and the corresponding moiety presented on the polynucleotidic platform is a complementary single-stranded polynucleotide region.

6. The structure of claim 5, wherein the single-stranded polynucleotide region of the toehold moiety is a hairpin loop.

7. The structure of claim 1, wherein the toehold moiety comprises a chemical linker moiety configured to specifically attach a corresponding moiety presented on the polynucleotidic platform.

8. The structure of claim 1, wherein the polynucleotidic platform comprises,
   a polynucleotide template extending along a template plane; and
   a hook polynucleotide arranged on the polynucleotidic template and comprising a linker polynucleotide attaching moiety presented on the polynucleotidic platform,
   wherein the linker polynucleotide attaching moiety of the hook polynucleotide is the corresponding moiety attached to the toehold moiety of the linker polynucleotide.

9. The structure of claim 8, wherein the hook polynucleotide is projecting out of the template plane.

10. The structure of claim 8, wherein the linker polynucleotide attaching moiety of the hook polynucleotide is spaced from a polynucleotidic template binding moiety of the hook polynucleotide.

11. The structure of claim 1, wherein the polynucleotidic platform comprises
   a polynucleotide template extending along a template plane, and
   one or more hook polynucleotides arranged on the template plane to present a linker polynucleotide attaching moiety specifically attached to a corresponding toehold moiety of the linker polynucleotide, and
wherein the polynucleotide template is a DNA origami, a DNA ribbon or a nanoscale polyhedral.

12. The structure of claim 11, wherein the structure is a three dimensional assembled structure.

13. The structure of claim 11, wherein the structure is a cross junction, a field effect transistors or a sandwiched 3D device stacks with layers of origami stacked together on top of each other.

14. The structure of claim 11, wherein the nanomaterial comprises single wall carbon nanotubes.

15. The structure of claim 1, wherein the nanomaterial comprises single wall carbon nanotubes.

16. A nanoassembly comprising:
   structure of claim 1,
wherein the nanomaterial is selected from carbon spheres, carbon nanotubes and carbon nanowires.

17. A method of organizing a nanomaterial, the method comprising;
contacting a polynucleotidic platform with a nanoassembly to form a structure comprising the nanoassembly attached to the polynucleotidic platform;
wherein
the polynucleotidic platform comprises a polynucleotide template extending along a template plane; and one or more hook polynucleotides arranged on the template plane;
wherein
the nanoassembly comprises a nanomaterial and a linker polynucleotide, the linker polynucleotide comprising:
a toehold moiety configured to specifically attach one or more corresponding linker polynucleotide attaching moiety presented on the one or more hook polynucleotides;
a duplex protected labeling polynucleotide domain configured to allow deprotection and subsequent binding upon binding of the toehold moiety to the platform; and
a nanomaterial attaching moiety comprising a poly T dispersal domain directly physisorbed on the nanomaterial;
with the nanonmaterial attaching moiety and the toehold moiety on a same strand of the linker polynucleotide,
and wherein
contacting the polynucleotide platform with the nanoassembly is performed for a time and under condition to form the structure of claim 1 by specific binding of the toehold moiety of the linker polynucleotide of the nanoassembly with the linker polynucleotide attaching moiety of the one or more hook polynucleotides.

18. A structure comprising a linker polynucleotide attached both to a nanomaterial and to a polynucleotidic platform, the linker polynucleotide comprising
a toehold moiety formed by a polynucleotide hairpin loop specifically attached to a corresponding single-stranded polynucleotide moiety presented on the polynucleotidic platform;
a duplex protected labeling polynucleotide domain; and
a nanomaterial attaching moiety directly adsorbed on the nanomaterial via physisorption.

19. A structure comprising a linker polynucleotide attached both to a nanomaterial and to a polynucleotidic platform, the linker polynucleotide comprising
a toehold moiety specifically attached to a corresponding moiety presented on the polynucleotidic platform;
a duplex protected labeling polynucleotide domain; and
a nanomaterial attaching moiety comprising a poly T dispersal domain directly physisorbed on the nanomaterial,
wherein the nanomaterial attaching moiety and the toehold moiety are on a same strand of the linker polynucleotide
wherein the toehold moiety is a single-stranded polynucleotide region and the corresponding moiety presented on the polynucleotidic platform is a complementary single-stranded polynucleotide region and
wherein the single-stranded polynucleotide region of the toehold moiety is a hairpin loop.

20. The structure of claim 19, wherein the linker polynucleotide is made of DNA, nucleic acid analogues, or a combination of DNA and nucleic acid analogues.

21. The structure of claim 20, wherein the nucleic acid analogues comprise one or more of LNA and PNA.

22. The structure of claim 19, wherein the duplex protected labeling polynucleotide domain has a length of at least ten base pairs.

23. The structure of claim 19, wherein the nanomaterial is carbon spheres, carbon nanotubes or carbon nanowires.

24. The structure of claim 19, wherein the nanomaterial comprises single wall carbon nanotubes.

25. The structure of claim 19, wherein the polynucleotidic platform comprises a polynucleotide template selected from a DNA origami, a DNA ribbon, and a nanoscale polyhedral.

* * * * *

UNITED STATES PATENT AND TRADEMARK OFFICE
CERTIFICATE OF CORRECTION

PATENT NO.         : 9,340,416 B2
APPLICATION NO.    : 12/540052
DATED              : May 17, 2016
INVENTOR(S)        : Hareem T. Maune et al.

Page 1 of 1

It is certified that error appears in the above-identified patent and that said Letters Patent is hereby corrected as shown below:

In the specification,

In the body of the text, under the title "STATEMENT OF GOVERNMENT GRANT", column 1, lines 27-31, please delete the paragraph "The U.S. Government has certain rights in this invention pursuant to Grant No. N00014-05-1-0562 awarded by the ONR - Space and Naval Warfare Systems Center (SSC) and Grant No. CTS0608889 awarded by the National Science Foundation."

and replace with "This invention was made with government support under Grant No. N00014-05-1-0562 awarded by ONR - Space and Naval Warfare Systems Center and under Grant No. CTS0608889, Grant No., CCF0622254, and Grant No. CCF0829951 awarded by the National Science Foundation. The government has certain rights in the invention."

Signed and Sealed this
Second Day of August, 2016

Michelle K. Lee
*Director of the United States Patent and Trademark Office*

```
SEQUENCE LISTING

<160> NUMBER OF SEQ ID NOS: 36

<210> SEQ ID NO 1
<211> LENGTH: 60
<212> TYPE: DNA
<213> ORGANISM: Artificial sequence
<220> FEATURE:
<223> OTHER INFORMATION: Synthetic oligonucleotide
<220> FEATURE:
<221> NAME/KEY: misc_feature
<222> LOCATION: (56)..(60)
<223> OTHER INFORMATION: RNA nucleotides modified into LNA nucleotides

<400> SEQUENCE: 1
tttttttttt tttttttttt tttttttttt tttttttttt gttgcgaggt cttgccgaca    60

<210> SEQ ID NO 2
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 2
```

```
gcaagacctc gcaac                                                    15

<210> SEQ ID NO 3
<211> LENGTH: 60
<212> TYPE: DNA
<213> ORGANISM: Artificial sequence
<220> FEATURE:
<223> OTHER INFORMATION: Synthetic oligonucleotide
<220> FEATURE:
<221> NAME/KEY: misc_feature
<222> LOCATION: (56)..(60)
<223> OTHER INFORMATION: RNA nucleotides modified into LNA nucleotides

<400> SEQUENCE: 3
tttttttttt tttttttttt tttttttttt tttttttttt atacggggct ggttaggatg   60

<210> SEQ ID NO 4
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 4
taaccagccc cgtat                                                    15

<210> SEQ ID NO 5
<211> LENGTH: 20
<212> TYPE: DNA
<213> ORGANISM: Artificial sequence
<220> FEATURE:
<223> OTHER INFORMATION: Synthetic oligonucleotide
<220> FEATURE:
<221> NAME/KEY: misc_feature
<222> LOCATION: (16)..(20)
<223> OTHER INFORMATION: RNA nucleotides modified into LNA nucleotides

<400> SEQUENCE: 5
gttgcgaggt cttgccgaca                                               20

<210> SEQ ID NO 6
<211> LENGTH: 20
<212> TYPE: DNA
<213> ORGANISM: Artificial sequence
<220> FEATURE:
<223> OTHER INFORMATION: Synthetic oligonucleotide
<220> FEATURE:
<221> NAME/KEY: misc_feature
<222> LOCATION: (16)..(20)
<223> OTHER INFORMATION: RNA nucleotides modified into LNA nucleotides

<400> SEQUENCE: 6
atacggggct ggttaggatg                                               20

<210> SEQ ID NO 7
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 7
tatatttcca tacaggcaag gcaaagctat attttttgtc ggcaagacct cgcaac       56

<210> SEQ ID NO 8
<211> LENGTH: 56
<212> TYPE: DNA
```

<213> ORGANISM: Artificial sequence
<220> FEATURE:
<223> OTHER INFORMATION: Synthetic oligonucleotide

<400> SEQUENCE: 8
caacgcaaag caataaagcc tcaggataca tttttttgtc ggcaagacct cgcaac        56

<210> SEQ ID NO 9
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 9
ctgtaatagg ttgtaccaaa aacacaaata tattttttgtc ggcaagacct cgcaac        56

<210> SEQ ID NO 10
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 10
tatgtaaaga aataccgacc gtgttaaagc cattttttgtc ggcaagacct cgcaac        56

<210> SEQ ID NO 11
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 11
taacctccaa taagaataaa cacctatcat attttttgtc ggcaagacct cgcaac        56

<210> SEQ ID NO 12
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 12
atataatggg ggcgcgagct gaaattaaca tcttttttgtc ggcaagacct cgcaac        56

<210> SEQ ID NO 13
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 13
tgcaactagg tcaataacct gtttagaatt agttttttgtc ggcaagacct cgcaac        56

<210> SEQ ID NO 14
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 14
tccatatatt tagtttgacc attaagcata aattttttgtc ggcaagacct cgcaac        56

<210> SEQ ID NO 15
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 15
agaggcatac aacgccaaca tgtatctgcg aatttttgtc ggcaagacct cgcaac        56

<210> SEQ ID NO 16
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 16
taaagtacca gtagggctta attgctaaat ttttttgtc ggcaagacct cgcaac        56

<210> SEQ ID NO 17
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 17
ccagacgaca aattcttacc agtagataaa tattttgtc ggcaagacct cgcaac        56

<210> SEQ ID NO 18
<211> LENGTH: 27
<212> TYPE: DNA
<213> ORGANISM: Artificial sequence
<220> FEATURE:
<223> OTHER INFORMATION: Synthetic oligonucleotide

<400> SEQUENCE: 18
tgatataagt atagcccgga ataggtg                                       27

<210> SEQ ID NO 19
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 19
gtcggtaata agttttaacc cgtcgagagg gtttttcatc ctaaccagcc ccgtat       56

<210> SEQ ID NO 20
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 20
gagaccctca gaaccgccac gttccagtaa gcttttcatc ctaaccagcc ccgtat       56

<210> SEQ ID NO 21
<211> LENGTH: 56
<212> TYPE: DNA
<213> ORGANISM: Artificial sequence
<220> FEATURE:

<223> OTHER INFORMATION: Synthetic oligonucleotide

<400> SEQUENCE: 21
gaggtagcac cattaccata tcaccggaac cattttcatc ctaaccagcc ccgtat      56

<210> SEQ ID NO 22
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 22
acgtaaaggt ggcaacatac cgtcaccgac tttttcatc ctaaccagcc ccgtat       56

<210> SEQ ID NO 23
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 23
aaagataacc cacaagaata agactcctta tttttcatc ctaaccagcc ccgtat       56

<210> SEQ ID NO 24
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 24
tgcacgctaa cgagcgtctg aacaccctga actttcatc ctaaccagcc ccgtat       56

<210> SEQ ID NO 25
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 25
ctgaccaagt accgcactct tagttgctat tttttcatc ctaaccagcc ccgtat      56

<210> SEQ ID NO 26
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 26
ttatttcgag ccagtaataa atcaataatc ggttttcatc ctaaccagcc ccgtat      56

<210> SEQ ID NO 27
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 27
gaaaatttca tcttctgaca gaatcgccat attttcatc ctaaccagcc ccgtat      56

<210> SEQ ID NO 28
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 28
aatcgtcgct attaattaaa tcgcaagaca aatttcatc ctaaccagcc ccgtat        56

<210> SEQ ID NO 29
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 29
cgttcgggag aaacaataac agtacataaa tcttttcatc ctaaccagcc ccgtat        56

<210> SEQ ID NO 30
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 30
aatgaacaaa gaaaccacct tttcaggttt aattttcatc ctaaccagcc ccgtat        56

<210> SEQ ID NO 31
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 31
gcaaatcaat atctggtcac ccgaacgtta tttttcatc ctaaccagcc ccgtat         56

<210> SEQ ID NO 32
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 32
cagatacgtg gcacagacat gaaaaatcta aattttcatc ctaaccagcc ccgtat        56

<210> SEQ ID NO 33
<211> LENGTH: 56
<212> TYPE: DNA
<213> ORGANISM: Artificial sequence
<220> FEATURE:
<223> OTHER INFORMATION: Synthetic oligonucleotide

<400> SEQUENCE: 33
agccctgagt agaagaacta cattctggcc aattttcatc ctaaccagcc ccgtat        56

<210> SEQ ID NO 34
<211> LENGTH: 61
<212> TYPE: DNA
<213> ORGANISM: Artificial sequence
<220> FEATURE:
<223> OTHER INFORMATION: Synthetic oligonucleotide

```
<400> SEQUENCE: 34
tacagggcgc gtactatggt tgctaattaa ccgttgtttt tcatcctaac cagccccgta      60
t                                                                      61

<210> SEQ ID NO 35
<211> LENGTH: 24
<212> TYPE: DNA
<213> ORGANISM: Artificial sequence
<220> FEATURE:
<223> OTHER INFORMATION: Synthetic oligonucleotide

<400> SEQUENCE: 35
tttttgtcgg caagacctcg caac                                             24

<210> SEQ ID NO 36
<211> LENGTH: 24
<212> TYPE: DNA
<213> ORGANISM: Artificial sequence
<220> FEATURE:
<223> OTHER INFORMATION: Synthetic oligonucleotide

<400> SEQUENCE: 36
ttttcatcct aaccagcccc gtat                                             24
```